United States Patent [19]
Araki et al.

[11] Patent Number: 5,384,716
[45] Date of Patent: Jan. 24, 1995

[54] OCCUPANT CONDITION DETERMINING APPARATUS

[75] Inventors: Shoichi Araki, Osaka; Hiroyoshi Nomura, Shijonawate; Noboru Wakami, Hirakata; Takeshi Imanaka, Katano, all of Japan

[73] Assignee: Matsushita Electric Industrial Co., Ltd., Osaka, Japan

[21] Appl. No.: 125,423

[22] Filed: Sep. 22, 1993

[30] Foreign Application Priority Data

Sep. 24, 1992 [JP] Japan .................................. 4-254302
Jul. 15, 1993 [JP] Japan .................................. 5-175233

[51] Int. Cl.⁶ .......................................... G01K 17/20
[52] U.S. Cl. ..................................... 364/557; 374/112
[58] Field of Search ...................... 364/557; 165/11.1; 236/47; 340/567; 374/112

[56] References Cited

U.S. PATENT DOCUMENTS

| | | | |
|---|---|---|---|
| 4,485,864 | 12/1984 | Carrell et al. | 165/11.1 |
| 4,505,426 | 3/1985 | Rossi et al. | 236/47 |
| 4,520,504 | 5/1985 | Walker et al. | 382/1 |
| 4,769,697 | 9/1988 | Gilley et al. | 358/84 |
| 4,815,657 | 3/1989 | Tsukuda | 165/11.1 |
| 4,847,485 | 7/1989 | Koelsch | 250/221 |
| 4,849,737 | 7/1989 | Kirihata et al. | 340/567 |
| 5,059,796 | 10/1991 | Nakamura | 250/330 |
| 5,119,987 | 6/1992 | Kobayashi | 236/49.3 |

FOREIGN PATENT DOCUMENTS

| | | |
|---|---|---|
| 0358911 | 3/1990 | European Pat. Off. . |
| 62-177689 | 8/1987 | Japan . |
| 63-253792 | 10/1988 | Japan . |
| 1147241 | 6/1989 | Japan . |
| 252201 | 2/1990 | Japan . |
| 293232 | 4/1990 | Japan . |
| 33079 | 1/1991 | Japan . |
| 4013026 | 1/1992 | Japan . |

Primary Examiner—Emanuel T. Voeltz
Assistant Examiner—Thomas Peeso
Attorney, Agent, or Firm—Renner, Otto, Boisselle & Sklar

[57] ABSTRACT

The apparatus of the present invention for determining existential conditions of objects on a certain detecting region, includes: a temperature distribution detecting section for obtaining a thermal image including a plurality of elements each having temperature data by detecting the temperature distribution on the detecting region; an element classifying section for classifying the plurality of elements in the thermal image into at least two groups, all elements belonging to one of the groups being in a certain temperature range, the temperature range of the one group being distinct from a temperature range of another one of the groups; a group selecting section for selecting at least one group of a relatively higher temperature range in the thermal image from the at least two groups; an element selecting section for selecting, among elements included in the selected group, elements having temperature data indicative of local temperature peaks in the thermal image; and an output section for outputting the number of the selected elements by the element selecting means as the number of objects on the detecting region.

17 Claims, 35 Drawing Sheets

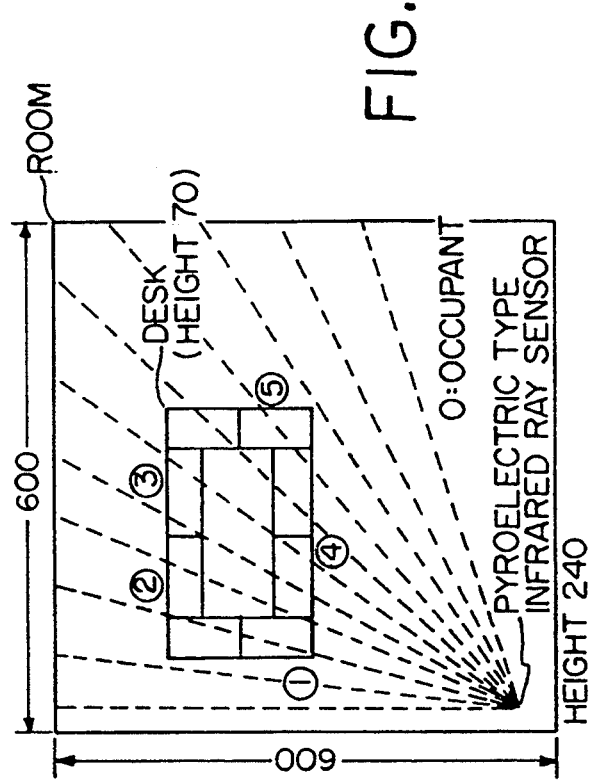
FIG. 4
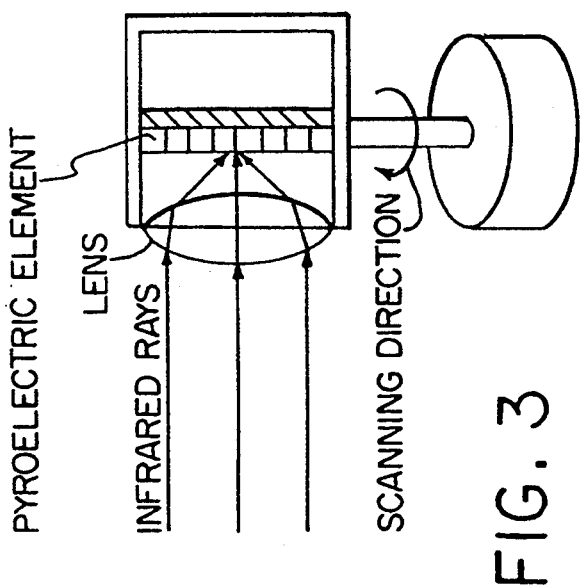
FIG. 3
FIG. 5

FIG. 6

| 41.7 | 42.7 | 43.4 | 47.0 | 47.1 | 42.7 | 38.7 | 40.8 | 38.6 | 40.1 | 39.6 | 41.0 | 44.4 | 43.7 | 44.0 | 42.2 | 39.2 | 42.8 | 48.6 | 43.5 |
|---|---|---|---|---|---|---|---|---|---|---|---|---|---|---|---|---|---|---|---|
| 42.5 | 45.0 | 42.8 | 44.1 | 43.0 | 42.3 | 40.7 | 38.3 | 38.8 | 45.1 | 34.4 | 39.3 | 38.1 | 40.9 | 41.9 | 43.0 | 41.8 | 42.1 | 39.4 | 44.7 |
| 40.1 | 39.4 | 40.9 | 40.3 | 42.3 | 61.1 | 45.4 | 27.6 | 50.7 | 57.9 | 22.1 | 27.3 | 29.9 | 39.1 | 47.6 | 60.3 | 59.4 | 39.9 | 38.7 | 39.8 |
| 39.6 | 33.5 | 37.0 | 35.2 | 40.3 | 48.0 | 49.1 | 35.6 | 34.3 | 50.3 | 33.2 | 31.9 | 67.3 | 41.6 | 18.8 | 59.5 | 35.0 | 36.4 | 40.2 | 38.6 |
| 42.0 | 56.5 | 35.6 | 40.8 | 31.5 | 33.7 | 37.3 | 37.7 | 36.9 | 49.3 | 69.7 | 73.3 | 71.1 | 48.6 | 20.7 | 33.5 | 23.0 | 32.3 | 39.5 | 36.4 |
| 39.8 | 89.8 | 70.0 | 43.4 | 30.0 | 19.5 | 22.6 | 32.8 | 40.7 | 46.9 | 50.3 | 52.7 | 45.4 | 42.7 | 11.0 | 25.8 | 30.3 | 34.2 | 38.3 | 38.4 |
| 38.1 | 55.9 | 67.3 | 60.8 | 39.6 | 32.1 | 30.9 | 35.9 | 35.7 | 39.2 | 49.4 | 47.7 | 42.8 | 37.3 | 27.2 | 34.5 | 36.8 | 36.3 | 35.8 | 38.0 |
| 37.7 | 27.1 | 29.3 | 33.6 | 39.3 | 38.8 | 40.4 | 39.9 | 39.9 | 42.7 | 38.5 | 42.2 | 40.6 | 39.5 | 36.4 | 36.3 | 35.8 | 38.9 | 40.3 | 41.8 |

FIG. 7

| 41.7 | 42.7 | 43.4 | 47.0 | 47.1 | 42.7 | 38.7 | 40.8 | 38.6 | 40.1 | 39.6 | 41.0 | 44.4 | 43.7 | 44.0 | 42.2 | 39.2 | 42.8 | 48.6 | 43.5 |
|---|---|---|---|---|---|---|---|---|---|---|---|---|---|---|---|---|---|---|---|
| 42.5 | 45.0 | 42.8 | 44.1 | 43.0 | 42.3 | 40.7 | 38.3 | 38.8 | 45.1 | 34.4 | 39.3 | 38.1 | 40.9 | 41.9 | 43.0 | 41.8 | 42.1 | 39.4 | 44.7 |
| 40.1 | 39.4 | 40.9 | 40.3 | 42.3 | (61.1) | 45.4 | 27.6 | 50.7 | 57.9 | 22.1 | 27.3 | 29.9 | 39.1 | 47.6 | (60.3) | (59.4) | 39.9 | 38.7 | 39.8 |
| 39.6 | 33.5 | 37.0 | 35.2 | 40.3 | 48.0 | 49.1 | 35.6 | (50.7) | (57.9) | 33.2 | 31.9 | (67.3) | 41.6 | 18.8 | (59.5) | 35.0 | 36.4 | 40.2 | 38.6 |
| 42.0 | (56.5) | 35.6 | 40.8 | 31.5 | 33.7 | 37.3 | 37.7 | 36.9 | 49.3 | (69.7) | (73.3) | (71.1) | 48.6 | 20.7 | 33.5 | 23.0 | 32.3 | 39.5 | 36.4 |
| 39.8 | (89.8) | (70.0) | (60.8) | 30.0 | 19.5 | 22.6 | 32.8 | 40.7 | 46.9 | 50.3 | 52.7 | 45.4 | 42.7 | 11.0 | 25.8 | 30.3 | 34.2 | 38.3 | 38.4 |
| 38.1 | (55.9) | (67.3) | 60.8 | 39.6 | 32.1 | 30.9 | 35.9 | 35.7 | 39.2 | 49.4 | 47.7 | 42.8 | 37.3 | 27.2 | 34.5 | 36.8 | 36.3 | 35.8 | 38.0 |
| 37.7 | 27.1 | 29.3 | 33.6 | 39.3 | 38.8 | 40.4 | 39.9 | 39.9 | 42.7 | 38.5 | 42.2 | 40.6 | 39.5 | 36.4 | 36.3 | 35.8 | 38.9 | 40.3 | 41.8 |

FIG. 8

| 41.7 | 42.7 | 43.4 | 47.0 | 47.1 | 42.7 | 38.7 | 40.8 | 38.6 | 40.1 | 39.6 | 41.0 | 44.4 | 43.7 | 44.0 | 42.2 | 39.2 | 42.8 | 48.6 | 43.5 |
| 42.5 | 45.0 | 42.8 | 44.1 | 43.0 | 42.3 | 40.7 | 38.3 | 38.8 | 45.1 | 34.4 | 39.3 | 38.1 | 40.9 | 41.9 | 43.0 | 41.8 | 42.1 | 39.4 | 44.7 |
| 40.1 | 39.4 | 40.9 | 40.3 | 42.3 | (61.1) | 45.4 | 27.6 | (50.7) | (57.9) | 22.1 | 27.3 | 29.9 | 39.1 | 47.6 | (60.3) | (59.4) | 39.9 | 38.7 | 39.8 |
| 39.6 | 33.5 | 37.0 | 35.2 | 40.3 | 48.0 | 49.1 | 35.6 | 34.3 | 50.3 | 33.2 | 31.9 | (67.3) | 41.6 | 18.8 | (59.5) | 35.0 | 36.4 | 40.2 | 38.6 |
| 42.0 | (56.5) | 35.6 | 40.8 | 31.5 | 33.7 | 37.3 | 37.7 | 36.9 | 49.3 | (69.7) | (73.3) | (71.1) | 48.6 | 20.7 | 33.5 | 23.0 | 32.3 | 39.5 | 36.4 |
| 39.8 | (89.8) | (70.0) | 43.4 | 30.0 | 19.5 | 22.6 | 32.8 | 40.7 | 46.9 | 50.3 | 52.7 | 45.4 | 42.7 | 11.0 | 25.8 | 30.3 | 34.2 | 38.3 | 38.4 |
| 38.1 | (55.9) | (67.3) | (60.8) | 39.6 | 32.1 | 30.9 | 35.9 | 35.7 | 39.2 | 49.4 | 47.7 | 42.8 | 37.3 | 27.2 | 34.5 | 36.8 | 36.3 | 35.8 | 38.0 |
| 37.7 | 27.1 | 29.3 | 33.6 | 39.3 | 38.8 | 40.4 | 39.9 | 39.9 | 42.7 | 38.5 | 42.2 | 40.6 | 39.5 | 36.4 | 36.3 | 35.8 | 38.9 | 40.3 | 41.8 |

| 44.5 | 42.9 | 43.4 | 44.2 | 44.8 | 42.7 | 38.7 | 43.2 | 37.4 | 42.3 | 39.7 | 43.1 | 47.2 | 47.5 | 47.1 | 47.7 | 41.9 | 45.0 | 47.5 | 46.4 |
|---|---|---|---|---|---|---|---|---|---|---|---|---|---|---|---|---|---|---|---|
| 36.9 | 41.7 | 41.8 | 41.7 | 42.3 | 37.9 | 35.4 | 41.4 | 48.0 | 39.0 | 40.6 | 46.3 | 46.1 | 45.0 | 42.7 | 45.1 | 42.6 | 40.7 | | |
| 38.6 | 36.8 | 37.8 | 35.7 | 46.1 | 61.1 | 45.7 | 29.8 | 54.0 | 62.0 | 26.7 | 30.9 | 35.4 | 38.2 | 37.8 | 62.8 | 55.7 | 42.8 | 37.6 | 39.8 |
| 35.9 | 26.2 | 31.1 | 33.4 | 42.3 | 49.8 | 51.1 | 40.6 | 40.5 | 51.1 | 38.2 | 33.5 | 67.8 | 44.9 | 52.9 | 66.5 | 26.2 | 36.8 | 38.9 | 41.6 |
| 37.9 | 21.1 | 29.8 | 37.1 | 41.6 | 45.9 | 45.4 | 42.7 | 40.2 | 51.2 | 69.2 | 69.5 | 69.9 | 51.2 | 19.0 | 34.8 | 25.1 | 33.1 | 40.1 | 42.5 |
| 38.0 | 19.5 | 35.5 | 40.9 | 25.8 | 31.8 | 41.5 | 35.5 | 44.7 | 49.4 | 53.2 | 52.6 | 41.3 | 42.6 | 10.1 | 29.1 | 30.9 | 36.2 | 39.8 | 39.7 |
| 40.4 | 26.1 | 31.5 | 35.1 | 35.7 | 34.4 | 41.2 | 36.2 | 35.2 | 41.4 | 50.3 | 50.4 | 43.9 | 39.9 | 30.0 | 33.9 | 35.0 | 35.9 | 38.2 | 39.4 |
| 41.0 | 34.5 | 36.0 | 34.1 | 40.6 | 37.2 | 36.4 | 43.0 | 40.2 | 43.1 | 45.7 | 42.0 | 43.5 | 43.6 | 40.8 | 37.2 | 41.2 | 39.4 | 42.2 | 42.5 |

| 44.5 | 42.9 | 43.4 | 44.2 | 44.8 | 42.7 | 38.7 | 43.2 | 37.4 | 42.3 | 39.7 | 43.1 | 47.2 | 47.5 | 47.1 | 47.7 | 41.9 | 45.0 | 47.5 | 46.4 |
|---|---|---|---|---|---|---|---|---|---|---|---|---|---|---|---|---|---|---|---|
| 36.9 | 41.7 | 41.8 | 41.7 | 42.3 | 37.9 | 35.4 | 41.4 | 48.0 | 39.0 | 40.6 | 46.3 | 46.1 | 45.0 | 42.7 | 45.1 | 42.6 | 40.7 | | |
| 38.6 | 36.8 | 37.8 | 35.7 | 46.1 | 61.1 | 45.7 | 29.8 | 54.0 | 62.0 | 26.7 | 30.9 | 35.4 | 38.2 | 37.8 | 62.8 | 55.7 | 42.8 | 37.6 | 39.8 |
| 35.9 | 26.2 | 31.1 | 33.4 | 42.3 | 49.8 | 51.1 | 40.6 | 40.5 | 51.1 | 38.2 | 33.5 | 67.8 | 44.9 | 52.9 | 66.5 | 26.2 | 36.8 | 38.9 | 41.6 |
| 37.9 | 21.1 | 29.8 | 37.1 | 41.6 | 45.9 | 45.4 | 42.7 | 40.2 | 51.2 | 69.2 | 69.5 | 69.9 | 51.2 | 19.0 | 34.8 | 25.1 | 33.1 | 40.1 | 42.5 |
| 38.0 | 19.5 | 35.5 | 40.9 | 25.8 | 31.8 | 41.5 | 35.5 | 44.7 | 49.4 | 53.2 | 52.6 | 41.3 | 42.6 | 10.1 | 29.1 | 30.9 | 36.2 | 39.8 | 39.7 |
| 40.4 | 26.1 | 31.5 | 35.1 | 35.7 | 34.4 | 41.2 | 36.2 | 35.2 | 41.4 | 50.3 | 50.4 | 43.9 | 39.9 | 30.0 | 33.9 | 35.0 | 35.9 | 38.2 | 39.4 |
| 41.0 | 34.5 | 36.0 | 34.1 | 40.6 | 37.2 | 36.4 | 43.0 | 40.2 | 43.1 | 45.7 | 42.0 | 43.5 | 43.6 | 40.8 | 37.2 | 41.2 | 39.4 | 42.2 | 42.5 |

$E_4 = 0.214$

| 44.5 | 42.9 | 43.4 | 44.2 | 44.8 | 42.7 | 38.7 | 43.2 | 37.4 | 42.3 | 39.7 | 43.1 | 47.2 | 47.5 | 47.1 | 47.7 | 41.9 | 45.0 | 47.5 | 46.4 |
| --- | --- | --- | --- | --- | --- | --- | --- | --- | --- | --- | --- | --- | --- | --- | --- | --- | --- | --- | --- |
| 36.9 | 41.7 | 41.8 | 41.7 | 46.5 | 42.3 | 37.9 | 35.4 | 41.4 | 48.0 | 34.5 | 39.0 | 40.6 | 46.3 | 46.1 | 45.0 | 42.7 | 45.1 | 42.6 | 40.7 |
| 38.6 | 36.8 | 37.8 | 35.7 | 46.1 | (61.1) | 45.7 | 29.8 | 54.0 | (62.0) | 26.7 | 30.9 | 35.4 | 38.2 | 37.8 | (62.8) | 55.7 | 42.8 | 37.6 | 39.8 |
| 35.9 | 26.2 | 31.1 | 33.4 | 42.3 | 49.8 | 51.1 | 40.6 | 40.5 | 51.1 | 38.2 | 33.5 | (67.8) | 44.9 | 52.9 | (66.5) | 26.2 | 36.8 | 38.9 | 41.6 |
| 37.9 | 21.1 | 29.8 | 37.1 | 41.6 | 45.9 | 45.4 | 42.7 | 40.2 | 51.2 | (69.2) | (69.5) | (69.9) | 51.2 | 19.0 | 34.8 | 25.1 | 33.1 | 40.1 | 42.5 |
| 38.0 | 19.5 | 35.5 | 40.9 | 25.8 | 31.8 | 35.5 | 41.5 | 44.7 | 49.4 | 53.2 | 52.6 | 41.3 | 42.6 | 10.1 | 29.1 | 30.9 | 36.2 | 39.8 | 39.7 |
| 40.4 | 26.1 | 31.5 | 35.1 | 35.7 | 34.4 | 36.2 | 41.2 | 35.2 | 41.4 | 50.3 | 50.4 | 43.9 | 39.9 | 30.0 | 33.9 | 35.0 | 35.9 | 38.2 | 39.4 |
| 41.0 | 34.5 | 36.0 | 34.1 | 40.6 | 37.2 | 36.4 | 43.0 | 40.2 | 43.1 | 45.7 | 42.0 | 43.5 | 43.6 | 40.8 | 37.2 | 41.2 | 39.4 | 42.2 | 42.5 |

FIG. 15

| 44.5 | 42.9 | 43.4 | 44.2 | 44.8 | 42.7 | 38.7 | 43.2 | 37.4 | 42.3 | 39.7 | 43.1 | 47.2 | 47.5 | 47.1 | 47.7 | 41.9 | 45.0 | 47.5 | 46.4 |
| --- | --- | --- | --- | --- | --- | --- | --- | --- | --- | --- | --- | --- | --- | --- | --- | --- | --- | --- | --- |
| 36.9 | 41.7 | 41.8 | 41.7 | 46.5 | 42.3 | 37.9 | 35.4 | 41.4 | 48.0 | 34.5 | 39.0 | 40.6 | 46.3 | 46.1 | 45.0 | 42.7 | 45.1 | 42.6 | 40.7 |
| 38.6 | 36.8 | 37.8 | 35.7 | 46.1 | (61.1) | 45.7 | 29.8 | 54.0 | (62.0) | 26.7 | 30.9 | 35.4 | 38.2 | 37.8 | (62.8) | 55.7 | 42.8 | 37.6 | 39.8 |
| 35.9 | 26.2 | 31.1 | 33.4 | 42.3 | 49.8 | 51.1 | 40.6 | 40.5 | 51.1 | 38.2 | 33.5 | (67.8) | 44.9 | 52.9 | (66.5) | 26.2 | 36.8 | 38.9 | 41.6 |
| 37.9 | 21.1 | 29.8 | 37.1 | 41.6 | 45.9 | 45.4 | 42.7 | 40.2 | 51.2 | (69.2) | (69.5) | (69.9) | 51.2 | 19.0 | 34.8 | 25.1 | 33.1 | 40.1 | 42.5 |
| 38.0 | 19.5 | 35.5 | 40.9 | 25.8 | 31.8 | 35.5 | 41.5 | 44.7 | 49.4 | 53.2 | 52.6 | 41.3 | 42.6 | 10.1 | 29.1 | 30.9 | 36.2 | 39.8 | 39.7 |
| 40.4 | 26.1 | 31.5 | 35.1 | 35.7 | 34.4 | 36.2 | 41.2 | 35.2 | 41.4 | 50.3 | 50.4 | 43.9 | 39.9 | 30.0 | 33.9 | 35.0 | 35.9 | 38.2 | 39.4 |
| 41.0 | 34.5 | 36.0 | 34.1 | 40.6 | 37.2 | 36.4 | 43.0 | 40.2 | 43.1 | 45.7 | 42.0 | 43.5 | 43.6 | 40.8 | 37.2 | 41.2 | 39.4 | 42.2 | 42.5 |

| 44.5 | 42.9 | 43.4 | 44.2 | 44.8 | 42.7 | 38.7 | 43.2 | 37.4 | 42.3 | 39.7 | 43.1 | 47.2 | 47.5 | 47.1 | 47.7 | 41.9 | 45.0 | 47.5 | 46.4 |
|---|---|---|---|---|---|---|---|---|---|---|---|---|---|---|---|---|---|---|---|
| 36.9 | 41.7 | 41.8 | 41.7 | 46.5 | 42.3 | 37.9 | 35.4 | 41.4 | 48.0 | 34.5 | 39.0 | 40.6 | 46.3 | 46.1 | 45.0 | 42.7 | 45.1 | 42.6 | 40.7 |
| 38.6 | 36.8 | 37.8 | 35.7 | 46.1 | (61.1) | 45.7 | 29.8 | (54.0) | (62.0) | 26.7 | 30.9 | 35.4 | 38.2 | 37.8 | (62.8) | (55.7) | 42.8 | 37.6 | 39.8 |
| 35.9 | 26.2 | 31.1 | 33.4 | 42.3 | 49.8 | 51.1 | 40.6 | 40.5 | 51.1 | 38.2 | 33.5 | (67.8) | 44.9 | 52.9 | (66.5) | 26.2 | 36.8 | 38.9 | 41.6 |
| 37.9 | 21.1 | 29.8 | 37.1 | 41.6 | 45.9 | 45.4 | 42.7 | 40.2 | 51.2 | (69.2) | (69.5) | (69.9) | 51.2 | 19.0 | 34.8 | 25.1 | 33.1 | 40.1 | 42.5 |
| 38.0 | 19.5 | 35.5 | 40.9 | 25.8 | 31.8 | 35.5 | 41.5 | 44.7 | 49.4 | 53.2 | 52.6 | 41.3 | 42.6 | 10.1 | 29.1 | 30.9 | 36.2 | 39.8 | 39.7 |
| 40.4 | 26.1 | 31.5 | 35.1 | 35.7 | 34.4 | 36.2 | 41.2 | 35.2 | 41.4 | 50.3 | 50.4 | 43.9 | 39.9 | 30.0 | 33.9 | 35.0 | 35.9 | 38.2 | 39.4 |
| 41.0 | 34.5 | 36.0 | 34.1 | 40.6 | 37.2 | 36.4 | 43.0 | 40.2 | 43.1 | 45.7 | 42.0 | 43.5 | 43.6 | 40.8 | 37.2 | 41.2 | 39.4 | 42.2 | 42.5 |

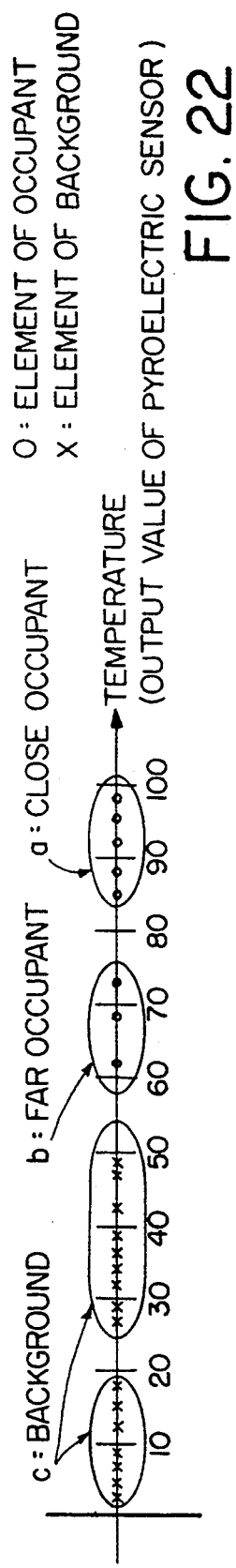
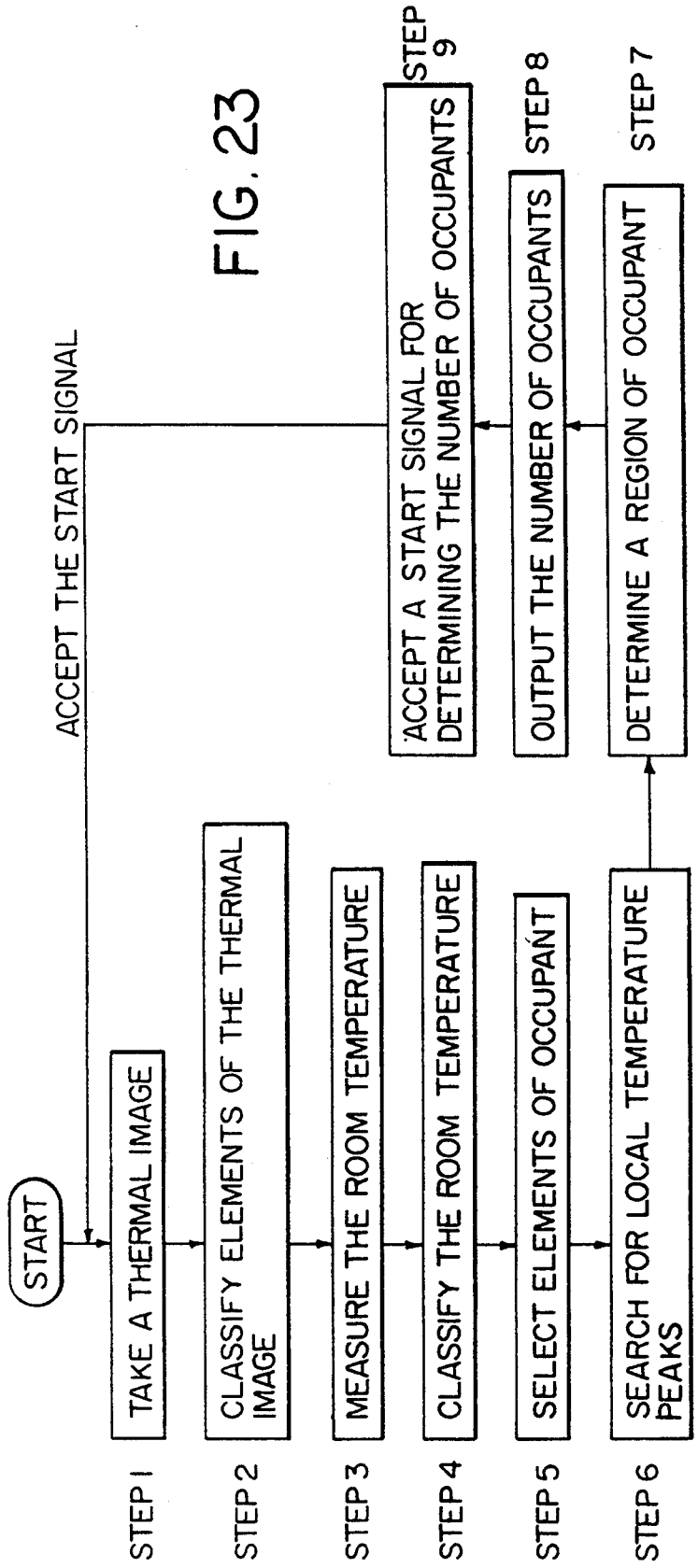

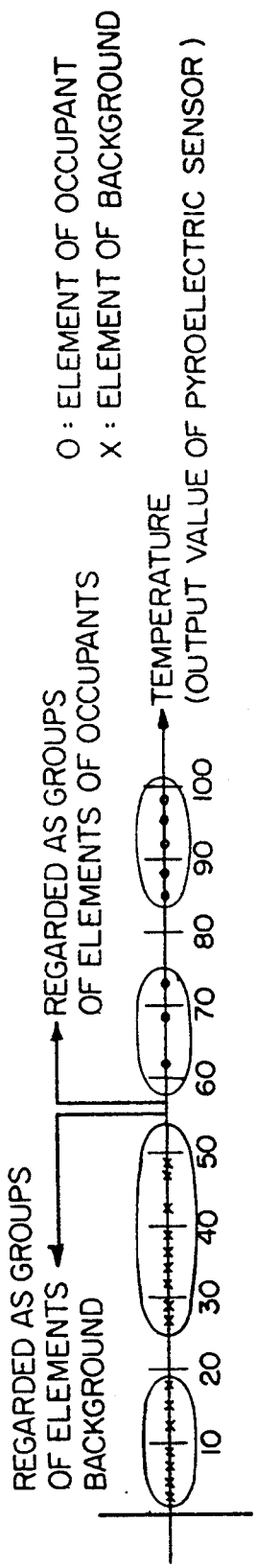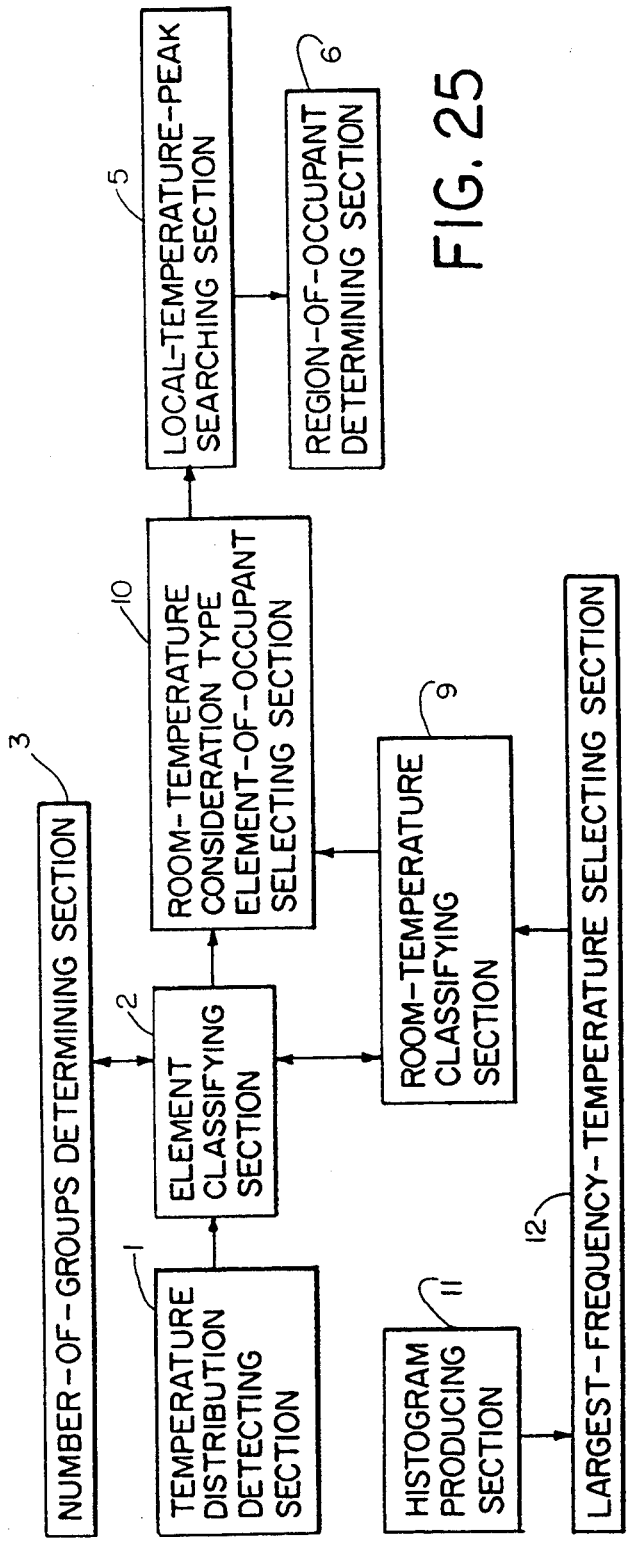

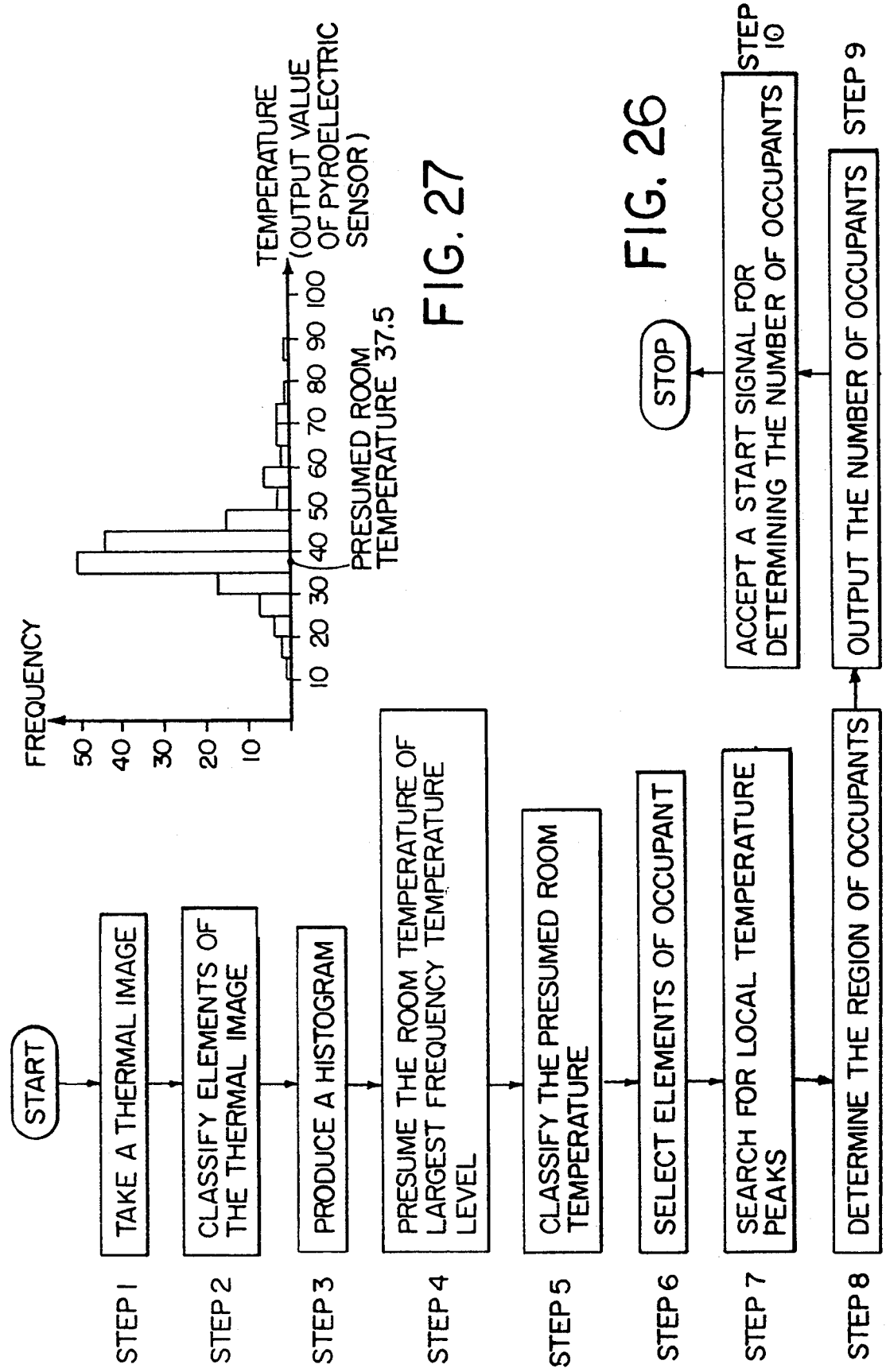

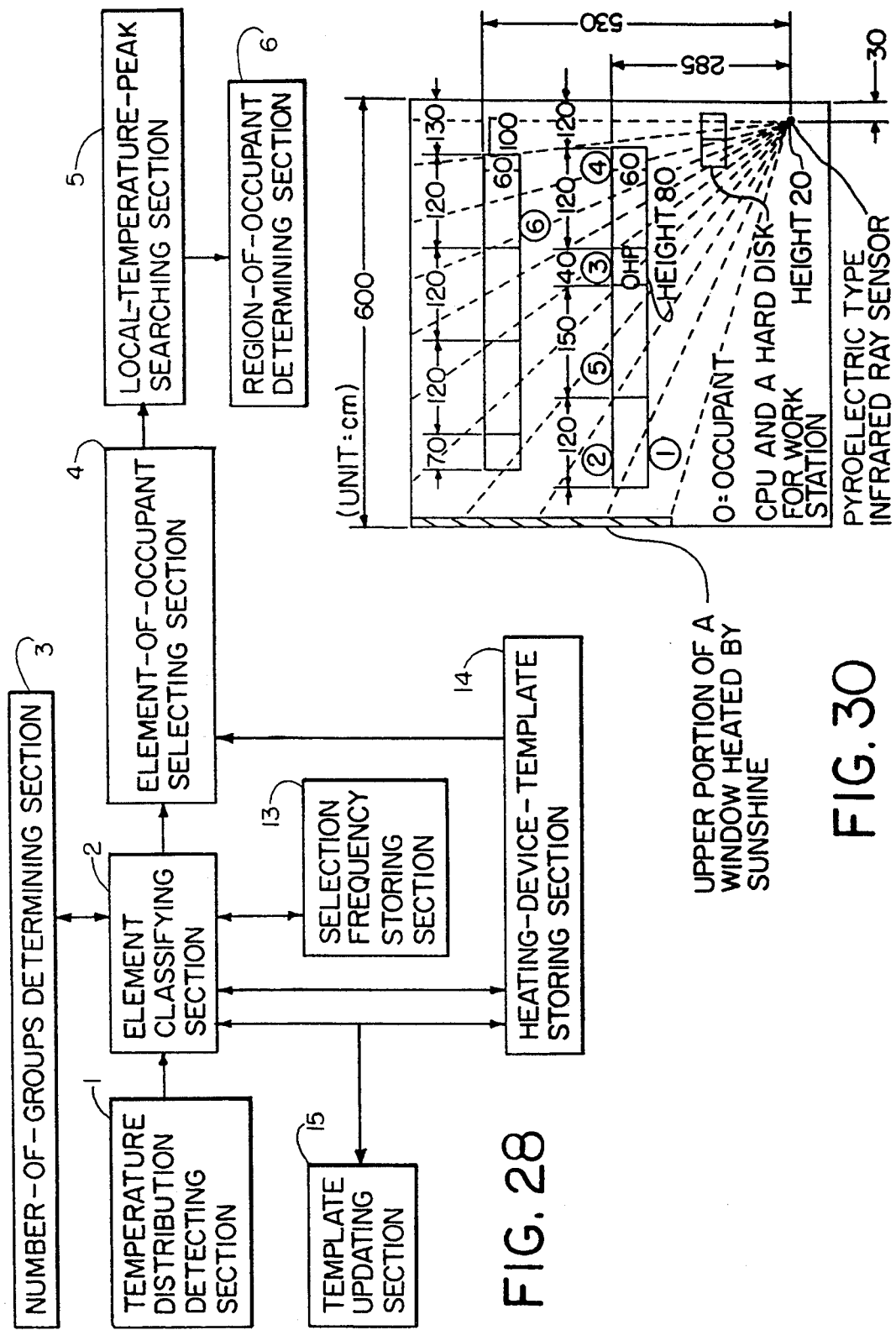

FIG. 31

| | | | | | | | | | | | | |
|---|---|---|---|---|---|---|---|---|---|---|---|---|
| (34.3) | (32.9) | (34.6) | (37.1) | 32.6 | 29.5 | 31.5 | 31.0 | 27.3 | 24.3 | 24.1 | 22.6 | 25.8 | 22.1 | 24.6 | 23.8 | 20.0 | 20.4 |
| 25.5 | 30.7 | 28.4 | 25.5 | 20.4 | 18.2 | 19.3 | 20.5 | 21.5 | 21.4 | 19.7 | 20.9 | 21.0 | 20.7 | 18.5 | 19.2 | 19.0 | 20.4 |
| 25.2 | 23.9 | 26.3 | 23.3 | 21.2 | 21.1 | 22.9 | 20.0 | 19.2 | 19.7 | 17.5 | 18.3 | 18.7 | 19.3 | 17.8 | 16.9 | 17.6 | 19.3 |
| 24.2 | 23.0 | 26.5 | 24.9 | 25.8 | 22.1 | 26.2 | 27.2 | 22.3 | 21.8 | 19.4 | 21.4 | 21.0 | 20.7 | 19.4 | 18.8 | 16.8 | 17.7 |
| 22.4 | 23.0 | 25.2 | 25.2 | 24.1 | 22.9 | 26.3 | (35.0) | (35.0) | 29.5 | 27.6 | 23.2 | 24.6 | 25.9 | 22.0 | 20.1 | 18.5 | 18.2 | 19.4 |
| 17.6 | 20.4 | 18.0 | 19.4 | 15.9 | 16.5 | 19.7 | 18.8 | 17.8 | 18.1 | 17.9 | 18.4 | 20.1 | 16.4 | 19.4 | 16.7 | 16.8 | 18.9 |
| 26.6 | 24.0 | 22.8 | 21.2 | 22.3 | 24.3 | 21.4 | 26.0 | 23.4 | 24.1 | 27.0 | 29.8 | (35.5) | (34.4) | (34.2) | 28.8 | (33.5) | (32.6) |
| 30.8 | 29.8 | 28.9 | 29.9 | 26.6 | 28.0 | 26.6 | 26.2 | 29.1 | 29.0 | 38.3 | (35.4) | (38.8) | (39.4) | (40.1) | (38.5) | (45.7) | (41.1) | (41.2) | (41.6) |

1= UPPER PORTION OF A WINDOW HEATED BY SUNSHINE
2= OPH
3= CPU AND A HARD DISK

FIG. 32

| | | | | | | | | | | | | |
|---|---|---|---|---|---|---|---|---|---|---|---|---|
| (35.4) | (37.7) | (36.4) | (35.8) | (32.9) | (35.0) | 30.4 | (31.9) | (31.2) | 23.9 | 23.5 | 25.2 | 25.5 | 27.0 | 22.9 | 24.4 | 25.4 | 21.8 | 20.7 |
| 26.6 | 27.4 | 29.2 | 26.3 | 21.5 | 19.8 | 21.5 | 20.9 | 17.8 | 21.5 | 23.7 | 22.1 | 25.6 | 27.6 | 21.0 | 25.2 | 22.8 | 22.3 | 19.8 |
| 24.8 | 28.6 | 25.5 | 24.4 | 26.6 | 23.6 | 19.8 | 21.9 | 19.8 | 18.4 | 19.8 | 19.5 | 20.4 | 25.9 | 22.1 | 21.2 | 21.9 | 19.4 |
| 26.2 | 27.1 | 25.9 | 21.4 | (37.8) | (35.9) | (35.8) | 28.0 | 26.2 | 22.7 | 21.3 | 21.6 | 22.3 | 25.1 | (44.1) | 27.2 | 23.1 | 23.1 | 18.3 |
| 24.3 | 26.2 | 24.3 | 20.9 | 26.2 | 28.2 | 24.6 | (33.5) | (35.8) | 29.5 | 26.5 | 26.7 | 29.3 | (37.4) | 20.5 | 22.1 | 22.9 | 22.3 | 19.8 |
| 16.8 | 17.0 | 19.4 | 16.8 | 16.3 | 15.4 | 17.6 | 17.7 | 20.7 | 15.9 | 18.3 | 25.5 | 25.3 | 21.8 | 18.4 | 16.0 | 20.4 | 17.0 |
| 27.8 | 27.1 | 24.1 | 19.3 | 22.6 | 22.9 | 24.6 | 22.6 | 24.1 | 23.5 | 24.9 | 29.1 | 18.0 | 17.6 | (34.6) | (34.7) | (35.2) | (34.7) | (32.8) | 29.7 |
| 31.6 | 33.3 | 26.8 | 26.5 | 24.4 | 27.2 | 26.8 | 26.5 | 27.1 | (32.8) | (36.7) | (40.9) | (41.5) | (40.3) | (41.0) | (39.5) | (43.8) | (41.1) | (43.1) |

OHP
1= OCCUPANT
2= OCCUPANT

FIG. 33

| ⊙ | ⊙ | ⊙ | ⊙ | ⊙ | ⊙ | – | – |
|---|---|---|---|---|---|---|---|
| ⊙ | ⊙ | ⊙ | ⊙ | ⊙ | ⊙ | – | – |
| ⊙ | ⊙ | ⊙ | ⊙ | ⊙ | ⊙ | – | – |
| ⊙ | ⊙ | ⊙ | ⊙ | ⊙ | ⊙ | – | – |
| ⊙ | ⊙ | ⊙ | ⊙ | ⊙ | ⊙ | – | – |
| ⊙ | ⊙ | ⊙ | ⊙ | ⊙ | ⊙ | – | – |
| ⊙ | ⊙ | ⊙ | ⊙ | ⊙ | ⊙ | – | – |
| ⊙ | ⊙ | ⊙ | ⊙ | ⊙ | ⊙ | – | – |
| ⊙ | ⊙ | ⊙ | ⊙ | ⊙ | ⊙ | – | – |
| ⊙ | ⊙ | ⊙ | ⊙ | ⊙ | ⊙ | – | – |
| ⊙ | ⊙ | ⊙ | ⊙ | ⊙ | ⊙ | – | – |
| – | ⊙ | ⊙ | ⊙ | – | ⊙ | ⊙ | ⊙ |
| – | ⊙ | ⊙ | ⊙ | – | ⊙ | ⊙ | ⊙ |
| – | ⊙ | ⊙ | ⊙ | ⊙ | ⊙ | ⊙ | ⊙ |
| – | ⊙ | ⊙ | ⊙ | ⊙ | ⊙ | ⊙ | ⊙ |
| – | ⊙ | ⊙ | ⊙ | ⊙ | ⊙ | ⊙ | ⊙ |
| – | ⊙ | ⊙ | ⊙ | ⊙ | ⊙ | ⊙ | ⊙ |
| – | ⊙ | ⊙ | ⊙ | ⊙ | ⊙ | ⊙ | ⊙ |
| – | ⊙ | ⊙ | ⊙ | ⊙ | ⊙ | ⊙ | ⊙ |
| – | ⊙ | ⊙ | ⊙ | ⊙ | ⊙ | ⊙ | ⊙ |
| – | ⊙ | ⊙ | ⊙ | ⊙ | ⊙ | ⊙ | ⊙ |

FIG. 34

| | | | | | | 2 | 2 |
|---|---|---|---|---|---|---|---|
| | | | | | | 2 | 2 |
| | | | | | | 2 | 2 |
| | | | | | | 2 | 2 |
| | | | | | | 2 | 2 |
| | | | | – | – | 2 | 2 |
| | | | | | | – | 2 |
| | | | | | | – | 2 |
| | | | | | | | 2 |
| | | | | | | | – |
| | | | | | | | – |
| | | | | 2 | | | |
| – | | | | 2 | | | |
| | | | | | | | |
| 2 | | | – | | | | |
| 2 | | | – | | | | |
| 2 | | | | | | | |
| 2 | | | | | | | |
| 2 | | | | | | | |
| 2 | | | | | | | |

FIG. 35

| 55 | 55 | 55 | 53 | 50 | 45 | 49 | 41 | 0 | 0 | 0 | 0 | 0 | 0 | 0 | 1 | 0 | 0 | 0 | 0 |
| --- | --- | --- | --- | --- | --- | --- | --- | --- | --- | --- | --- | --- | --- | --- | --- | --- | --- | --- | --- |
| 6 | 2 | 55 | 0 | 0 | 0 | 0 | 0 | 0 | 0 | 0 | 0 | 0 | 0 | 0 | 1 | 1 | 0 | 0 | 0 |
| 0 | 2 | 1 | 6 | 6 | 8 | 2 | 0 | 2 | 0 | 1 | 8 | 8 | 15 | 10 | 0 | 2 | 2 | 1 | 2 |
| 23 | 24 | 2 | 36 | 39 | 25 | 27 | 25 | 27 | 19 | 16 | 22 | 28 | 13 | 13 | 9 | 7 | 2 | 2 | 0 |
| 10 | 9 | 23 | 8 | 8 | 11 | 55 | 55 | 0 | 27 | 18 | 21 | 16 | 6 | 4 | 10 | 2 | 13 | 12 | 0 |
| 0 | 1 | 9 | 0 | 0 | 2 | 7 | 4 | 1 | 1 | 0 | 6 | 4 | 0 | 0 | 2 | 3 | 0 | 0 | 0 |
| 0 | 0 | 0 | 0 | 0 | 0 | 3 | 3 | 40 | 42 | 41 | 44 | 50 | 55 | 53 | 52 | 51 | 50 | 41 |
| 0 | 0 | 0 | 0 | 0 | 1 | 11 | 41 | 49 | 55 | 55 | 55 | 55 | 55 | 55 | 55 | 55 | 55 | 55 |

FIG. 36

| 36.9 | 39.2 | 35.8 | 35.5 | 32.8 | 30.2 | 32.1 | 28.4 | 26.1 | 22.1 | 23.6 | 24.5 | 24.1 | 23.8 | 22.0 | 20.6 |
| --- | --- | --- | --- | --- | --- | --- | --- | --- | --- | --- | --- | --- | --- | --- | --- |
| 24.9 | 35.7 | 33.2 | 32.4 | 28.6 | 16.8 | 17.7 | 15.3 | 22.1 | 18.0 | 23.6 | 25.4 | 17.6 | 22.2 | 23.2 | 23.5 |
| 25.0 | 20.4 | 26.8 | 26.0 | 21.8 | 16.9 | 21.3 | 17.7 | 18.4 | 21.7 | 19.6 | 20.1 | 17.6 | 23.4 | 23.2 | 21.1 | 18.3 |
| 22.5 | 21.2 | 25.8 | 18.4 | 21.8 | 21.3 | 17.7 | 17.9 | 18.0 | 23.3 | 25.3 | 19.6 | 19.2 | 17.1 | 18.8 | 21.4 | 20.1 | 17.4 |
| 36.0 | 37.4 | 37.0 | 29.3 | 36.2 | 38.9 | 34.5 | 25.9 | 23.4 | 22.8 | 21.1 | 20.0 | 19.2 | 18.9 | 19.7 | 27.8 | 23.9 |
| 28.0 | 24.8 | 21.0 | 26.7 | 24.6 | 27.8 | 34.6 | 26.8 | 26.0 | 24.2 | 23.7 | 22.2 | 21.5 | 27.7 | 34.3 | 40.8 | 32.9 |
| 20.3 | 19.1 | 15.1 | 17.3 | 17.0 | 16.1 | 18.6 | 19.0 | 15.8 | 15.6 | 15.7 | 19.5 | 18.1 | 26.4 | 28.8 | 25.5 | 41.9 | 27.1 |
| 25.0 | 21.9 | 18.4 | 22.1 | 19.5 | 22.8 | 22.5 | 19.9 | 19.9 | 22.7 | 26.3 | 28.2 | 31.2 | 29.8 | 35.6 | 32.3 | 24.8 | 17.5 |
| 34.0 | 26.6 | 24.4 | 23.8 | 24.1 | 22.8 | 25.7 | 26.7 | 26.4 | 28.7 | 32.4 | 34.0 | 38.0 | 31.2 | 35.5 | 40.4 | 42.4 | 35.8 | 38.2 | 31.6 |
| | | | | | | | | | | | | | 12.4 | 12.4 | 38.0 | 43.0 | 12.8 | 39.5 |

| | | | | IR | DR | | |
|---|---|---|---|---|---|---|---|
| | | | NR | I | DR | | |
| | | SR | N | IL | DR | | |
| | | S | NL | HR | DL | | |
| | XR | SL | MR | HR | DL | AR | |
| | XL | RR | MR | HL | DL | AR | |
| | WR | R | ML | HL | CR | AR | |
| | WL | RL | ML | GR | CR | AR | |
| | VR | QR | LR | GR | CR | AR | |
| | VR | QR | LR | GR | CR | AR | |
| | VL | QL | LL | GL | CL | AL | |
| | VL | QL | LL | GL | CL | AL | |
| | UR | PR | KR | GL | CL | AL | |
| | UL | P | KR | FR | CL | AL | |
| | TR | PL | KL | FR | BR | AL | |
| | TL | OR | KL | FL | BR | AL | |
| | | O | JR | FL | BR | | |
| | | OL | J | ER | BL | | |
| | | | JL | E | BL | | |
| | | | | EL | BL | | |

| 41.7 | 42.7 | 43.4 | 47.0 | 47.1 | 42.7 | 38.7 | 40.8 | 38.6 | 39.6 | 41.0 | 44.4 | 43.7 | 44.0 | 42.2 | 39.2 | 42.8 | 48.6 | 43.5 |
| 42.5 | 45.0 | 42.8 | 44.1 | 43.0 | 42.3 | 40.7 | 38.3 | 38.8 | 45.1 | 39.3 | 38.1 | 40.9 | 41.9 | 43.0 | 41.8 | 42.1 | 39.4 | 44.7 |
| 40.1 | 39.4 | 40.9 | 40.3 | 42.3 | (62.1) | 45.4 | 27.6 | (52.7) | (59.9) | (66.5) | 29.9 | 39.1 | 47.6 | (61.3) | (58.4) | 39.9 | 38.7 | 39.8 |
| 39.6 | 33.5 | 37.0 | 35.2 | 40.3 | 48.0 | 49.1 | 35.6 | 34.3 | 50.3 | (70.4) | 50.2 | 41.6 | 18.8 | (59.2) | 35.0 | 36.4 | 40.2 | 38.6 |
| 42.0 | (57.5) | 35.6 | 40.8 | 31.5 | 33.7 | 37.3 | 37.7 | 36.9 | 49.3 | (68.3) | 49.1 | 48.6 | 20.7 | 33.5 | 23.0 | 32.3 | 39.5 | 36.4 |
| 39.8 | (87.8) | (69.0) | 43.4 | 30.0 | 19.5 | 22.6 | 32.8 | 40.7 | 46.9 | 52.7 | 45.4 | 42.7 | 11.0 | 25.8 | 30.3 | 34.2 | 38.3 | 38.4 |
| 38.1 | (58.9) | (62.3) | (60.1) | 39.6 | 32.1 | 30.9 | 35.9 | 35.7 | 39.2 | 47.7 | 42.8 | 37.3 | 27.2 | 34.5 | 36.8 | 36.3 | 35.8 | 38.0 |
| 37.7 | 27.1 | 29.3 | 33.6 | 39.3 | 38.8 | 40.4 | 39.9 | 42.7 | 38.5 | 42.2 | 40.6 | 39.5 | 36.4 | 36.3 | 35.8 | 38.9 | 40.3 | 41.8 |

FIG. 45

| | | | | | | | | | | | | | |
|---|---|---|---|---|---|---|---|---|---|---|---|---|---|
| | | | | | | | | | | | | | |
| | | | | | | | | | | | | | |
| | | | | | | | | 5 | | | | | |
| | | | | | | | 5 | | 5 | | | | |
| | | | | | | | | | | | | | |
| | | | | | | | | | | | | | |
| | | | | | | 4 | 4 | 4 | | | | | |
| | | | | | | | | | 4 | | | | |
| | | | | | 3 | 3 | | | | | | | |
| | | | | | 3 | | | | | | | | |
| | | | | | | | | | | | | | |
| | | | | 2 | | | | | | | | | |
| | | | | | | | | | | | | | |
| | | | | | | | | | 1 | | | | |
| | | | | | | | | 1 | 1 | | | | |
| | | | | | | | 1 | 1 | 1 | | | | |
| | | | | | | | | | | | | | |

FIG. 50A

| 40.2 | 39.8 | 41.5 | 40.4 | 38.3 | 34.3 | 39.2 | 34.3 | 36.0 | 35.2 | 37.6 | 43.5 | 43.1 | 41.6 | 41.7 | 40.8 | 43.0 | 41.6 | 37.7 | 36.5 |
|---|---|---|---|---|---|---|---|---|---|---|---|---|---|---|---|---|---|---|---|
| 41.6 | 39.5 | 41.7 | 41.5 | 37.8 | 48.2 | 43.9 | 43.4 | 37.6 | 37.0 | 42.1 | 43.2 | 44.2 | 41.9 | 41.9 | 44.9 | 47.7 | 47.8 | 47.1 | 47.5 |
| 41.7 | 41.9 | 40.7 | 36.9 | 41.5 | 48.7 | 43.2 | 44.3 | 40.5 | 36.7 | 37.0 | 40.9 | 37.6 | 40.4 | 43.5 | 46.6 | 44.7 | 40.1 | 51.6 | 48.2 |
| 31.6 | 32.3 | 28.9 | 30.6 | (66.9) | (89.1) | 34.9 | 42.8 | 32.6 | 31.0 | 29.1 | 35.9 | 33.1 | 38.3 | 50.1 | (65.5) | (63.9) | 43.9 | 42.5 |  |
| 22.3 | 22.7 | 22.4 | 22.1 | 22.7 | (67.2) | 29.3 | 27.9 | 23.2 | 22.0 | 24.4 | 22.5 | 24.2 | 25.0 | 31.6 | (68.2) | 48.9 | 27.7 | 28.8 |  |
| 19.7 | 18.1 | 16.0 | 20.1 | 18.4 | 19.0 | 23.2 | 19.3 | 20.0 | 19.6 | 20.8 | 19.9 | 21.4 | 19.9 | 21.6 | 22.5 | 24.5 | 26.8 | 23.5 | 23.5 |
| 20.7 | 19.9 | 15.1 | 18.1 | 17.6 | 18.8 | 18.2 | 19.3 | 21.8 | 19.8 | 20.7 | 19.5 | 21.1 | 16.0 | 19.1 | 19.2 | 18.6 | 19.7 | 22.4 | 20.7 |
| 14.1 | 12.9 | 13.6 | 13.6 | 12.5 | 12.1 | 11.8 | 16.1 | 16.8 | 13.2 | 15.3 | 14.0 | 13.7 | 13.7 | 11.1 | 12.5 | 13.9 | 15.4 | 20.3 |  |

FIG. 50B

| 40.9 | 40.8 | 40.5 | 43.0 | 39.4 | 35.8 | 34.7 | 35.6 | 37.0 | 39.4 | 38.2 | 43.2 | 39.5 | 38.2 | 39.4 | 42.0 | 40.6 |
|---|---|---|---|---|---|---|---|---|---|---|---|---|---|---|---|---|
| 41.0 | 39.5 | 41.5 | 38.9 | 37.3 | 35.8 | 38.0 | 36.4 | 40.6 | 38.8 | 43.9 | 44.0 | 52.8 | 47.3 | 45.8 | 48.2 | 50.9 | 49.4 |
| 36.6 | 36.7 | 35.8 | 35.2 | 37.4 | 34.7 | 37.6 | 33.2 | 34.1 | 41.4 | 52.4 | 44.0 | 43.4 | 46.3 | 45.0 | 46.3 | 49.9 | 49.4 |
| 31.2 | 29.8 | 28.6 | 30.2 | 26.7 | 26.4 | 28.6 | 29.6 | 38.5 | 50.9 | (68.2) | (87.1) | (62.1) | 46.2 | 39.9 | 39.9 | 39.7 | 39.8 |
| 27.8 | 24.7 | 21.9 | 22.1 | 21.0 | 23.0 | 22.4 | 26.0 | 27.5 | 46.0 | (77.9) | (66.7) | (62.1) | 27.1 | 29.2 | 30.1 | 27.6 | 25.7 | 25.8 |
| 23.3 | 21.8 | 19.5 | 20.1 | 23.9 | 18.2 | 20.8 | 20.4 | 22.0 | 34.1 | 43.5 | 33.4 | 20.3 | 21.3 | 22.1 | 26.9 | 31.3 | 27.3 | 20.5 |
| 22.6 | 21.8 | 19.9 | 21.8 | 16.6 | 19.1 | 18.4 | 22.7 | 18.5 | 22.3 | 28.4 | 25.6 | 19.4 | 16.5 | 20.6 | 21.4 | 23.3 | 21.1 | 21.3 |
| 15.1 | 12.1 | 11.5 | 14.0 | 12.8 | 13.1 | 13.4 | 15.3 | 17.9 | 16.1 | 13.9 | 14.8 | 13.0 | 12.9 | 15.8 | 14.4 | 12.3 | 15.4 | 16.5 | 16.4 |

HATCHED BLOCK REPRESENT THE TEMPERATURE PEAKS

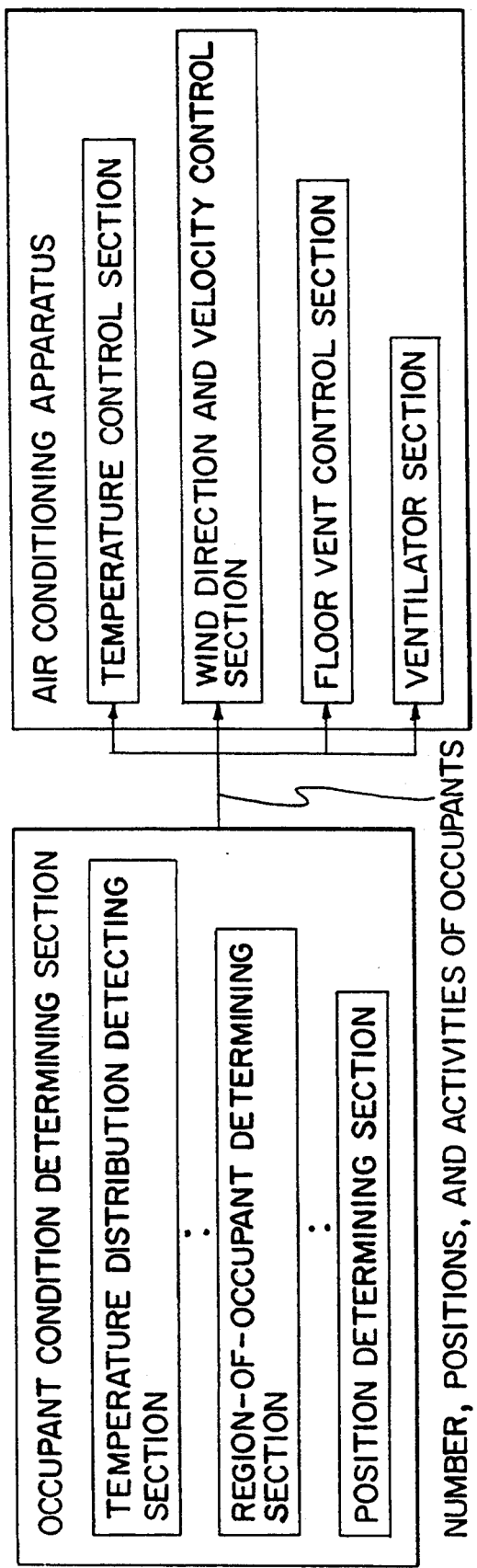
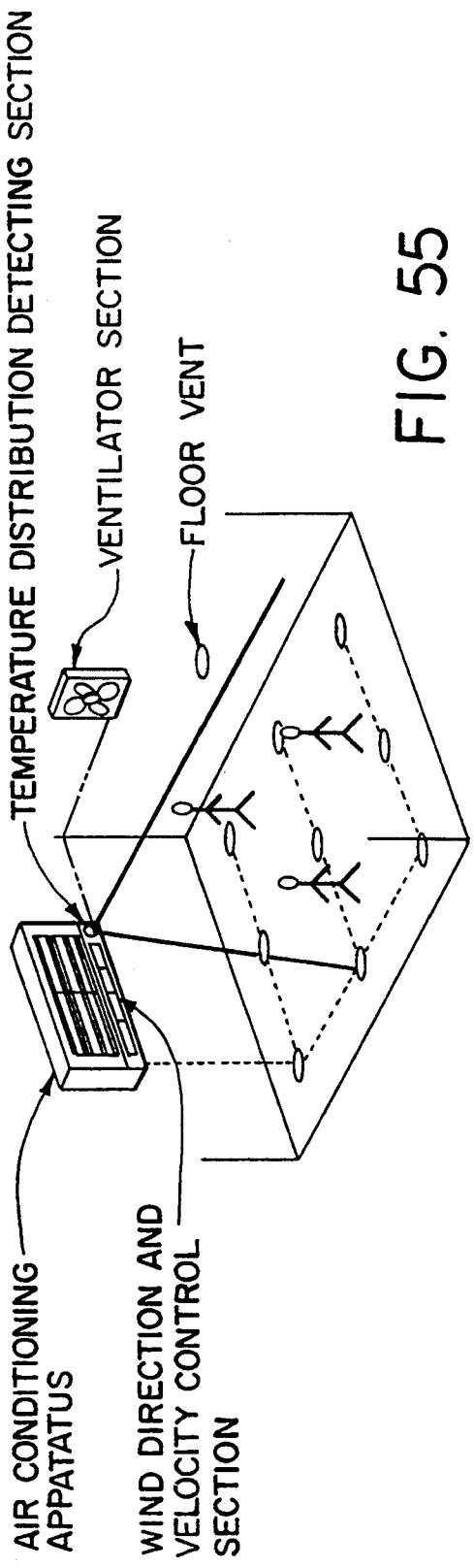
FIG. 55

OCCUPANT CONDITION DETERMINING APPARATUS

BACKGROUND OF THE INVENTION

1. Field of the Invention

The present invention relates to an occupant condition determining apparatus using an infrared ray sensor such as a pyroelectric type sensor, and more particularly to an occupant condition determining apparatus with a function for determining the conditions of occupants in a room (i.e., the number, the positions, and the activities thereof).

2. Description of the Related Art

Recently, an occupant sensing apparatus has become practical and useful. This type of apparatus senses infrared rays corresponding to a body temperature which are emitted from a human body by using an infrared ray sensor. The apparatus detects the intensity variation of the infrared rays in a predetermined detecting region in order to determine whether any occupant is present or absent in the predetermined detecting region. The occupant sensing apparatus is used for determining the conditions of occupants in a room, such as the number, the positions and the activities of the occupants, and hence can be applied to an air conditioner or the like.

Japanese Laid-Open Patent Publication No. 1-147241 discloses an air conditioner having a function for determining the number of occupants in a room. An infrared ray sensor is rotated so as to scan a room, and the number of large changes in the output of the sensor is counted. The count indicates the number of occupants.

Japanese Laid-Open Patent Publication No. 2-52201 discloses an occupant position detector for determining the positions of occupants in a room. Prescribed regions of a room are sequentially sensed, and an occupant detection signal is produced when an infrared ray sensor detects a change in the intensity of infrared rays corresponding to a body temperature. A region for which the occupant detection signal is produced is determined to include an occupant. Such determination is applied to the control of the wind direction depending on the positions of occupants. For example, during a heating operation of an air conditioner, a cold wind at the beginning of the heating operation is prevented from being directed to occupants.

Japanese Laid-Open Patent Publication No. 2-93232 discloses an air-conditioning control apparatus having a function for determining the activities of occupants in a room. The activities of occupants in a room are determined by counting the number of changes in the intensity of infrared rays. For the purpose of air-conditioning control, for example, if the number of intensity changes is large, the occupants are determined to be actively moving. According to such determination, the set temperature is lowered, thereby improving the feeling temperature for the occupants.

However, the conventional occupant sensing apparatus as described above has the following drawbacks.

As to the determination of the number of occupants, the output signal of the employed infrared ray sensor is one-dimensional. Therefore, if a plurality of occupants exist along the detecting direction, it is erroneously determined that there is one occupant. In addition, the thermal environment and the quality of air (e.g., the $CO_2$ concentration of the room) to be controlled in the air conditioning are largely influenced by the number of occupants in the room. If the above erroneous determination is made, comfortable air conditions cannot always be realized.

As to the determination of the positions of occupants, some position, posture, or movement leads to an erroneous determination that there exists an occupant on a region, while there is actually no occupants on the region. Because of such erroneous determination on the positions, comfortable air-conditions for each occupant cannot be realized.

As to the determination of the activities of occupants, such activities are determined only based on the number of intensity changes of infrared rays. If there are many occupants in a specific region, for example, the number of intensity changes increases. Therefore, even if each occupant is not so actively moving, it is sometimes determined that there are many movements. In other words, the number of intensity changes largely depends on the number of occupants in the specific region, so that the activities of the occupants cannot separately and accurately be determined. Therefore, it is impossible to perform the control for more comfortable air-conditions in accordance with the conditions of the respective occupants.

SUMMARY OF THE INVENTION

The apparatus of this invention for determining existential conditions of objects on a certain detecting region, includes: temperature distribution detecting means for obtaining a thermal image including a plurality of elements each having temperature data by detecting the temperature distribution on the detecting region; element classifying means for classifying the plurality of elements in the thermal image into at least two groups, all elements belonging to one of the groups being in a certain temperature range, the temperature range of the one group being distinct from a temperature range of another one of the groups; group selecting means for selecting at least one group of a relatively higher temperature range in the thermal image from the at least two groups; element selecting means for selecting, among elements included in the selected group, elements having temperature data indicative of local temperature peaks in the thermal image; and output means for outputting the number of the selected elements by the element selecting means as the number of objects on the detecting region.

In one embodiment of the invention, the apparatus further includes object region specifying means for specifying a region composed of elements selected by the element selecting means, and elements depending on the selected elements among the elements in the group selected by the group selecting means, as a region representing an object.

In another embodiment of the invention, the group selecting means selects a group of a higher temperature range than a predetermined threshold value as a group of a relatively higher temperature range in a thermal image.

In another embodiment of the invention, the group selecting means selects a group of a highest temperature range as a group of a higher temperature range in a thermal image.

In another embodiment of the invention, the element classifying means includes means for determining the number of the groups, based on prescribed criteria.

In another embodiment of the invention, the criteria are rules of If-then forms based on the variance, the range and the maximum value of temperature data of respective elements included in the thermal image.

In another embodiment of the invention, the apparatus further includes: temperature detecting means for detecting a room temperature; and room temperature classifying means for determining into which of the at least two groups the detected room temperature is classified, wherein the group selecting means selects a group of a higher temperature range than the temperature range of the group determined by the room temperature classifying means, as a group of a relatively higher temperature range in the thermal image.

In another embodiment of the invention, the apparatus further includes: histogram producing means for producing a histogram of temperature data for all elements included in the thermal image; temperature selecting means for selecting temperature data of the largest frequency in the histogram as the room temperature; and room temperature classifying means for determining into which of the at least two groups the temperature data selected as the room temperature is classified, wherein the group selecting means selects a group of a higher temperature range than the temperature range of the group determined by the room temperature classifying means, as a group of a relatively higher temperature range in the thermal image.

In another embodiment of the invention, the apparatus further includes: frequency counting means for counting, for each of the plurality of elements included in the thermal image, the frequency that the element belongs to the group selected by the group selecting means; and template producing means for producing a template for specifying elements having relatively larger frequencies in the thermal image as elements representing at least a portion of a heating device, wherein the element selecting means selects, among elements obtained by removing the elements specified by the template producing means from elements belonging to the selected group, elements having temperature data indicative of local temperature peaks in the thermal image as elements representing at least a portion of the object.

In another embodiment of the invention, the apparatus further includes template updating means for updating the template every predetermined time.

In another embodiment of the invention, the apparatus further includes: frequency counting means for counting, for each of the plurality of elements included in the thermal image, the frequency that the element belongs to the group selected by the group selecting means; and template producing means for producing a template for specifying elements having relatively larger frequencies in the thermal image as elements indicative of at least a portion of a heating device, wherein the element classifying means classifies elements obtained by removing the elements specified by the template producing means from the plurality of elements included in the thermal image into at least two groups.

In another embodiment of the invention, the apparatus further includes template updating means for updating the template every predetermined time.

In another embodiment of the invention, the detecting region is divided into a plurality of blocks, and the apparatus further includes: block selecting means for selecting one of the plurality of blocks as a function of the elements selected by the element selecting means; and position output means for outputting the position of the block selected by the block selecting means as the position of an object which exists on the detecting region.

In another embodiment of the invention, the block selecting means includes: storing means for storing the relationships between the plurality of blocks and the plurality of elements included in the thermal image; and block specifying means for specifying blocks corresponding to the elements selected by the element selecting means, by referring the storing means.

In another embodiment of the invention, the apparatus further includes: object region specifying means for specifying a region composed of elements selected by the element selecting means, and elements depending on the selected elements among the elements in the group selected by the group selecting means, as a region representing an object, wherein the block selecting means includes: storing means for storing the relationships between the plurality of blocks and the plurality of elements included in the thermal image; block specifying means for specifying, for each element included in one region specified by the object region specifying means, a block corresponding to the element by referring the storing means; and largest frequency block selecting means for selecting, for the region specified by the object region specifying means, a block which is most frequently specified by the block specifying means.

In another embodiment of the invention, the apparatus further includes: storing means for storing positions of first blocks in the detecting region selected for a first thermal image by the block selecting means and positions of second blocks in the detecting region selected for a second thermal image by the block selecting means; object tracing means for calculating all distances between the positions of the first blocks and the positions of the second blocks and for combining the first blocks with the second blocks so that the sum of the distances is minimized, as the positional change of an object; movement calculating means for calculating the amount of movement of the object, based on the distance between one of the first blocks and one of the second blocks which are combined by the object tracing means; and movement condition determining means for determining the movement condition of the object by accumulating the amount of movement of the object for each thermal image.

In another embodiment of the invention, the apparatus further includes: frequency counting means for counting, for each element of a thermal image, the frequency that a local temperature peak is located at the element, based on the output from the element selecting means, every time when a thermal image is obtained by the temperature distribution detecting means; probability calculating means for calculating, for each element of the thermal image, the probability that a local temperature peak is located at the element, based on the frequency counted by the frequency counting means; entropy calculating means for calculating an entropy regarding the probability calculated by the probability calculating means; and movement condition determining means for determining the movement condition of an object based on the value of the entropy calculated by the entropy calculating means.

Thus, the invention described herein makes possible the following advantages.

(1) To provide an occupant condition determining apparatus which can identify the number of occupants in a specific region in the following manner. First, elements in a thermal image obtained from the thermal distribution in the specific region are classified based on their temperatures. Then, the elements of relatively higher temperatures are selected as elements representing occupants, and the number of local temperature peaks are counted for the selected elements, whereby the number of occupants can be identified.

(2) To provide an occupant condition determining apparatus which can realize more comfortable air-conditions by controlling in the following manner. First, by using rules for determining the number of groups into which the elements are classified depending on the feature amount of the thermal image, the classifying of elements can be accomplished at a time without performing the classification several times for a plurality of groups. Thus, the occupant conditions can be grasped in a shorter time period, and more comfortable air-conditions can be realized.

(3) To provide an occupant condition determining apparatus which can identify the number of occupants in a specific region in the following manner. Based on the temperature of the specific region obtained by a temperature sensor such as a thermistor, elements having relatively higher temperatures are selected as elements of occupants. The number of occupants in the specific region is determined by counting the number of local temperature peaks for the selected elements.

(4) To provide an occupant condition determining apparatus which can identify the number of occupants in the following manner. A histogram is produced from a thermal image, and a temperature of a specific region is presumed from the temperature corresponding to the largest count. Thus, regions representing occupants can accurately be segmented without using a sensor such as a thermistor, and the number of occupants can be identified.

(5) To provide an occupant condition determining apparatus which can distinguish occupants from background in the following manner. First, the selected frequency as an element of an occupant is stored for each element. Elements are classified based on the frequencies, and a region composed of elements which belong to a group of larger frequency is regarded as a heat source which stays at one and the same position, thereby distinguishing the occupants from background.

(6) To provide an occupant condition determining apparatus which can determine the positions of occupants in a specific region using a thermal image in the following manner. First, relationships between elements of the thermal image and predetermined detecting blocks of a detecting region are stored. By selecting a detecting block at a position of local temperature peak which corresponds to a representative element of an occupant, the position of the occupant in a specific region is determined from the thermal image.

(7) To provide an occupant condition determining apparatus which can determine the positions of occupants in the following manner. For all elements constituting each area determined as an occupant, detecting blocks related thereto are selected. Then, by selecting a detecting block of the largest selection frequency, the position of an occupant is determined, irrespective of the posture of the occupant.

(8) To provide an occupant condition determining apparatus which can determine the activities of occupants in a specific region in the following manner. Based on positional determination results for two successive thermal images, all distances between detecting blocks between the determination results are calculated. The detecting blocks which give the minimum sum of distances are regarded to indicate the positional change of the detecting blocks by the movement of an occupant. Thus, the movement of the occupant is traced, and the move amount is calculated, thereby determining the activities of the occupants.

(9) To provide an occupant condition determining apparatus which can determine the activities of occupants in a specific region in the following manner. The appearance probability of occupant is calculated for each element, based on the appearance frequency of local temperature peak, and the entropy is calculated. Thus, even in a situation where the trace of occupants is difficult, the activities of the occupants can be determined.

These and other advantages of the present invention will become apparent to those skilled in the art upon reading and understanding the following detailed description with reference to the accompanying figures.

BRIEF DESCRIPTION OF THE DRAWINGS

FIG. 3 shows a scanning-type pyroelectric sensor as an example of a room temperature distribution sensing section.

FIG. 4 shows an exemplary data set of a thermal image.

FIG. 5 shows an exemplary room space to be sensed.

FIG. 6 shows an exemplary data set of a thermal image in a room.

FIG. 7 shows an exemplary selection of elements corresponding to occupant regions.

FIG. 8 shows an exemplary search for temperature peaks.

FIG. 13 shows the element selection in the case of two clusters.

FIG. 14 shows the element selection in the case of three clusters.

FIG. 15 shows the element selection in the case of four clusters.

FIG. 16 shows the element selection in the case where the fuzzy C-means algorithm is used (an attribute value is 0.5).

FIG. 17 shows the element selection in the case where the attribute value is reduced.

FIG. 22 shows an exemplary temperature data set of a thermal image in the case of four groups.

FIG. 23 is a flowchart illustrating an operational procedure for the apparatus of the third example according to the invention.

FIG. 24 illustrates the concept for the temperature group selection depending on temperatures.

FIG. 25 is a block diagram of an apparatus of a fourth example according to the invention.

FIG. 26 is a flowchart illustrating an operational procedure for the apparatus of the fourth example according to the invention.

FIG. 27 shows an exemplary presumption of a room temperature using a histogram.

FIG. 28 is a block diagram of an apparatus of a fifth example according to the invention.

FIG. 30 shows an example of a room in which occupants and heating devices are both included.

FIG. 31 shows an exemplary thermal image of a room without occupants (i.e., there exist only heating devices).

FIG. 32 shows an exemplary thermal image of a room in which occupants and heating devices are both included.

FIG. 33 shows an exemplary template of heating devices.

FIG. 34 shows an exemplary memory for storing a frequency distribution.

FIG. 35 shows an exemplary frequency distribution obtained from fifty-five thermal images.

FIG. 36 shows a result obtained by removing heating devices from a thermal image using a template of heating devices.

FIG. 40 shows relationships between detecting blocks and elements.

FIG. 44 shows a thermal image including a standing occupant.

FIG. 45 shows the determination result of occupant regions in the thermal image shown in FIG. 44.

FIGS. 50A and 50B show exemplary thermal images obtained before and after the movements.

FIGS. 54A and 54B show exemplary appearance probabilities of occupants.

FIG. 55 shows a construction of an air conditioning apparatus to which the occupant condition determining apparatus of the invention is applied.

DESCRIPTION OF THE PREFERRED EMBODIMENTS

Hereinafter, examples of the occupant condition determining apparatus according to the invention will be described with reference to the corresponding figures.

EXAMPLE 1

Figure 1:
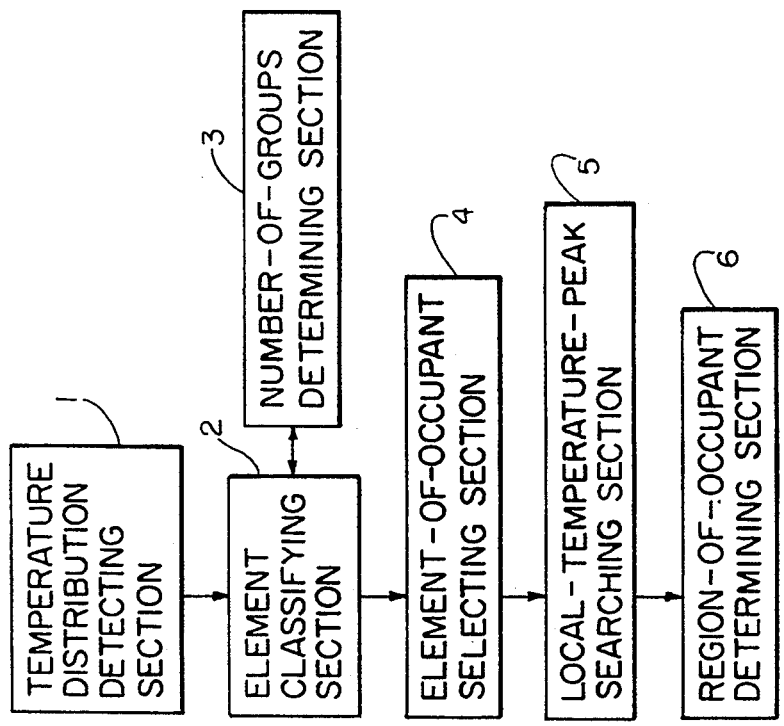
FIG. 1 is a block diagram of an apparatus of a first example according to the invention.

FIG. 1 shows a construction of an occupant condition determining apparatus of a first example. As is shown in FIG. 1, the apparatus of the first example includes a temperature distribution detecting section 1, an element classifying section 2, a number-of-groups determining section 3, an element-of-occupant selecting section 4, a local-temperature-peak searching section 5, and a region-of-occupant determining section 6. The temperature distribution detecting section 1 measures the temperature distribution in a room. The element classifying section 2 classifies elements of a thermal image obtained by the temperature distribution detecting section 1 into at least two groups based on the temperatures. All the elements belonging to one group are in a certain temperature range, and the temperature range of the group is distinct from the temperature range of another group. The number-of-groups determining section 3 determines the number of groups into which the elements are classified by the element classifying section 2 on the basis of prescribed criteria. The element-of-occupant selecting section 4 selects the elements belonging to at least one group of a relatively higher temperature range in the thermal image. For example, the element-of-occupant selecting section 4 selects the elements belonging to the group of the highest temperature among the groups into which the elements are classified by the element classifying section 2, as elements representing occupants. The local-temperature-peak searching section 5 searches the elements selected by the element-of-occupant selecting section 4, so as to find out elements having local temperature peaks in the thermal image, and gives different labels to the elements having different local temperature peaks as representative elements representing individual occupants. The local-temperature-peak searching section 5 also outputs the number of the elements having different local temperature peaks as the number of occupants to an external apparatus. The region-of-occupant determining section 6 gives the same labels to elements to which labels are not given by the local-temperature-peak searching section 5 as the labels of the elements having the local temperature peaks to which the elements belong, and determines a region composed of elements having the same label as an occupant. The region-of-occupant determining section 6 also may output the position of the region as the position of the occupant to an external apparatus.

Figure 2:
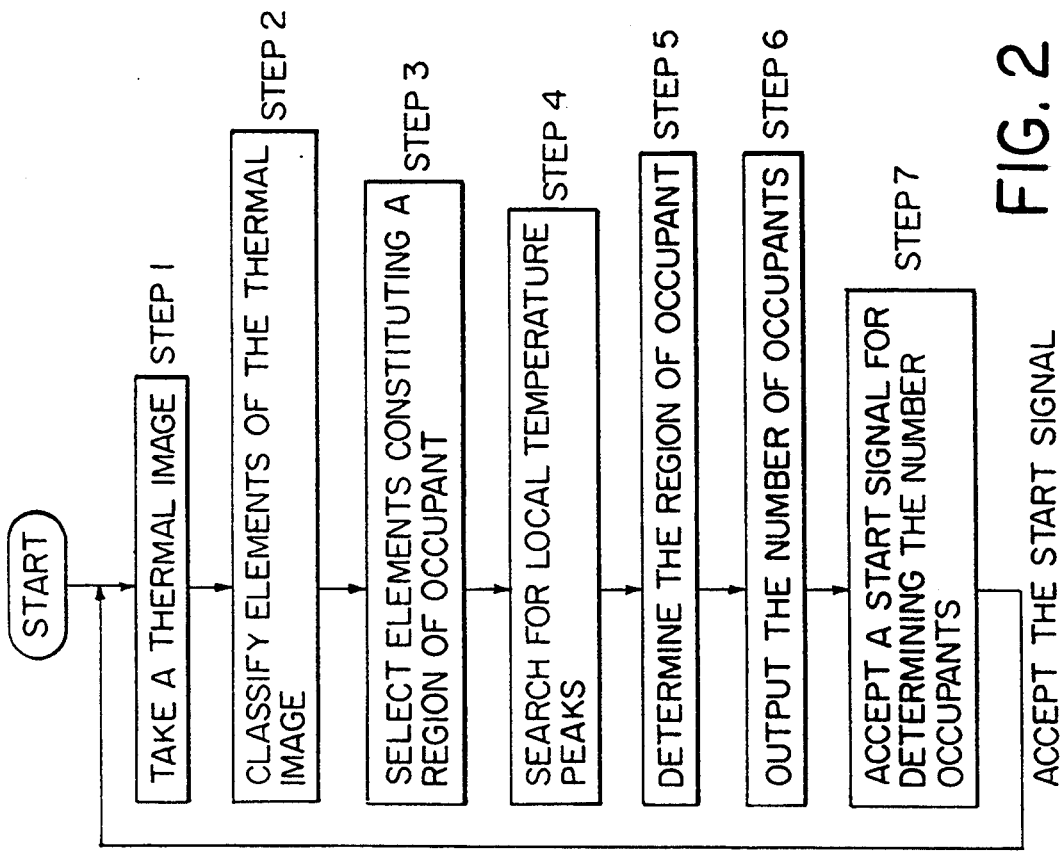
FIG. 2 is a flowchart illustrating an operational procedure for the apparatus of the first example according to the invention.

The operation of the occupant condition determining apparatus of the first example having the construction described above will be described with reference to a flowchart shown in FIG. 2. FIG. 3 shows a scanning-type infrared ray sensor in which eight pyroelectric elements are arranged in a line, as an example of the temperature distribution detecting section 1. When the sensor is located at a height of 2.4 meters and a tilt angle of 25°, and its scanning angle is set to be 72°, the sensor has a detectable range of about 6 meters square. FIG. 4 shows data of a thermal image obtained in the case where a person is standing in front of the sensor at a distance of 2 meters therefrom. The scanning operation by the sensor is performed by 20 steps, and the thermal image is composed of 160 (8×20) elements (temperature data). A region representing an occupant has relatively high temperatures in the thermal image and is indicated by a thick line in FIG. 4.

In order to more specifically show the effect of the apparatus of this example, the operational procedure of the apparatus will be described by using experimental data obtained in a conference room in which desks are arranged as is shown in FIG. 5.

Step 1

The temperature distribution in the room space is measured by the temperature distribution detecting section 1, so as to obtain a thermal image. FIG. 6 shows an exemplary data set of the thermal image when five occupants exist at positions indicated by numbers 1 to 5 in FIG. 5. Since the thermal image in FIG. 4 is obtained in a cool condition and hence the environmental temperature is apparently lower than the temperature of occupant, the regions representing occupants can relatively easily be identified by an observer. However, since the environmental temperature is relatively high in a space of a usual office, it is understood that it is difficult for an observer to identify the regions representing occupants.

Step 2

The thermal image has a plurality of elements each having temperature data. The elements of the thermal image are classified into at least two groups based on the temperature data thereof by the element classifying section 2. In this step, the number of groups is appropriately determined by the number-of-groups determining section 3. The method for classifying will be described below in detail.

Step 3

Based on the classifying result in Step 2, the elements belonging to a group of the highest temperature level are selected as elements constituting regions representing occupants by the element-of-occupant selecting section 4. In other words, the elements are classified into groups of a plurality of temperature levels, and the elements of relatively higher temperatures in the thermal image are selected as elements of occupants. In FIG. 7, the elements selected as those of occupants are marked with circles.

Step 4

Figure 9:
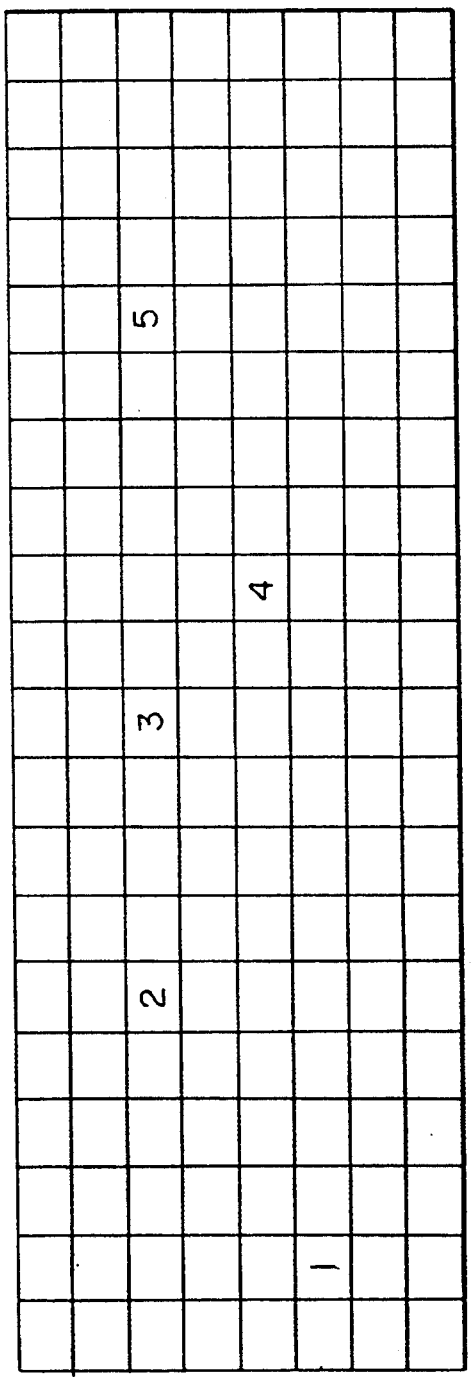
FIG. 9 shows exemplary labels given to temperature peaks.

The elements selected in Step 3 are searched for a local temperature peak where the temperature of the element is locally higher than those of neighbor parts thereof in the thermal image by the local-temperature-peak searching section 5. The search is performed in the following manner. First, for each of the selected elements, one element having the largest temperature value of the 8-neighbors of the selected element is found. If the found element has a higher temperature value than that of the selected element, the selected element stores the position of the found element. In such a case, a relationship between the found element and the selected element is defined as "the selected element depends on the found element". If the temperature values of the 8-neighbors are not higher than that of the selected element, the selected element stores its position. The element which stores its position is regarded as an element having a local temperature peak. FIG. 8 shows an exemplary search for local temperature peaks. Each arrow in FIG. 8 is directed to an element whose position is stored for each selected element. Each element having the found local temperature peak is given a distinct label, as is shown in FIG. 9. The local-temperature-peak searching section 5 includes a memory for storing the given labels. In the example shown in FIG. 9, the labels of different natural numbers (i.e., 1, 2 .... ) are given to the elements having the respective local temperature peaks.

Step 5

Figure 10:
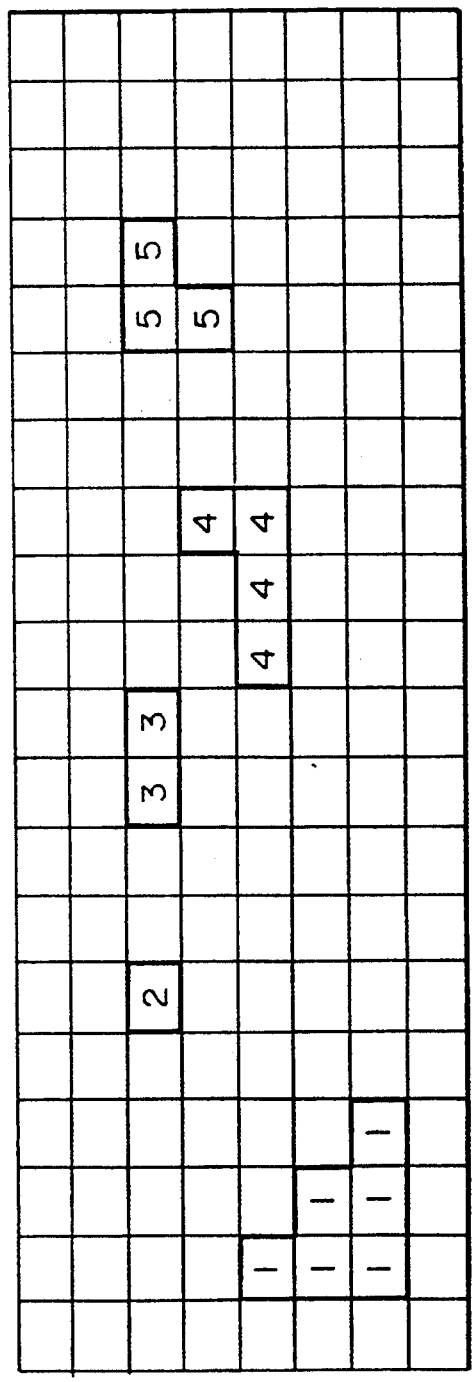
FIG. 10 shows an exemplary determination of occupant regions.

Each of the elements other than the elements having the local temperature peaks found in Step 4 is given the same label as that given to the element whose position is stored for the element during the temperature peak searching. The labeling is repeatedly performed until all the elements selected in Step 3 are given respective labels. This means that the elements searched by the local-temperature-peak searching section 5 and the elements depending on the local temperature peaks among the elements selected by the element-of-occupant selecting section 4 have the same labels. FIG. 10 shows the result of the labeling. In FIG. 10, a region having the same label and marked by a thick line represents an occupant. Note that the given labels correspond to the positions of occupants shown in FIG. 5.

Step 6

The number of distinct labels which are given to the regions in Step 5 is counted, and the count is output as the number of occupants in the room. In this example, as is shown in FIG. 9, the labels of natural numbers are given, so that it is sufficient to output the maximum value of the labels.

Step 7

A start signal for determining the number of occupants is received from an external apparatus on which the apparatus of this invention is mounted. If the start signal for determining the number of occupants is received, the procedure returns to Step 1, and a thermal image is taken.

Figures 11, 12:
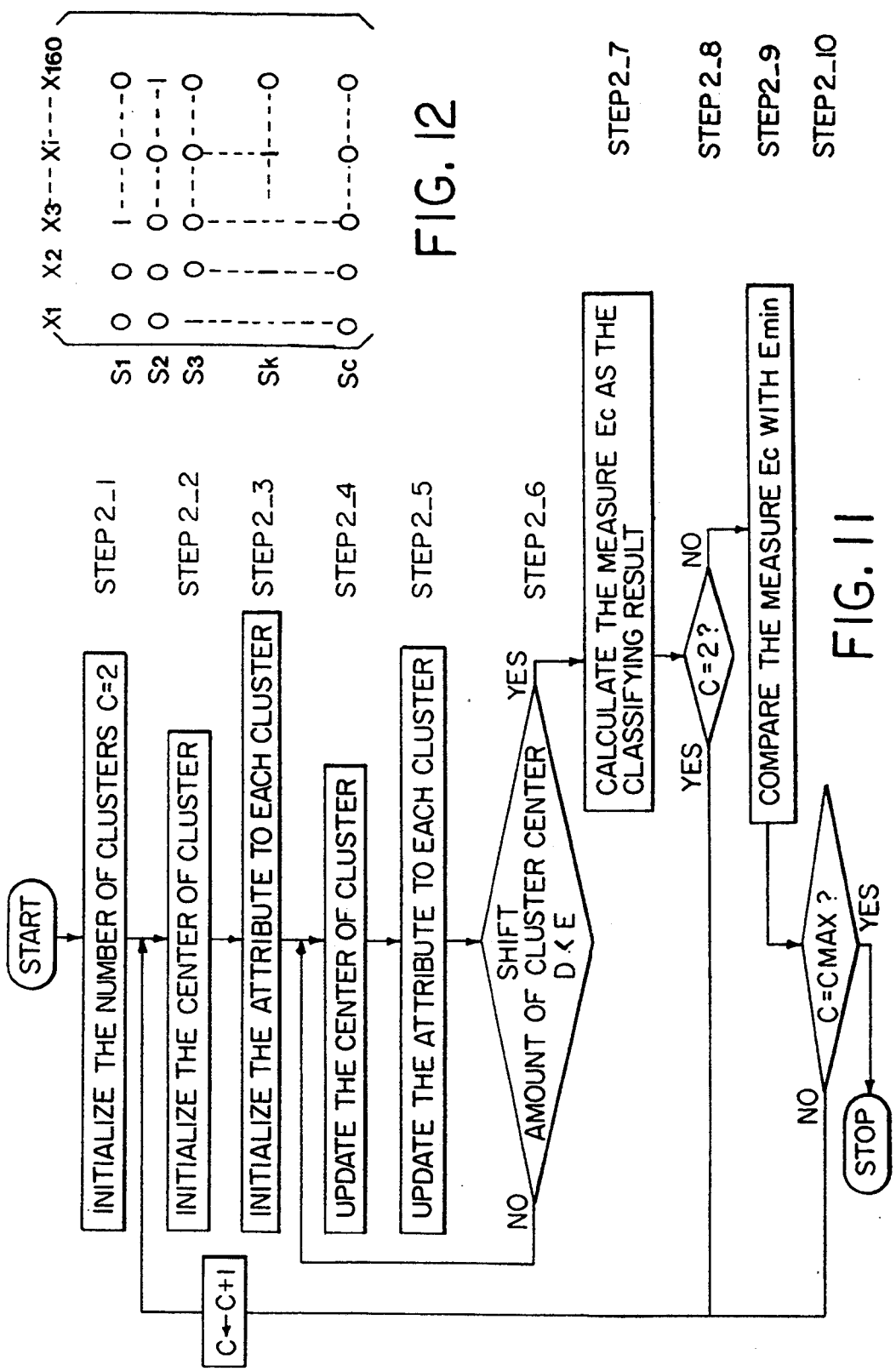
FIG. 11 is a flowchart illustrating an operational procedure of an element classifying section.
FIG. 12 shows an exemplary memory for storing classifying results.

As the result of the above operating procedure, the number of occupants can be determined. The operations of the element classifying section 2 and the number-of-groups determining section 3 in Step 2, and the method for selecting the elements constituting occupant regions in Step 3 will be described in detail by using the flowchart of FIG. 11.

When a region having a relatively higher temperature in a thermal image is to be segmented, in general, the segmentation is performed by classifying elements based on whether the temperature value of each element is over or below a predetermined threshold value (temperature). However, the determination of the threshold value offers a difficult problem. For example, assume that a fixed threshold is given. In this case, when the temperature of the thermal image is entirely high or low, the background region is erroneously segmented as an occupant, or the region where an occupant actually exists is not segmented. That is, the regions of relatively higher temperatures in the thermal image cannot be stably segmented. According to the present invention, in order to segment elements of relatively higher temperatures in the thermal image without previously setting a threshold value, the elements are classified based on the temperature values thereof by a clustering method. In the clustering method, data are classified into several groups based on similarity. Such groups are referred to as clusters.

Hereinafter, the procedure for classifying elements is described when a clustering method called the C-means algorithm is used. Temperature data of elements to be classified are represented by $X = \{x_1, x_2, ..., x_n\}$. For example, in a case where the thermal images shown in FIGS. 4 and 6, n=160.

Step 2_1

The number c of clusters is initialized to be 2. That is, the temperature data is initially classified into two groups. The maximum value $c_{max}$ of the number of clusters is previously given. In this example, $c_{max}$ is assumed to be 4. Hereinafter, the clusters are indicated by $S_1, S_2, ..., S_c$.

Step 2_2

A cluster center is initially set. The cluster center is a representative point which characterizes the cluster. In this example, the cluster centers are the data closest to the points obtained by dividing the range R of temperature data X in Expression (1) into equal (c-1) parts. Hereinafter, the cluster centers are represented by $v_1, v_2, ..., v_c$.

$$X_{min}, \{X_{min}+R/(c-1)\}, \{X_{min}+2R/(c-1)\}, ..., \{X_{min}+(c-2)R/(c-1)\}, X_{max} \quad (1)$$

$$R = X_{max} - X_{min}$$

where $X_{max}$ and $X_{min}$ denote the maximum value and the minimum value of the data X, respectively.

Step 2_3

The temperature data X is initially classified into clusters $S_1, S_2, ..., S_c$ on the basis of Expression (2).

$$x_i \in S_k: \min_k \{|x_i - v_k|^2\} \quad (2)$$

Specifically, distances from certain temperature data $x_i$ to the respective cluster centers $v_1, v_2, ..., v_c$ are calculated. The data $x_i$ belongs to a cluster $S_k$ which provides the minimum distance between the data $x_i$ and a cluster center $v_k$. The number-of-groups determining section 3 includes two attribute memories shown in FIG. 12. If the data $x_i$ belongs to the cluster $S_k$, a value "1" is stored in the memory. If the data $x_i$ does not belong to the cluster $S_k$, a value "0" is stored. One of the two attribute memories is provided for storing the classifying result, and the other is used during the classifying process. Note that there is no possibility that one piece of data belongs to two or more clusters at a time.

Step 2_4

Based on the stored contents of the attribute memories, data belonging to each cluster is specified, and the cluster centers $v_1, v_2, ..., v_c$ are updated by using the belonging data. In the C-means algorithm, the cluster centers are updated on the basis of Expression (3).

$$v_k = \sum_{x_i \in S_K} x_i / n_k \quad (3)$$

where $n_k$ denotes the number of data $x_i$ belonging to the cluster $S_k$.

Step 2_5

In the same manner as in Step 2_3, by using the cluster centers which are updated in Step 2_4, the attribute of the data $x_i$ is updated by Expression (2).

Step 2_6

A shifted amount D of the cluster center is examined by Expression (4), and the amount D is compared with a prescribed convergence judging value $\epsilon$. The value $\epsilon$ is set to be a very small value such as 0.001. If $D > \epsilon$, the procedure proceeds to Step 2_4. If $D < \epsilon$, it is judged that the classifying process for the current number of clusters is finished, and the procedure proceeds to Step 2-7.

$$D = \sum_{K=1}^{c} |v_k^{new} - v_k^{old}|^2 \quad (4)$$

where $v_k^{old}$ and $v_k^{new}$ denote the cluster centers before and after the update in Step 2_4, respectively.

Step 2_7

The classifying result is evaluated by using Expression (5). The measure $E_c$ is referred to as the Davies and Bouldin's measure. The smaller the value of the measure, the more valid the classifying result is. In the physical terms, the more separate are the clusters (i.e., the larger the distance $T_{kj}$ between cluster centers is), and the more compact each of clusters is, the more valid the classifying result is. In this example, $E_c$ is calculated based on some numbers of clusters. The number of clusters, that is, the classifying result which provides the minimum $E_c$ is adopted.

$$E_c = \sum_{k=1}^{c} R_k / c \quad (5)$$

$$R_k = \max_{j: j \neq k} \{(\sigma_k + \sigma_j)/T_{kj}\}$$

$$\sigma_k = \sum_{x_i \in S_k} |x_i - v_k|^2 / n_k$$

$$T_{kj} = |v_k - v_j|^2$$

Step 2_8

If c=2, the classifying result is stored in the memory for storing the classifying result, and the measure $E_{min}$ calculated in Step 2_7 is stored. Then, c is increased by 1, and the procedure proceeds to Step 2-2. If c≠2, the procedure proceeds to Step 9.

Step 2_9

The measures $E_c$ and $E_{min}$ calculated in Step 2-7 are compared with each other. If $E_c < E_{min}$, the current classifying result which provides $E_c$ is stored in the memory for storing the classifying result, and $E_c$ is substituted for $E_{min}$.

Step 2_10

If $c = c_{max}$, the classifying process is terminated. At this time, the memory for storing the classifying result stores the classifying result obtained by using the number c of clusters which provides $E_{min}$. If $c \neq c_{max}$, c is increased by 1 and the procedure proceeds to Step 2_2.

Referring back to Step 3 in FIG. 2, a method for selecting elements belonging to a group of the highest temperature level as elements constituting a region representing an occupant is specifically described. Based on the classifying result obtained by Steps 2_1 to 2_10, for a cluster $S_k$ having a maximum one of the cluster centers which are calculated by Expression (3), i.e., for a cluster $S_k$ having the maximum average temperature, data $x_i$ having the attribute value "1" which is stored in the memory for storing the classifying result are selected.

FIGS. 13 to 15 show the examples of thermal images in which the regions representing occupants are segmented out as the result of Steps 2-1 to 2-10 and Step 3. FIGS. 13 to 15 correspond to the cases where the numbers of clusters are 2 to 4, respectively. In a case where four occupants exist at positions 2 to 5 in FIG. 5, the thermal image should exhibit four occupants. However, in FIG. 13, the background is segmented as well as the occupants, so that it is impossible to identify the number of occupants. With regard to the example of FIG. 13, the measure $E_2 = 0.548$. With regard to the example of FIG. 14, the measure $E_3 = 0.263$ which is improved as compared with the measure $E_2$ in the example of FIG. 13. Thus, four occupants can relatively easily be specified. With regard to the example of FIG. 15, the number of occupants can more easily identified, and the measure $E_4 = 0.214$ is also improved as compared with the measure $E_3$ in the example of FIG. 14. Therefore, it is understood that the segmentation for identifying the number of occupants is correctly performed by the use of the number of clusters determined by the measure of Expression (5).

In the above description, the operational procedure of the apparatus is described in the case where the elements are classified by using the C-means algorithm. However, the attribute values which indicate that data belongs to a cluster are only binary {0, 1} in the C-means algorithm. There is a fuzzy C-means algorithm as a type of clustering method in which the attribute values are expanded to an interval [0, 1]. The fuzzy C-means algorithm can be applied to the operational procedure.

Hereinafter, the fuzzy C-means algorithm is first described in a comparative manner with the C-means algorithm, and then the measure of the classifying result shown by Expression (5) is expanded for the fuzzy C-means algorithm. Thereafter, the effect in this example obtained when the fuzzy C-means algorithm is used is described referring to the actual data.

The C-means algorithm is a clustering method in which the cluster center is treated as the average of data belonging to a cluster as expressed by Expression (3), and the attribute and the cluster center are repeatedly updated, so as to minimize the sum of squares deviation expressed by Expression (6) below.

$$J = \sum_{k=1}^{c} \sum_{x_i \in S_k} |x_i - v_k|^2 \tag{6}$$

On the contrary to this, in the fuzzy C-means algorithm, the degree $u_{ik}$ that the data $x_i$ belongs to the cluster $S_k^f$ is considered, and a cluster having the minimum weighted sum of squares deviation in Expression (7) is obtained. The attribute value $u_{ik}$ takes a real value in the interval [0, 1].

$$J_m = \sum_{i=k}^{n} \sum_{k=1}^{c} (u_{ik})^m |x_i - v_k^f|^2 \tag{7}$$

$$\text{subject to } \sum_{n=1}^{c} u_{ik} = 1$$

where m denotes a real value which satisfies a condition of $0 \leq m < \infty$. Usually, m is often a value in the range of 1.5–4.0.

In the fuzzy C-means, the weighted average of data in Expression (8) is regarded as a cluster center.

$$v_k^f = \sum_{i=1}^{n} (u_{ik})^m x_i / \sum_{i=1}^{n} (u_{ik})^m \tag{8}$$

The update of the attribute value of data is performed on the basis of Expression (9) below.

$$u_{ik} = 1 / \left[ \sum_{j=1}^{c} \{|x_i - v_k^f|^2 / |x_i - v_j^f|^2\}^{1/(m-1)} \right] \tag{9}$$

Specifically, in the fuzzy C-means algorithm, the cluster center and the data attribute are repeatedly updated on the basis of Expressions (8) and (9), so as to perform the classifying process. The memory for storing the classifying result stores the attribute value $u_{ik}$.

When the fuzzy C-means algorithm is applied, the measure of the classifying result by Expression (5) is changed as shown in Expression (10) below. That is, the smallness of the cluster is evaluated by using the weighted average sum of squares deviation $\sigma_k^f$.

$$E_c = \sum_{k=1}^{c} R_k^f / c \tag{10}$$

$$R_k^f = \max_{j: j \neq k} \{(\sigma_k^f + \sigma_j^f) / T_{kj}^f\}$$

$$\sigma_k^f = \sum_{x_i \in S_k^f} |x_i - v_k^f|^2 / n_k$$

$$T_{kj}^f = |v_k^f - v_j^f|^2$$

FIG. 16 shows the result in the case where the above-described fuzzy C-means algorithm is applied to the thermal image shown in FIG. 15. The measures $E_c^f$ expressed by Expression (10) for two, three, and four clusters are $E_2^f = 0.333$, $E_3^f = 0.242$, and $E_4^f = 0.191$, respectively Thus the optimum number of clusters is four the same as in the case of the C-means algorithm. In FIG. 16, the data whose attribute value for the cluster having the maximum weighted average temperature is 0.5 or more is selected as data constituting a region representing an occupant. As is seen from FIG. 16, the result is substantially the same as in the example of FIG. 15. In the fuzzy C-means algorithm, the attribute value is given as a real value in the interval [0, 1]. By decreasing the attribute value regarding as elements of occupants within a range where the number of occupants identified by the temperature peak search and the labeling in Steps 4 to 6 remains the same as the number of occupants identified in a case where the attribute value is 0.5 or more, the regions having relatively higher temperatures in the thermal image can more correctly be segmented. FIG. 17 shows the data set which is selected when the attribute value is gradually decreased by 0.1 in the range where the number of occupants does not change from the result shown in FIG. 16 and the attribute value is 0.1 or more. The data which is indicated by hatching is additionally selected in comparison with those in FIG. 16, so that it is understood that the background and the occupants are more accurately separated.

As described above, according to the apparatus of the first example, the elements of the thermal image obtained from the room temperature distribution are classified based on the temperatures thereof, and the elements of relatively higher temperatures are selected as elements of occupants. Then, for the selected elements, the number of local temperature peaks is counted, so that the number of occupants in the room can be identified.

EXAMPLE 2

Figure 18:
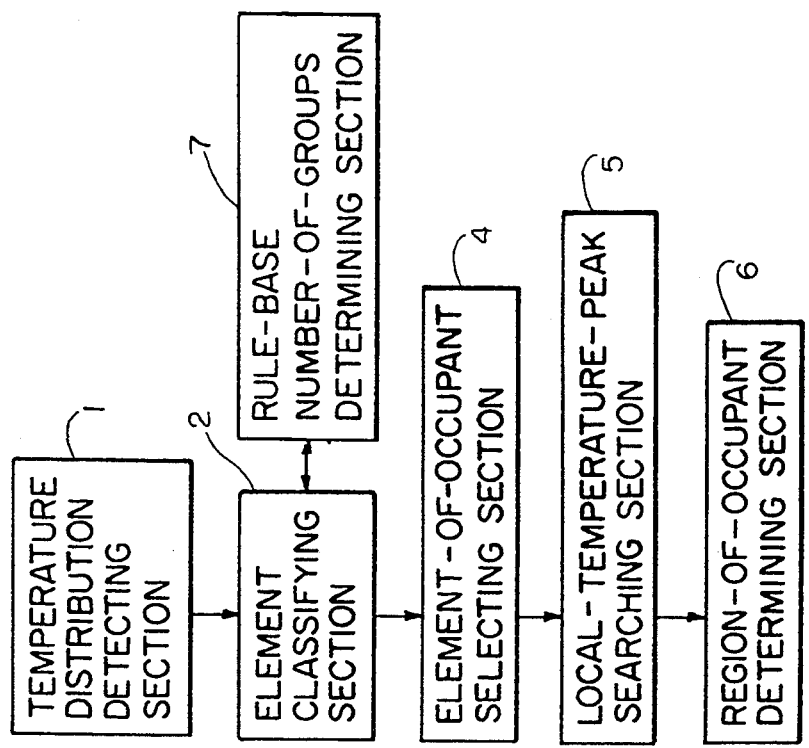
FIG. 18 is a block diagram of an apparatus of a second example according to the invention.

Next, the occupant condition determining apparatus of a second example is described with reference to FIG. 18. In FIG. 18, the same components have the same reference numerals as those in the first example, and the detailed descriptions thereof are omitted. The only difference between the apparatus of the second example and the apparatus of the first example is in that the number-of-groups determining section 3 in the first example is replaced by a rule-base number-of-groups determining section 7 which determines the number of groups into which elements are classified by using rules of If-then form which indicate the relationships between the feature amount of the thermal image and the number of groups into which elements are classified.

The rule-base number-of-groups determining section 7 stores rules for determining the number of groups, i.e., the number of clusters expressed by Expression (11).

If (Var is $V_{BIG}$) and (Rg is $R_{BIG}$) then c=2

If (Var is $V_{MEDIUM}$) and (Rg is $R_{MEDIUM}$) then c=3

If (Var is $V_{SMALL}$) and (Rg is $R_{SMALL}$) then c=4

If (Var is $V_{SMALL}$) and (Rg is $R_{SMALL}$) and ($D_{max}$ is $D_{SMALL}$) then "Nobody is in the room." (11)

Figure 19:
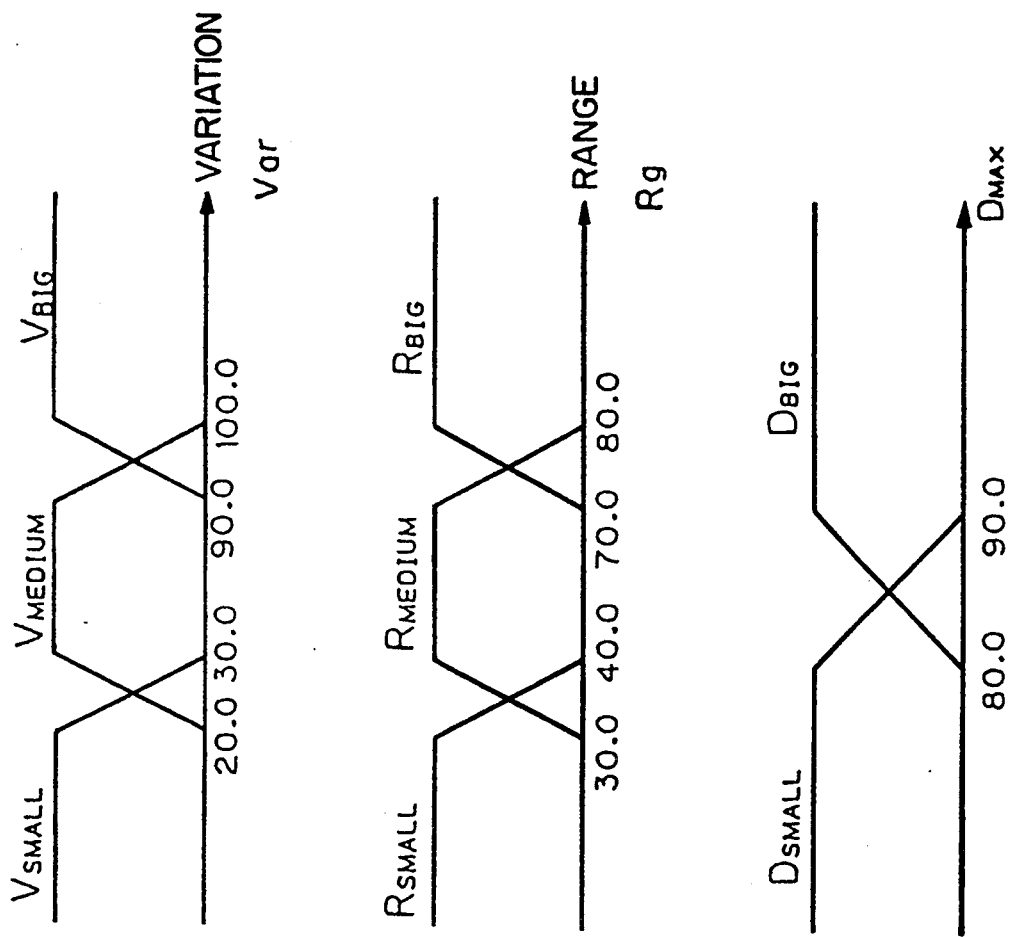
FIG. 19 shows an exemplary membership function.

In the above expression, Var denotes the variance of data $x_i$, Rg denotes the range of data, and $D_{max}$ denotes the maximum value of the data $x_i$. $V_{SMALL}$, $V_{MEDIUM}$, $V_{BIG}$, $R_{SMALL}$, $R_{MEDIUM}$, $R_{BIG}$, and $D_{SMALL}$ are membership functions shown in FIG. 19.

Figure 20:
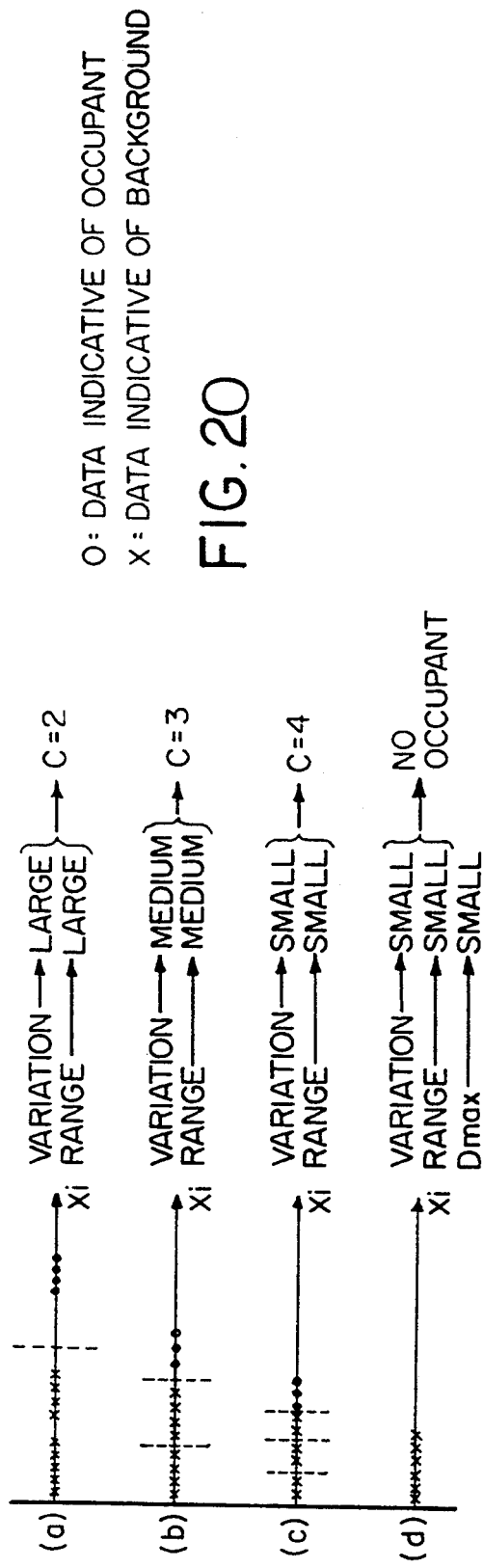
FIG. 20 shows various relationships between the feature of data and the number of clusters.

The rules expressed by Expression (11) are established based on the characteristics of temperature data of elements shown in FIG. 20. In FIG. 20, the notation of o is the temperature data representing occupants, and x is the temperature data representing background. In (a) of FIG. 20, two clusters are successful in separating the elements representing occupants from those of background. In this case, both the data variance and the data range are large. However, in the case of (b) of FIG. 20, the separation of data of occupants from data of background is not correctly performed by using two clusters, so that more than two clusters are needed. In the case of (c) of FIG. 20, the separation can only be attained by a further increased number of clusters, i.e., four or more. Therefore, as the data variance and the data range decrease, the larger number of clusters are needed. In the case of (d) of FIG. 20, i.e., in the case where the maximum value of data is small, it indicates that there is no heat source in the room. Thus, it is determined that there is "no occupant". In this example, the rules produced by using experiential knowledge based on various experimental data are expressed by Expression (11). The number of clusters are determined by using Expression (11) in the following manner. First, the variance, the range, and the maximum value of temperature data as feature amounts of a thermal image are obtained. Then, the membership values are calculated by the use of the membership functions shown in FIG. 19, and the suitability for each rule is obtained as a smaller one of the membership values. Finally, the number of clusters which is shown in the consequent part of the rule which gives the highest suitability is adopted.

The determination of the number of clusters in the first example is performed in the following manner. The number of clusters is changed and the clustering is performed for every number of clusters. Then, the results are evaluated by using the given evaluating expression. Accordingly, the clustering is required to be repeatedly performed the number of times equal to the number of changes in the number of clusters. Thus, it takes a long time to determine the number of occupants. On the contrary, in the second example, the number of clusters is determined by using the rules of Expression (11). Therefore, only one clustering is sufficient to determine the number of occupants, whereby the determination time is greatly shortened.

As described above, according to the second example, by using the rules of If-then form for determining the number of groups into which elements are classified based on the feature amounts of the thermal image, the classification of the elements into a plurality of groups can be performed at a time without repeating the classifications. Therefore, the occupant conditions can be grasped in a short time period. As a result, more comfortable air-conditions can be realized.

EXAMPLE 3

Next, the occupant condition determining apparatus of a third example is described. In the first example, only a group of highest temperature level is considered to be the group composed of elements of occupants. It is assumed that elements of a thermal image are classified into groups as shown in FIG. 22. In this case, an occupant who exists near the sensor is detected based on the elements belonging to a group a in FIG. 22. However, another occupant who exists far from the sensor is difficult to detect based on the elements belonging to a group b in FIG. 22. This is because the sensor outputs a relatively lower level for the far occupant. The objective of the apparatus of the third example is to eliminate the influence of distances from the sensor to the occupants as mentioned above.

Figure 21:
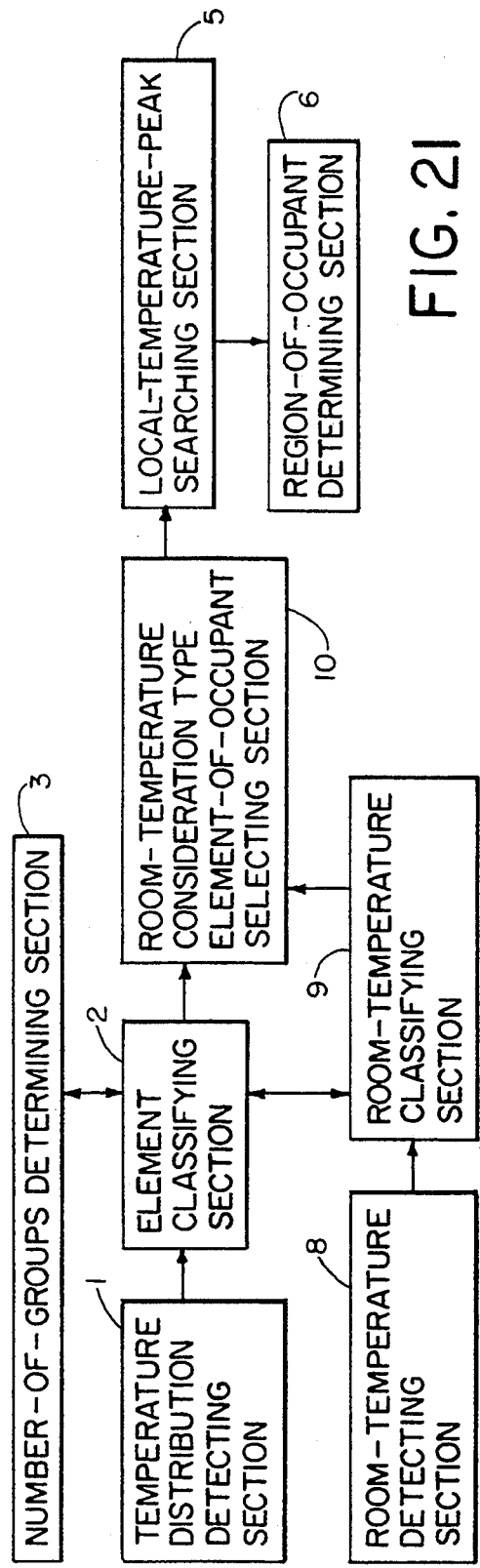
FIG. 21 is a block diagram of an apparatus of a third example according to the invention.

FIG. 21 shows a construction of the apparatus of a third example. In FIG. 21, the same components have the same reference numerals as those in the first example, and the detailed descriptions are omitted. The apparatus of the third example is different from the apparatus of the first example in that the apparatus of the third example additionally includes a room-temperature detecting section 8 for measuring the temperature in the room, a room-temperature classifying section 9 for classifying the room temperature detected by the room-temperature detecting section 8 into one of the groups classified by the element classifying section 2, and a room-temperature consideration type element-of-occupant selecting section 10 for selecting the elements belonging to groups of higher temperature levels than the group into which the room temperature is classified by the room-temperature classifying section 9. Herein, the "room temperature" is defined as the temperature of the sensor itself.

The operation of the occupant condition determining apparatus of the third example having the above-mentioned construction will be described with reference to a flowchart shown in FIG. 23. In the operation, Steps 1 to 2 and 6 to 9 in the third example are the same as Steps 1 to 2 and 4 to 7 in the first example, so that the detailed descriptions thereof are omitted.

Steps 1 and 2

Elements of a thermal image obtained by the temperature distribution detecting section 1 are classified by the element classifying section 2 based on the temperatures thereof.

Step 3

The room temperature is measured by the room-temperature detecting section 8 such as a thermistor or the like. For example, the room temperature at the time when the classifying result shown in FIG. 22 is obtained is 38.1. This value of 38.1 is a value obtained by converting the output of a pyroelectric sensor into a temperature.

Step 4

By the room-temperature classifying section 9, the room temperature detected by the room-temperature detecting section 8 is classified into one of the groups obtained by the element classifying section 2. For example, an average temperature of each group is obtained, and the room temperature is classified into a group so that the room temperature is closest to the average temperature of the group.

Step 5

By the room-temperature consideration type element-of-occupant selecting section 10, the elements belonging to the groups having higher temperature levels than that of the group to which the room temperature belongs in Step 4 are selected as elements of occupants. In other words, the elements belonging to the groups having lower temperature levels than the that of the group to which the room temperature belongs have relatively lower temperatures in the thermal image, so as to be regarded as elements of background. FIG. 24 shows the concept of this selection method.

Steps 6–9

Local temperature peaks are searched by the local-temperature-peak searching section 5, and each region representing an occupant is determined by the region-of-occupant determining section 6. Thus, the number of occupants is determined.

As described above, according to the apparatus of the third example, the elements of a thermal image are classified into groups based on the temperatures thereof, and the elements belonging to groups of higher temperatures than that of the group to which the room temperature belongs are selected as the elements representing occupants. Thus, elements of occupants which are far from the sensor can be correctly segmented, regardless of lower output from the sensor.

EXAMPLE 4

Next, the apparatus of a fourth example is described with reference to the corresponding figures. In the first example, the room temperature is detected by using hardware such as a thermistor, so that the construction of the occupant condition determining apparatus is complicated. The objective of the apparatus of the fourth example is to simplify the construction of the apparatus.

FIG. 25 shows the construction of the apparatus of the fourth example. The same components have the same reference numerals as those in the first example, The apparatus of the fourth example is different from the apparatus of the first example in that the apparatus of the fourth example additionally includes a histogram producing section 11 for producing a temperature histogram from the thermal image obtained by the temperature distribution detecting section 1, and a largest-frequency-temperature selecting section 12 for inputting the temperature of the largest frequency in the histogram produced by the histogram producing section 11 into the room-temperature classifying section 9 as the room temperature. By adding the above-mentioned sections, the room temperature can be detected only by a software without using hardware such as a thermistor, so that the construction of the occupant condition detecting apparatus can be simplified.

The operation of the occupant condition determining apparatus of the fourth example having a construction shown in FIG. 25 will be described with reference to a flowchart of FIG. 26. In the following description, Steps 1, 2 and 5–9 in the fourth example are the same as Steps 1, 3, and 5–9 in the third example, so that the detailed descriptions thereof are omitted.

Steps 1–2

Elements of a thermal image obtained by the temperature distribution detecting section 1 are classified by the element classifying section 2 based on the temperatures thereof.

Step 3

By the histogram producing section 8, a temperature histogram is produced for the thermal image obtained by the temperature distribution detecting section 1.

Step 4

By the largest-frequency-temperature selecting section 12, a representative value of a temperature level indicating the largest frequency in the histogram produced in Step 3 is regarded as a presumption value of the room temperature. The representative value may be a center value of the temperature level of the largest frequency, an average value of the temperatures of the elements belonging to the level, or the like. FIG. 27 shows an exemplary manner for presuming a room temperature. First, a temperature histogram is produced from the temperature data of FIG. 22 which is used in the description of the third example. The room temperature is presumed by using the histogram. The presumed room temperature is 37.5 (a value of converged output of a pyroelectric sensor), which is available as the presumed room temperature for the actually measured temperature of 38.1.

Steps 5-9

By the same procedure as in the third example, first, groups composed of elements representing occupants are selected by using the presumed room temperature in Step 4. Next, for the elements belonging to the selected groups, a region for an individual occupant is determined by the local-temperature-peak searching section 5 and the region-of-occupant determining section 6. Thus, the number of occupants is determined.

As described above, according to the apparatus of the fourth example, the room temperature is presumed from a temperature level corresponding to the largest frequency in the histogram. Thus, the regions representing occupants are correctly segmented without using a hardware sensor such as a thermistor, and the number of occupants can be determined.

EXAMPLE 5

Next, the apparatus of a fifth example will be described. When an infrared ray sensor is used as the temperature distribution detecting section 1 in Example 1, it is difficult to distinguish a human body from an object having a temperature close to that of the human body. This is because such an object appears in the thermal image when the amount of the infrared rays emitted from the object is close to that from the human body. For example, a work station, a personal computer, a printer, an OHP, or the like, which is usually located in an office may appear in the thermal image. If the air-conditioning is made only based on the thermo-load, it is unnecessary to distinguish the occupants from such heating devices. If the objective of the air-conditioning is directed to the air quality, i.e., the ventilation control, it is necessary to distinguish the occupants from such heating devices, because the $CO_2$ concentration in a room only depends on the occupants. The objective of the apparatus of the fifth example is to distinguish the occupants from the objects emitting infrared rays.

FIG. 28 shows the construction of the apparatus of the fifth example. Basically, the same components have the same reference numerals as those in the first example, and the detailed descriptions thereof are omitted. The apparatus of the fifth example is different from the apparatus of the first example in that the apparatus of the fifth example additionally includes a selection frequency storing section 13, and a heating-device-template storing section 14, and a template updating section 15. Every time when a thermal image is taken, the selection frequency storing section 13 updates and stores the selection frequencies selected as elements representing occupants for all the elements included in the thermal image based on the output of the element classifying section 2. The heating-device-template storing section 14 stores the positions in the thermal image of heating devices which are located in the room. The element classifying section 2 is activated at a predetermined time interval, and elements are classified based on the selection frequencies stored in the selection frequency storing section 13. As a result, a new template for specifying the region composed of elements belonging to a group of the largest frequency level as the heating device which is located at the same position for a long time is produced. When the new template is different from the template stored in the heating-device-template storing section 14, the contents of the heating-device-template storing section 14 are updated using the new template by the template updating section 15.

Figure 29:
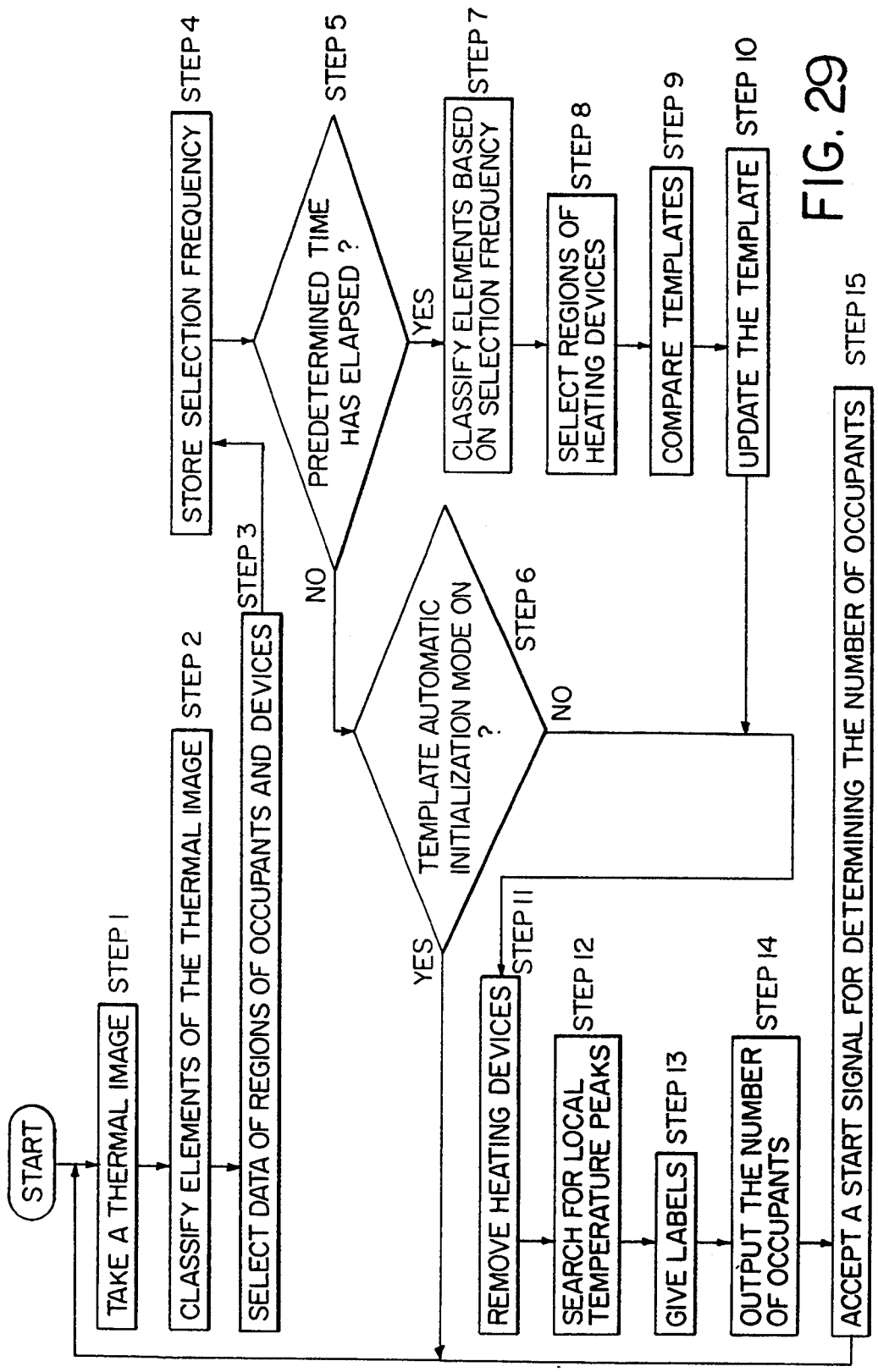
FIG. 29 is a flowchart illustrating an operational procedure for the apparatus of the fifth example according to the invention.

The operation of the occupant condition determining apparatus of the fifth example having the above construction will be described with reference to a flowchart shown in FIG. 29. In order to more specifically illustrate the operation of the apparatus of the fifth example, it is assumed that there are heating devices in the room as is shown in FIG. 30. A thermal image obtained in such a case will be described below.

For comparison, FIG. 31 shows an exemplary thermal image in the case where there is no occupant. In FIG. 31, there are three distinct regions 1, 2 and 3. The region 1 corresponds to an upper portion of a window which is heated by sunshine. The region 2 corresponds to an OHP. The region 3 corresponds to a CPU and a hard disk for a work station located on the floor. The region 3 has a large area along the scanning direction, because the region 3 corresponds to a position which is very close to the sensor.

Figures 33, 34:
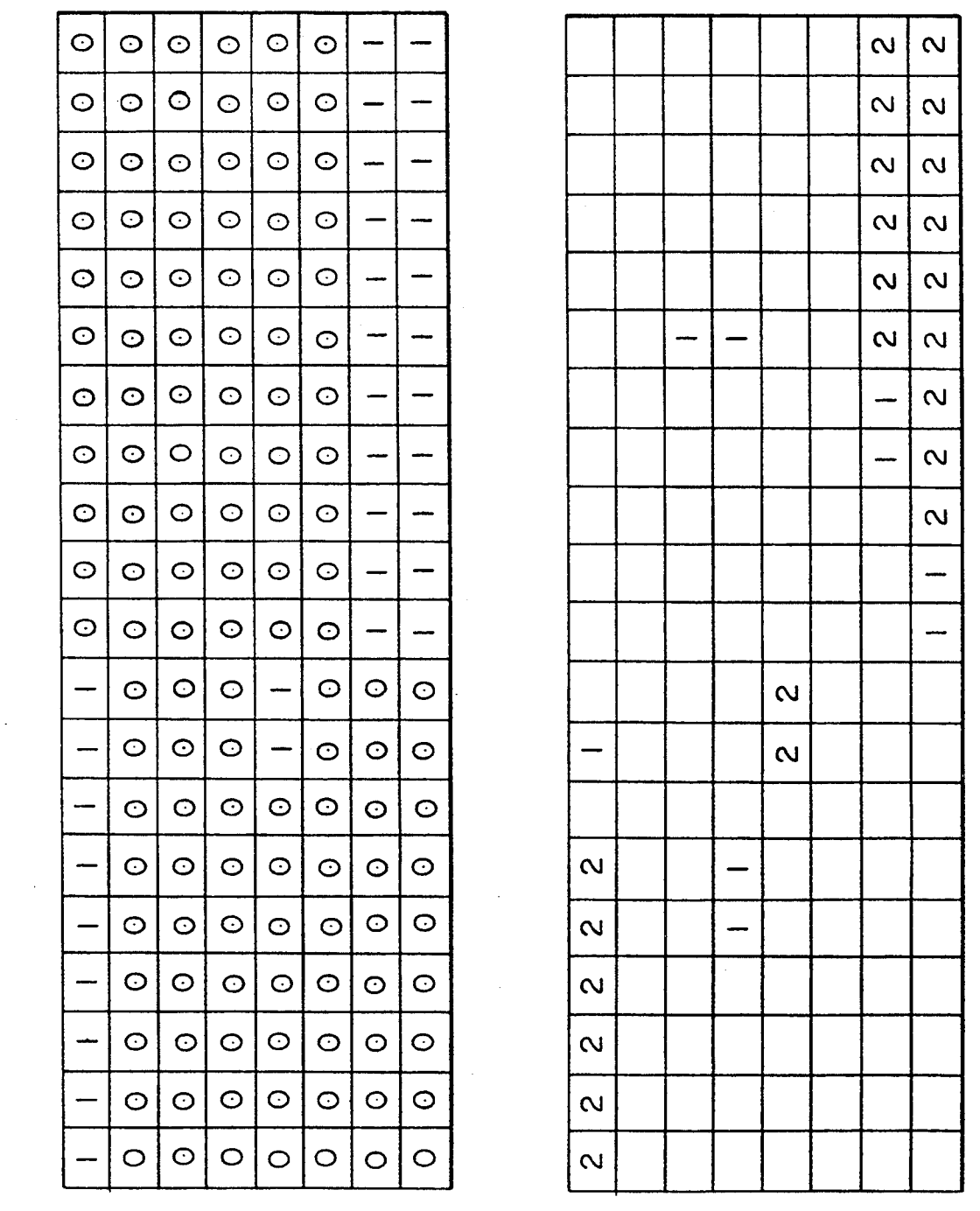

FIG. 32 shows an exemplary thermal image obtained in a case where two occupants exist at the positions indicated by 5 and 6 with circles in FIG. 30. As is seen from FIG. 32, it is impossible to distinguish a region representing an occupant from a region representing a heating device, only by segmenting the region having higher temperatures out of the thermal image. For this reason, in accordance with the procedure shown in the flowchart of FIG. 29, a heating device template is produced for removing heating devices from the thermal image, and updated, whereby the number of occupants other than heating devices in the room is identified. The heating-device-template storing section 14 includes memories arranged in two dimension as is shown in FIG. 33, and stores the positions in the thermal image of the heating devices located in the room. In the example of FIG. 33, the regions corresponding to the heating devices have a value of "1", and the remaining regions have a value of "0". In the operational procedure in the fifth example which is described blow, Steps 1–3 and 12–15 are the same as Steps 1–3 and 4–7 in the first example, and the detailed descriptions thereof are omitted.

Step 0

When a system including the apparatus of this example is used, a mode for initializing the template stored in the heating-device-template storing section 14 is selected. When a manual mode is selected, a user or a supplier stores an initial template by measuring the temperature distribution in the room in which the system is actually used. When an automatic initialization mode is selected (i.e., when an automatic initialization mode is ON), a template is automatically initialized in accordance with steps described below.

Steps 1-3

By the same procedure as Steps 1-3 in the first example, elements of the thermal image are classified into at least two groups, and elements belonging to a group of the highest temperature level are selected. However, at this time, the selected elements represent both occupants and heating devices as is shown in FIG. 32.

Step 4

The selection frequency stored in the selection frequency storing section 13 is increased by one for each element selected in Step 3. The selection frequency storing section 13 includes a memory for storing the selection frequencies of the elements selected as elements representing occupants. This memory has the same structure as that shown in FIG. 24. In FIG. 34, each value in the memory indicates the selection frequency of an element selected by the element-of-occupant selecting section 4 as an element representing an occupant or a heating device.

Step 5

It is determined whether a predetermined time period for updating the heating device template has elapsed or not. If the time period has elapsed, the procedure proceeds to Step 7. If the time period has not elapsed yet, the procedure proceeds to Step 6.

Step 6

It is checked whether the automatic initialization mode for the heating device template is ON or OFF. If ON, the procedure returns to Step 1, and a thermal image is taken. If OFF, through the step of removing the heating devices in Step 11, the number of occupants is identified in Steps 12-14.

Step 7

The elements are classified based on the selection frequency produced from the thermal images processed in a predetermined time period by the element classifying section 2. FIG. 35 shows an example of the distribution of the selection frequencies produced from 55 thermal images.

Step 8

As a result of the classification in Step 7, the elements belonging to the group of largest frequency level are selected as the elements representing the heating device. In FIG. 35, the elements having the frequencies with a notation o are the elements regarded as the heating devices as a result of the classification. As is seen from this figure, objects such as heating devices which do not move always appear in the thermal images, so that each of the selection frequencies of such elements is very much closer to the number of the taken thermal images. The template updating section 15 includes a memory for storing the selecting results. The memory has the same structure as that of the heating-device-template storing section 14. The template shown in FIG. 33 is produced from the element classifying result based on the frequencies shown in FIG. 35.

Step 9

For each element of the memory, a subtraction of the contents stored in the heating-device-template storing section 14 from the contents of the template updating section 15 is performed.

Step 10

As a result of the comparison in Step 9, if the memory stores at least one value other than "0" (±1), it is considered that the heating device is moved. Therefore, the contents of the heating-device-template storing section 14 are updated by the template stored in the template updating section 15. For example, in the case of the automatic template initialization, all the elements of the memory in the heating-device-template storing section 14 initially store "0", so that the contents of the template updating section 15 are directly used as an initial template. After the template is updated, the procedure proceeds to Step 11. When this step is first performed, the automatic initialization mode for the heating device template is turned OFF.

Step 11

By using the heating device template, the elements representing the heating devices are removed from all elements of the thermal image. Specifically, when the elements having the attribute value of "1" stored in the classifying result storing memory shown in FIG. 33 are selected as the elements representing occupants, the elements located at the positions where "1" is stored in the template are not selected. Specifically, the local-temperature-peak searching section 5 searches the elements except for elements specified by the heating device template for local temperature peaks in a thermal image. After removing the elements representing the heating devices, the number of occupants is identified by Steps 12-14. Alternatively, the flowchart can be modified so that the element classifying section 2 classifies the elements except for elements specified by the heating device template into at least two groups.

Figure 37:
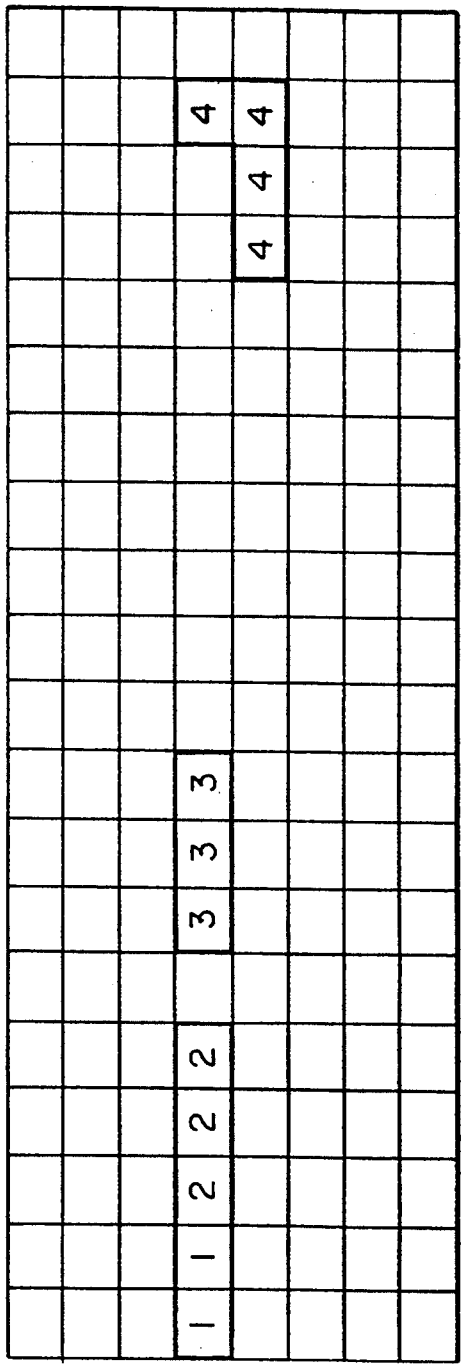
FIG. 37 shows an identification result of the number of occupants using a template of heating devices.

FIG. 36 shows an example in which the regions of occupants are identified by using the template shown in FIG. 33 as described above. The hatched portions in FIG. 36 are removed from the thermal image and it is judged that there are four occupants in the room as is shown in FIG. 37. The four occupants stay at positions indicated by numbers 1-4 with circles in FIG. 30.

As described above, according to the apparatus of the fifth example, the selection frequencies as an occupant or a heating device are stored for each element. The elements are classified based on the selection frequencies in the predetermined time period. The region at a position where the selection frequency is large, i.e., the region which always appears at the same position is regarded as a heating device. The position thereof is stored as a template, so that it is possible to distinguish the occupants from the objects emitting infrared rays. Thus, it is possible to perform the air-conditioning in view of the ventilation control. Moreover, the template is updated at a predetermined time interval, so that the movement of the heating devices can be accommodated.

EXAMPLE 6

Next, the occupant condition determining apparatus of a sixth example will be described. In the third example, the number of occupants in a room can be identified, but the positions of the individual occupants cannot be determined. Therefore, it is difficult to control the air-conditioning for each occupant. The objective of the apparatus of the sixth example is to determine the position of each occupant.

Figure 38:
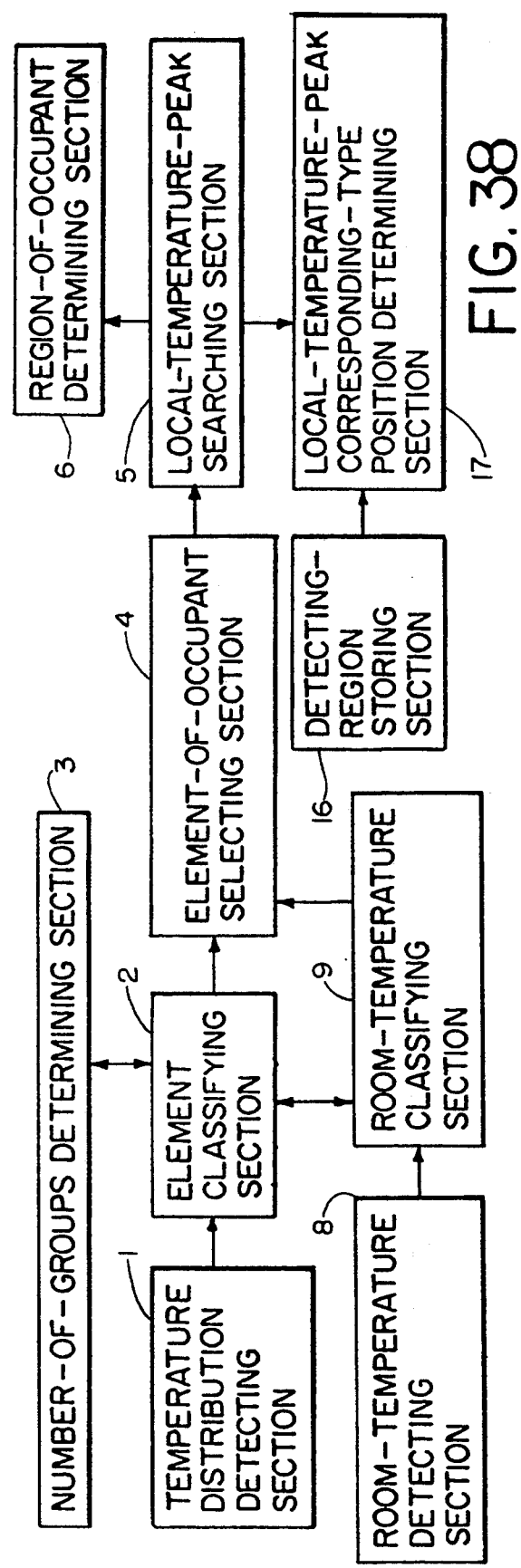
FIG. 38 is a block diagram of an apparatus of a sixth example according to the invention.

FIG. 38 shows the construction of the apparatus of the sixth example. The same components have the same reference numerals as those in the third example shown in FIG. 21, and the detailed descriptions thereof are omitted. The apparatus of the sixth example is different from the apparatus of the third example in that the apparatus of the sixth example additionally includes a detecting-region storing section 16 and a local-temperature-peak corresponding-type position determining section 17. A detecting region is divided into a plurality of detecting blocks. Each element of a thermal image corresponds to one of the detecting blocks. The detecting-region storing section 16 stores the relationships between the respective elements in the thermal image obtained by the temperature distribution detecting section 1 and the detecting blocks. The local-temperature-peak corresponding-type position determining section 17 selects a detecting block corresponding to the element found by the local-temperature-peak searching section 5 by referring to the detecting-region storing section 16. The local-temperature-peak corresponding-type position determining section 17 outputs the position of the selected detecting block as a position of an occupant in a room. It will be appreciated by a person having ordinary skill in the art that the above mentioned detecting region storing section 16 and local-temperature-peak corresponding-type position determining section 17 can be added to the construction of the apparatus of any one of Examples 1 to 5.

Figure 39:
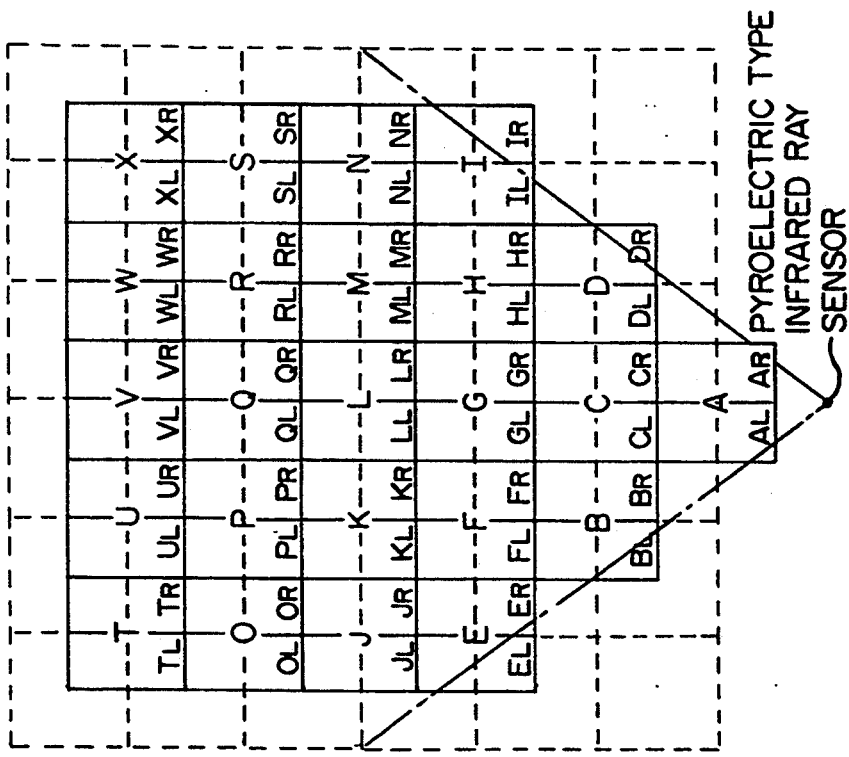
FIG. 39 shows a sensor and a region to be sensed by the sensor.

FIG. 39 shows the detecting region in the case where a pyroelectric sensor is located at the height of 2.4 m and at a tilt angle of 25°. For determining the positions of the occupants, the detecting region is divided into detecting blocks each having a size of 1 m×1 m, and each of the detecting blocks is further divided into two sub-blocks right and left with respect to the sensor. In other words, the position determination is to identify in which block the occupant exists. When this determination is applied to air-conditioning, a more accurate position determination does not cause any difference in the resulting control. In the detecting-region storing section 16, the relationships between the respective elements in the thermal image and the detecting sub-blocks are shown in FIG. 40. For example, six elements correspond to the detecting block G and are indicated by labels $G_L$ and $G_R$. Note that $G_L$ is the left sub-block of the detecting block G and the $G_R$ is the right sub-block of the detecting block G. The remaining elements are labeled in the same manner.

Figure 41:
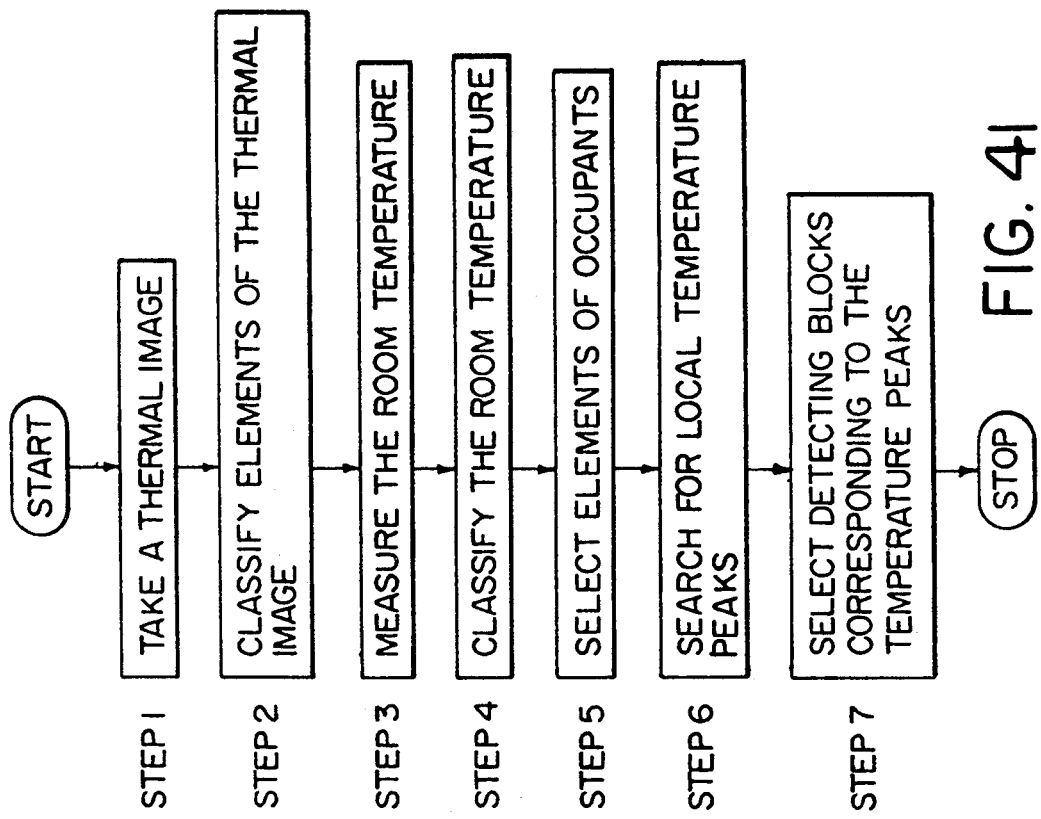
FIG. 41 is a flowchart illustrating an operational procedure for the apparatus of the sixth example according to the invention.

The operation of the occupant condition determining apparatus of the sixth example having the above construction will be described by referring to the flowchart of FIG. 41. In the sixth example, Steps 1 to 6 are the same as Steps 1 to 6 in the third example, so that the detailed descriptions thereof are omitted. For explanation, it is assumed that five occupants exist in a room shown in FIG. 5, and the result of the segmentation of the five occupants from a thermal image is as shown in FIG. 10. In this case, the determination of the positions of the five occupants is made as follows:

Steps 1–6

By the same procedure as that explained in the third example, a local temperature peak which is a representative element of each occupant is found, and a distinct label is applied to an element having each local temperature peak at a different location.

Step 7

Figure 42:
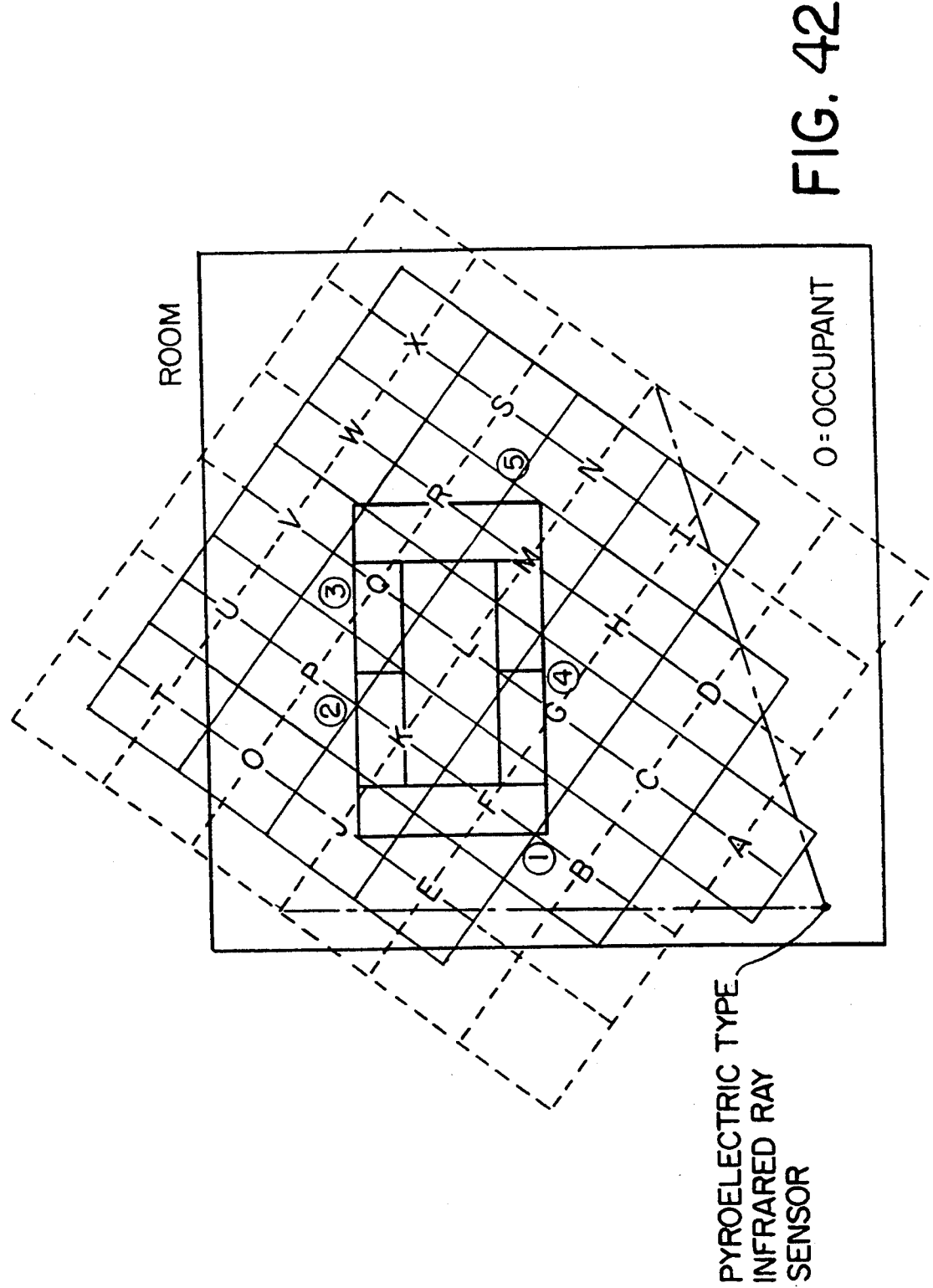
FIG. 42 shows a detecting region in the room shown in FIG. 5.

By the local-temperature-peak corresponding-type position determining section 17, the detecting blocks corresponding to the respective elements having local temperature peaks are selected by referring to the detecting-region storing section 16. The occupants indicated by labels 1 to 5 in FIG. 10 are determined to be in the sub-blocks $B_L$, $P_L$, $Q_L$, $G_R$, and $S_L$, respectively. FIG. 42 shows the blocks of the detecting region in the room shown in FIG. 5. The positions of the five occupants are correctly determined.

As described above, according to the apparatus of the sixth example, the relationships between the elements in the thermal image and the predetermined detecting blocks are previously stored. By selecting a detecting block corresponding to an element having the local temperature peak as the representative element of each occupant, the positions of the occupants in the room can be determined. As a result, more comfortable air-conditions for each occupant can be realized.

EXAMPLE 7

Next, the occupation condition determining apparatus of a seventh example will be described. In the sixth example, the detecting-region storing section 16 and the local-temperature-peak corresponding-type position determining section 17 are added to the construction of the third example, so that the positions of occupants in the room are determined by selecting the detecting blocks corresponding to the elements having the local temperature peaks as the representative elements of individual occupants. However, depending on the change in the posture and the exposed skin ratio, the position of an occupant cannot always be correctly determined, especially in the case where the occupant exists close to a sensor. The objective of the apparatus of the seventh example is to determine occupant positions without depending on the locations of the local temperature peaks.

Figure 43:
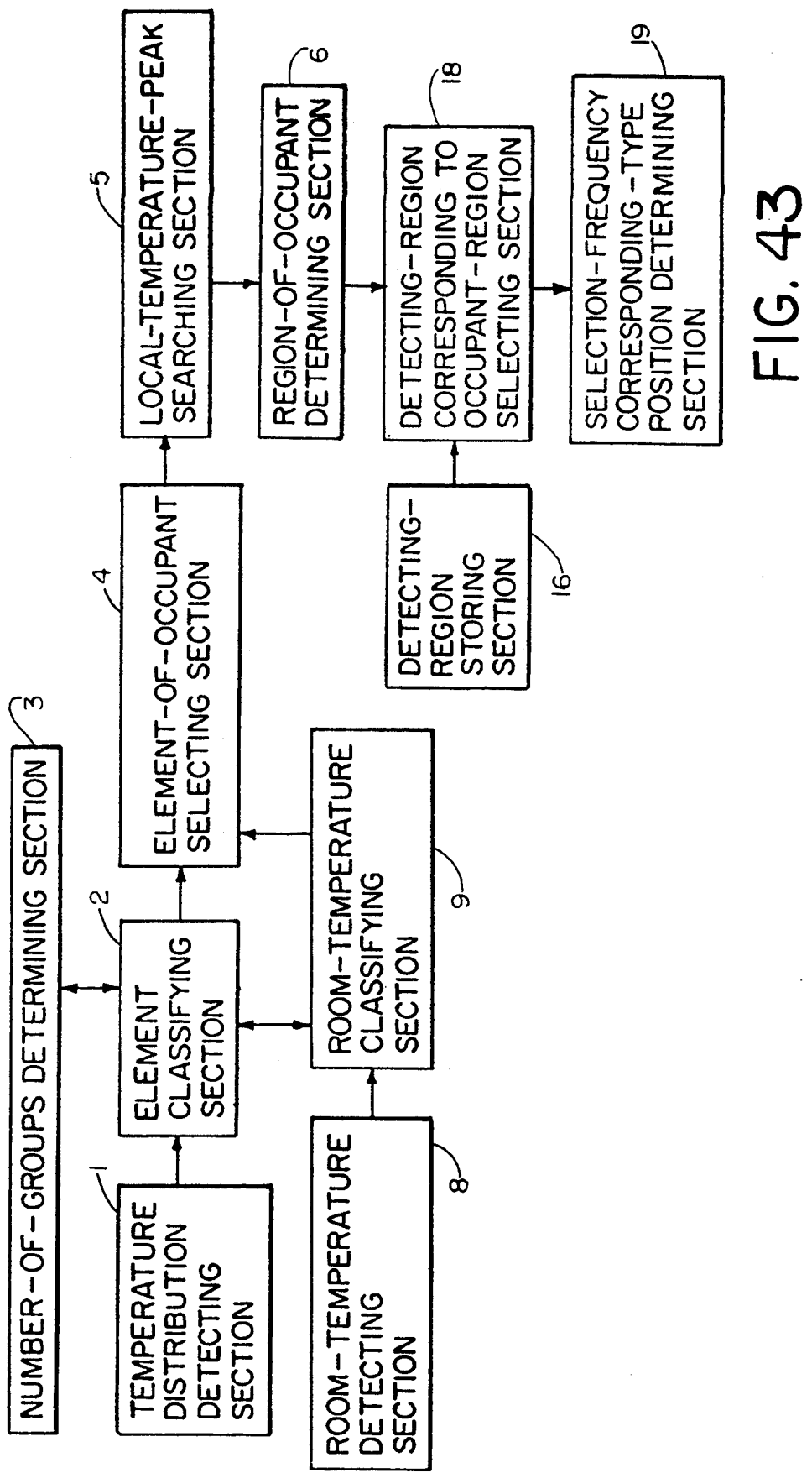
FIG. 43 is a block diagram of an apparatus of a seventh example according to the invention.

FIG. 43 shows the construction of the apparatus of the seventh example. The same components have the same reference numerals as those in the third example shown in FIG. 21, and the detailed descriptions thereof are omitted. The apparatus of the seventh example is different from the apparatus of the third example in that the apparatus of the seventh example additionally includes a detecting-region storing section 16, an detecting-region corresponding to occupant-region selecting section 18, and a selection-frequency corresponding-type position determining section 19. The detecting-region storing section 16 stores the relationships between the respective elements in the thermal image obtained by the temperature distribution detecting section 1 and the predetermined detecting blocks. The detecting-region corresponding to occupant-region selecting section 18 selects the detecting blocks corresponding to all the elements constituting each region determined as an occupant by the region-of-occupant determining section 6, by referring to the detecting-region storing section 16. The selection-frequency corresponding-type position determining section 19 determines a detecting block which is most frequently selected for each occupant by the detecting-region corresponding to occupant-region selecting section 18, and outputs the position of the determined detecting block as the position of the occupant in the room.

It will be appreciated by a person having ordinary skill in the art that the above-mentioned detecting-region storing section 16, detecting-region corresponding to occupant-region selecting section 18, and selection-frequency corresponding-type position determining section 19 can be added to the construction of the apparatus of any one of Examples 1 to 5.

For explanation, it is assumed that five occupants exist in the room shown in FIG. 5, a thermal image obtained in the room is as shown in FIG. 44, and the result of the segmentation of the five occupants from the thermal image is as shown in FIG. 45. By comparing FIG. 10 with FIG. 45, it is understood that the shape of the region having the label 4 is changed. This is because the posture of the occupant corresponding to the label 4 is changed from a sitting state into a standing state.

Figure 46:
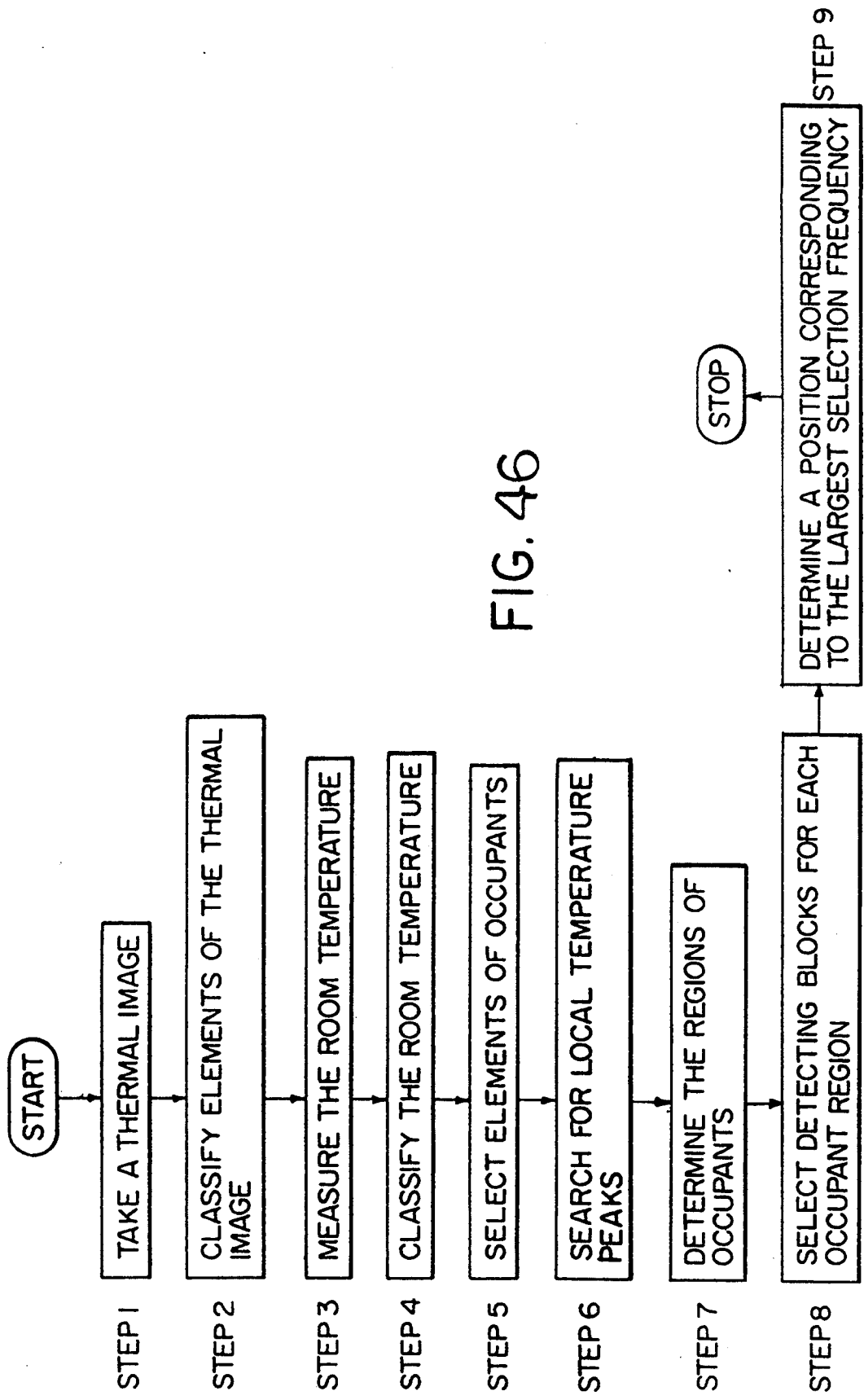
FIG. 46 is a flowchart illustrating an operational procedure for the apparatus of the seventh example according to the invention.

Hereinafter, with reference to the flowchart of FIG. 46, the occupant condition determining apparatus of the seventh example will be described. However, Steps 1-7 in the seventh example are the same as Steps 1-7 in the sixth example, so that the detailed descriptions thereof are omitted.

Steps 1-7

By the same procedure as in the sixth example, the regions each representing an occupant are determined.

Step 8

The detecting-region corresponding to occupant-region selecting section 18 selects the detecting blocks corresponding to all the elements constituting each region determined as an occupant by the region-of-occupant determining section 6, by referring to the detecting-region storing section 16. In FIG. 45, the region having the label 4 is constituted by four elements. In this case, for example, the detecting-region corresponding to occupant-region selecting section 18 selects sub-blocks $G_R$, $G_R$, $L_R$, and $Q_R$ for the four elements, respectively.

Step 9

The selection-frequency corresponding-type position determining section 19 determines a detecting block which is most frequently selected for each occupant in the detecting-region corresponding to occupant-region selecting section 18 as the position of the corresponding occupant. Regarding the region constituting the four elements having the label 4, the detecting sub-block $G_R$ is selected twice and $L_R$ and $Q_R$ are selected once, so that $G_R$ is determined as the position of the occupant. As is seen from FIG. 5, it is understood that this is the correct determination result. Since the occupant corresponding to the elements having the label 4 is in a standing state, the local temperature peak in the standing state is located at a higher position than in the sitting state of the occupant, as shown in FIG. 44. According to the apparatus of the sixth example, the selected detecting sub-block is $L_R$, which is not correct. This is because the apparatus of the sixth example selects a detecting block corresponding to the location of the local temperature peak. If there are a plurality of detecting blocks having the same selection frequency, a detecting block corresponding to element at the lowest position in the thermal image among elements representing the occupant can be determined as the position of the occupant. This means that the feet position of an occupant is presumed as the position of the occupant.

As described above, according to the apparatus of the seventh example, the detecting blocks corresponding to all the elements constituting the region determined as an occupant is selected, and a block which is most frequently selected is determined as the position of the occupant in the room. Therefore, without suffering the influence of the posture and the exposed skin ratio of the occupant, the positions of occupants can be correctly determined.

EXAMPLE 8

Next, the occupant condition determining apparatus of an eighth example will be described. In the sixth or the seventh example, the activity of an occupant is not determined, so that it is impossible to control more comfortable air-conditions depending on the activities of the occupants in the room. In the eighth example, the activities of the occupants are considered.

Figure 47:
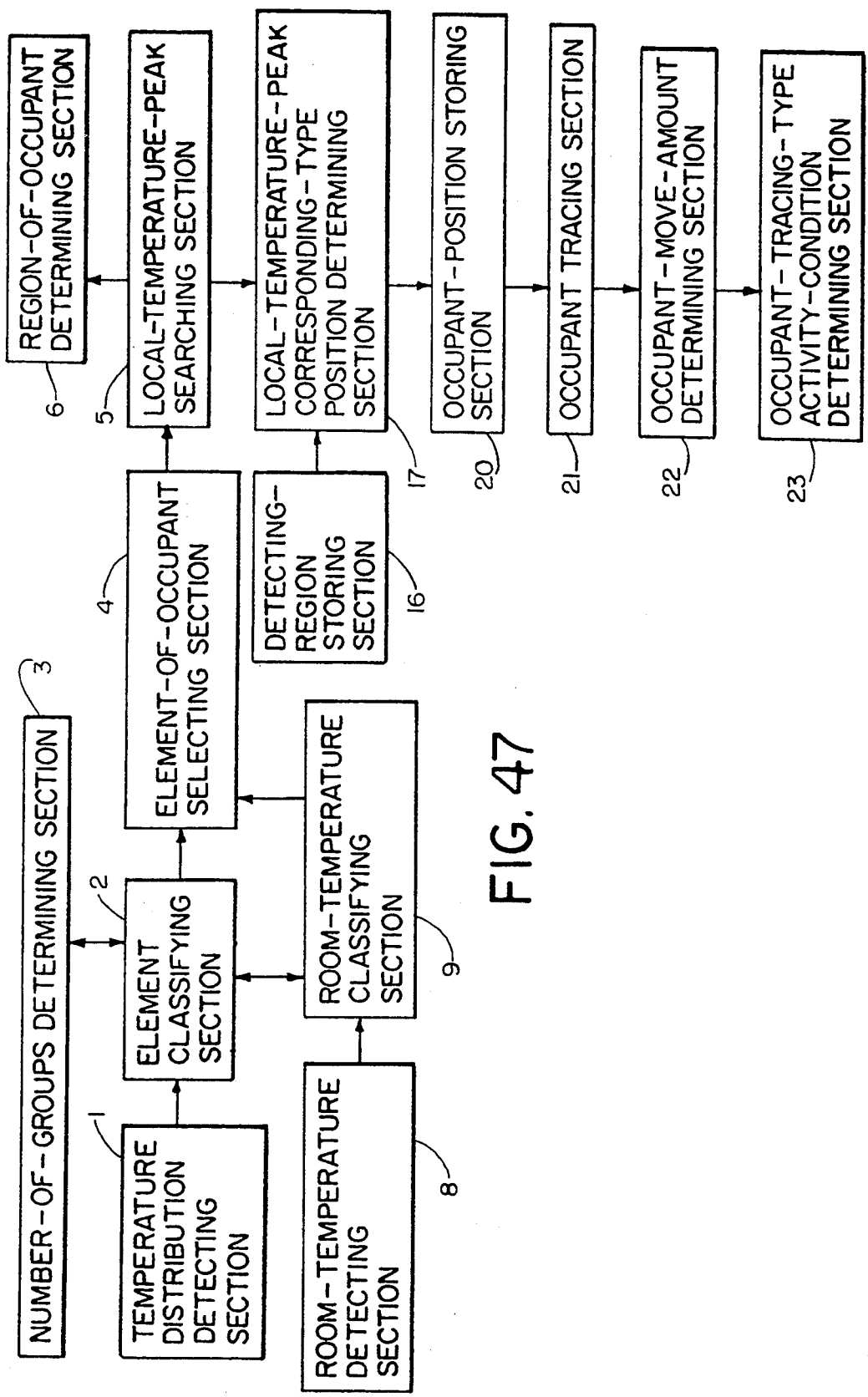
FIG. 47 is a block diagram of an apparatus of an eighth example according to the invention.

FIG. 47 shows the construction of the apparatus of the eighth example. The operation of the apparatus of the eighth example is described by way of the sixth example. In FIG. 47, the same components have the same reference numerals as those in the sixth example, and the detailed descriptions thereof are omitted. The apparatus of the eighth example is different from the apparatus of the sixth example in that the apparatus of the eighth example additionally includes an occupant-position storing section 20, an occupant tracing section 21, an occupant-move-amount determining section 22, and an occupant-tracing-type activity-condition determining section 23. The occupant-position storing section 20 stores the detecting blocks selected as the positions of occupants in the room by the local-temperature-peak corresponding-type position determining section 17 for every thermal image. The distances between detecting blocks in a position determining result and detecting blocks in another successive position determining result stored in the occupant-position storing section 20 are calculated for all combinations of the detecting blocks. The occupant tracing section 21 combines the detecting blocks in a position determining result with the detecting blocks in another successive position determining result so that the sum of distances therebetween is minimized. As a result, the occupant tracing section 21 regards the displacement of the detecting blocks as the movement of an occupant. The occupant-move-amount determining section 22 determines the amount of movement of the occupant in the room to be the distance between the detecting blocks combined by the occupant tracing section 21. The occupant-tracing-type activity-condition determining section 23 accumulates the amounts of movements determined by the occupant-move-amount determining section 22 every time when a thermal image is obtained, and calculates an amount of movement in a unit time period, so that the activity condition of the occupant in the room is determined.

Figure 48:
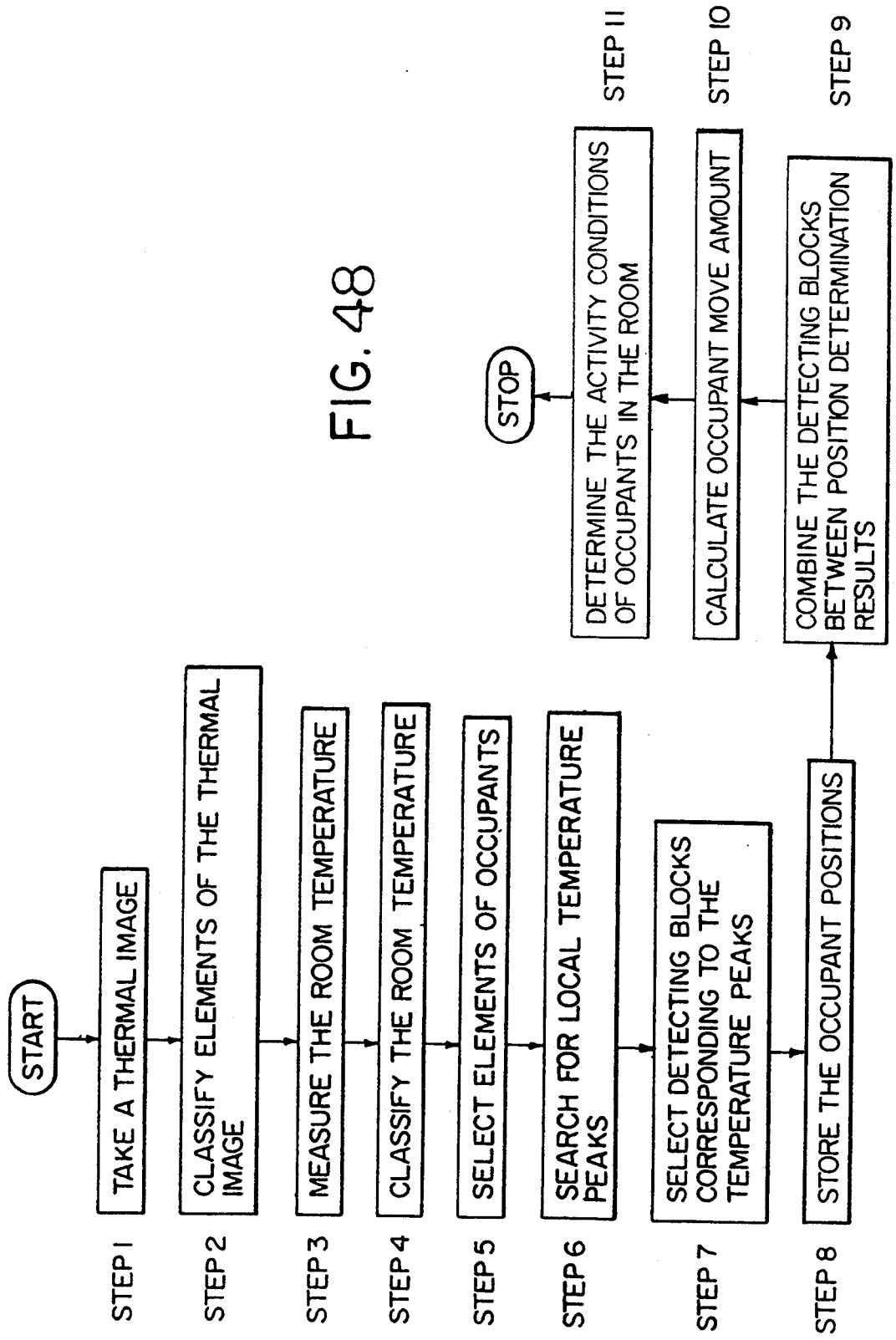
FIG. 48 is a flowchart illustrating an operational procedure for the apparatus of the eighth example according to the invention.
Figure 49:
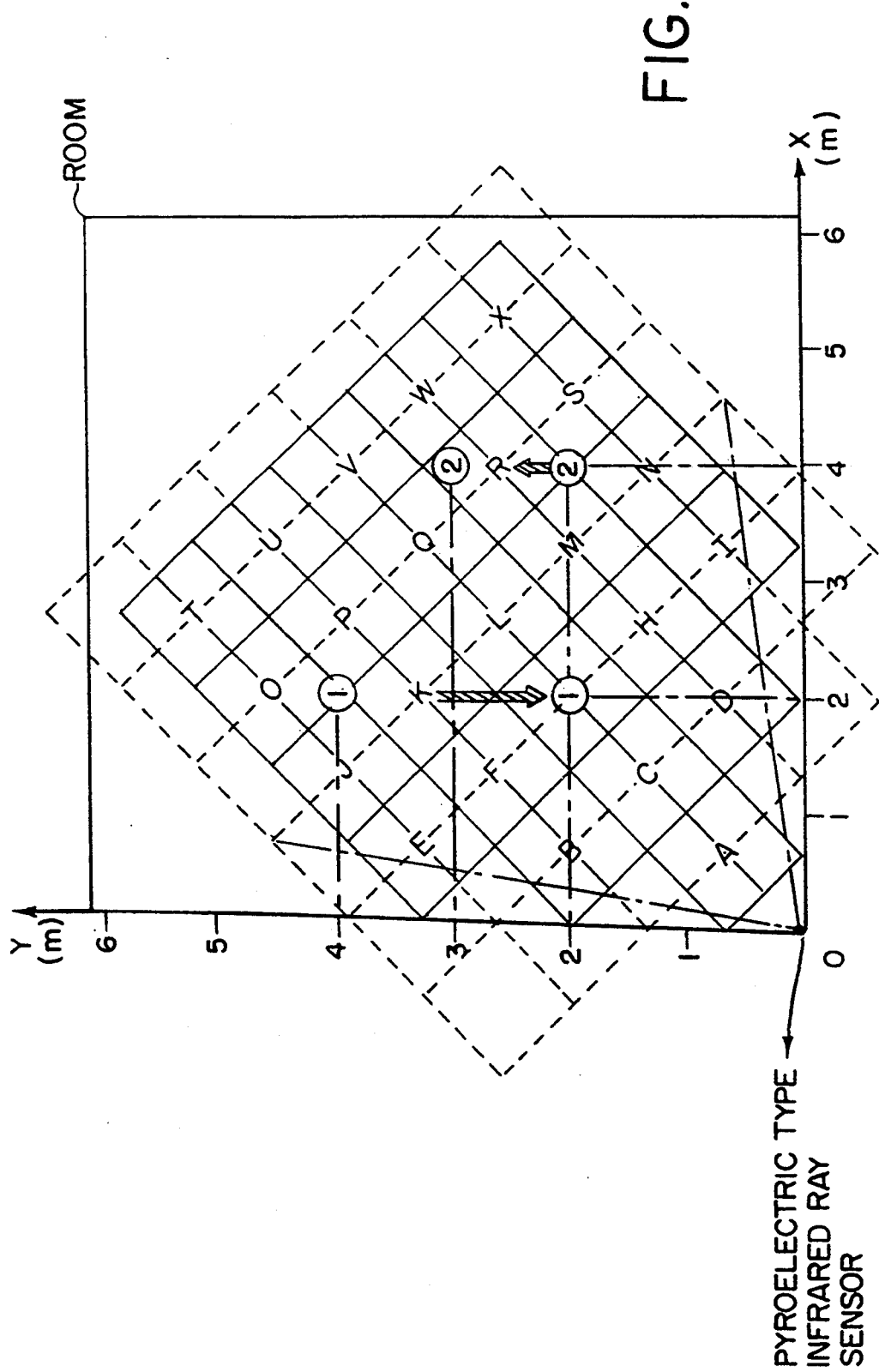
FIG. 49 shows exemplary movements in a room.

The operation of the occupant condition determining apparatus of the eighth example having the above construction will be described with reference to a flowchart shown in FIG. 48. However, Steps 1-7 in the eighth example are the same as Steps 1-7 in the sixth example, and the detailed descriptions thereof are omitted. For explanation, it is assumed that when two occupants at the coordinates (x, y) = (2, 4), (4, 2) move to the coordinates (x, y) = (2, 2), (4, 3) as shown in FIG. 49, two successive thermal images are obtained as shown in FIGS. 50A and 50B, respectively. FIG. 50A shows a thermal image including regions having the labels 1 and 2. Those regions correspond to occupants before movement, respectively. FIG. 50B shows another successive thermal image including regions having the labels 3 and 4. Those regions correspond to occupants after movement, respectively.

Steps 1–7

The positions in the room of the occupants segmented by the local-temperature-peak corresponding-type position determining section 17 are determined by the same procedure as in the sixth example. In FIGS. 50A and 50B, the hatched elements have the local temperature peaks. By referring the relationships between the elements and the detecting blocks in FIG. 40, the regions having the labels 1 and 2 are determined to correspond to the detecting sub-blocks $K_L$ and $N_L$, respectively, and the regions having the labels 3 and 4 are determined to correspond to the detecting sub-blocks $G_R$ and $R_L$, respectively. As a result, it is determined that two occupants exist on the sub-blocks $K_L$ and $N_L$ at a time and the two occupants exist on the sub-blocks $G_R$ and $R_L$ at another time.

Step 8

The positions of the occupants determined in Step 7 are stored in the occupant-position storing section 20 for each thermal image.

Step 9

By the occupant tracing section 21, for the two successive position determined results stored in the occupant-position storing section 20, distances between detecting blocks between the determined results are calculated for all combinations of the detecting blocks. Then, the correspondence of first detecting blocks from a thermal image to second detecting blocks from another thermal image is determined so that the sum of distances between the first detecting blocks and the second detecting blocks are minimized. The distance between a first detecting block and a second detecting bock is the distance between the center of the first detecting block and the center of the second detecting block. In the example shown in FIGS. 50A and 50B, in the terms of the minimum sum of distances, $K_L$ and $G_R$, and $N_L$ and $R_L$ are related to each other. That is, the region having the label 1 in FIG. 50A corresponds to the region having the label 3 in FIG. 50B. This means that it is determined that the occupant moves from $K_L$ to $G_R$. The region having the label 2 corresponds to the region having the label 4. This means that it is determined that the occupant moves from $N_L$ to $R_L$. As is seen from FIG. 49, the above combination is correct.

Step 10

By the occupant-move-amount determining section 22, a distance between the corresponding detecting blocks by the occupant tracing section 21 is calculated to be an amount of movement of the occupant. Based on the combination obtained by Step 9, for example, an amount of movement of an occupant of the label is calculated to be 1.8 m, and an amount of movement of the other occupant of the label 2 is calculated to be 1.4 m.

Step 11

The amounts of movement obtained by Step 10 are accumulated every time when a thermal image is obtained, and the amount of movement in a unit time period is calculated by the occupant-tracing-type activity determining section 23. If the value of the amount of movement is large, it is determined that the occupant actively moves in the room. If the value of the amount of movement is small, it is determined that the occupant does not so actively move. Thus, the activity condition of occupants can be determined. The accumulation of amounts of movement can be obtained either for each occupant or for all the occupants in the room as a whole.

As described above, according to the apparatus of the eighth example, from the position determined results for two successive thermal images, all distances from detecting blocks between the determined results are calculated. By regarding a pair of detecting blocks which indicates the minimum sum of distances as the position change of detecting blocks by the movement of the occupant, the movements of the occupants are traced. The amount of movement in a unit time period is calculated, whereby the activity conditions of the occupants in the room can be determined.

EXAMPLE 9

Next, the occupant condition determining apparatus of a ninth example will be described. In the eighth example, in the position determined results for two successive thermal images, a pair of detecting blocks which indicates the minimum sum of distances is regarded as the position change of the detecting blocks due to the movement by the occupant, whereby the movement of the occupant can be traced. In the case where there is a small number of occupants, i.e., one or two, the movement of the occupants can be traced by the above method. However, as the number of occupants increases, the reliability for the method is lowered, and the correct activity amount cannot be calculated. In the ninth example, the activity amount in the case of an increased number of occupants is considered.

Figure 51:
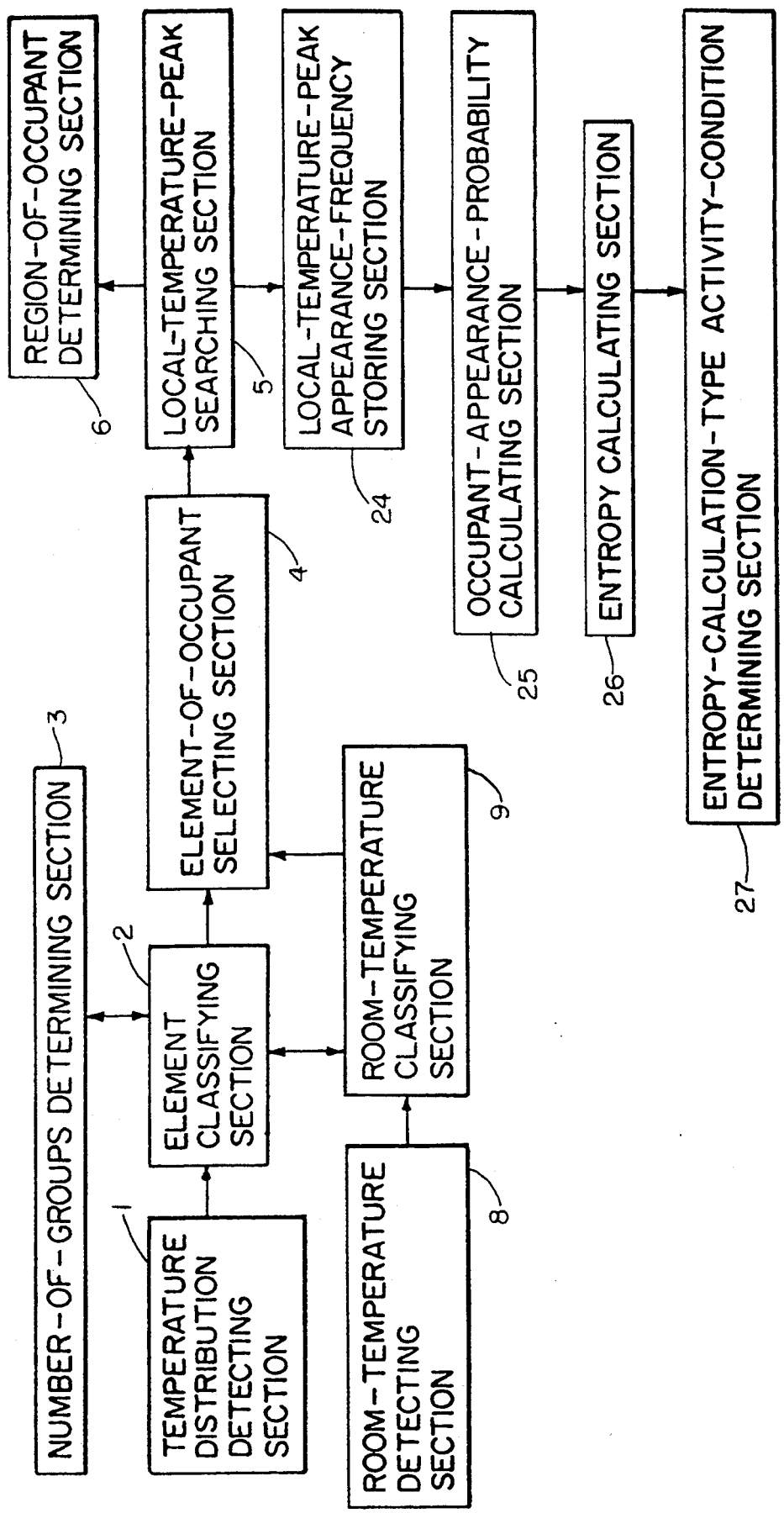
FIG. 51 is a block diagram of an apparatus of a ninth example according to the invention.

FIG. 51 shows the construction of the ninth example. The same components have the same reference numerals as those in the third example shown in FIG. 21. The apparatus of the ninth example is different from the apparatus of the third example in that the apparatus of the ninth example additionally includes a local-temperature-peak appearance-frequency storing section 24, an occupant-appearance-probability calculating section 25, an entropy calculating section 26, and an entropy-calculation-type activity-condition determining section 27. The local-temperature-peak appearance-frequency storing section 24 stores the appearance frequency of the local temperature peaks searched by the local-temperature-peak searching section 5 for each element. The occupant-appearance-probability calculating section 25 calculates the occupant appearance probability for each element from the appearance frequency stored in the local-temperature-peak appearance-frequency storing section 24. The entropy calculating section 26 calculates an entropy regarding the appearance probability calculated by the occupant-appearance-probability calculating section 25. The entropy-calculation-type activity-condition determining section 27 determines the activity conditions of the occupants in the room based on the value of the entropy calculated by the entropy calculating section 26.

It will be appreciated by a person having ordinary skill in the art that the above-mentioned local-temperature-peak appearance-frequency storing section 24, occupant-appearance-probability calculating section 25, entropy calculating section 26, and entropy-calculation-type activity-condition determining section 27 can be added to the construction of the apparatus of any one of Examples 1 to 7.

It is assumed that the probabilities of local temperature peaks (representative elements of occupants) for the respective 160 elements constituting a thermal image are indicated by $P_1, P_2, ..., P_{160}$. The entropy H is expressed by Expression (12).

$$H = - \sum_{k=1}^{160} p_k \log_2 p_k \qquad (12)$$

Figure 52:
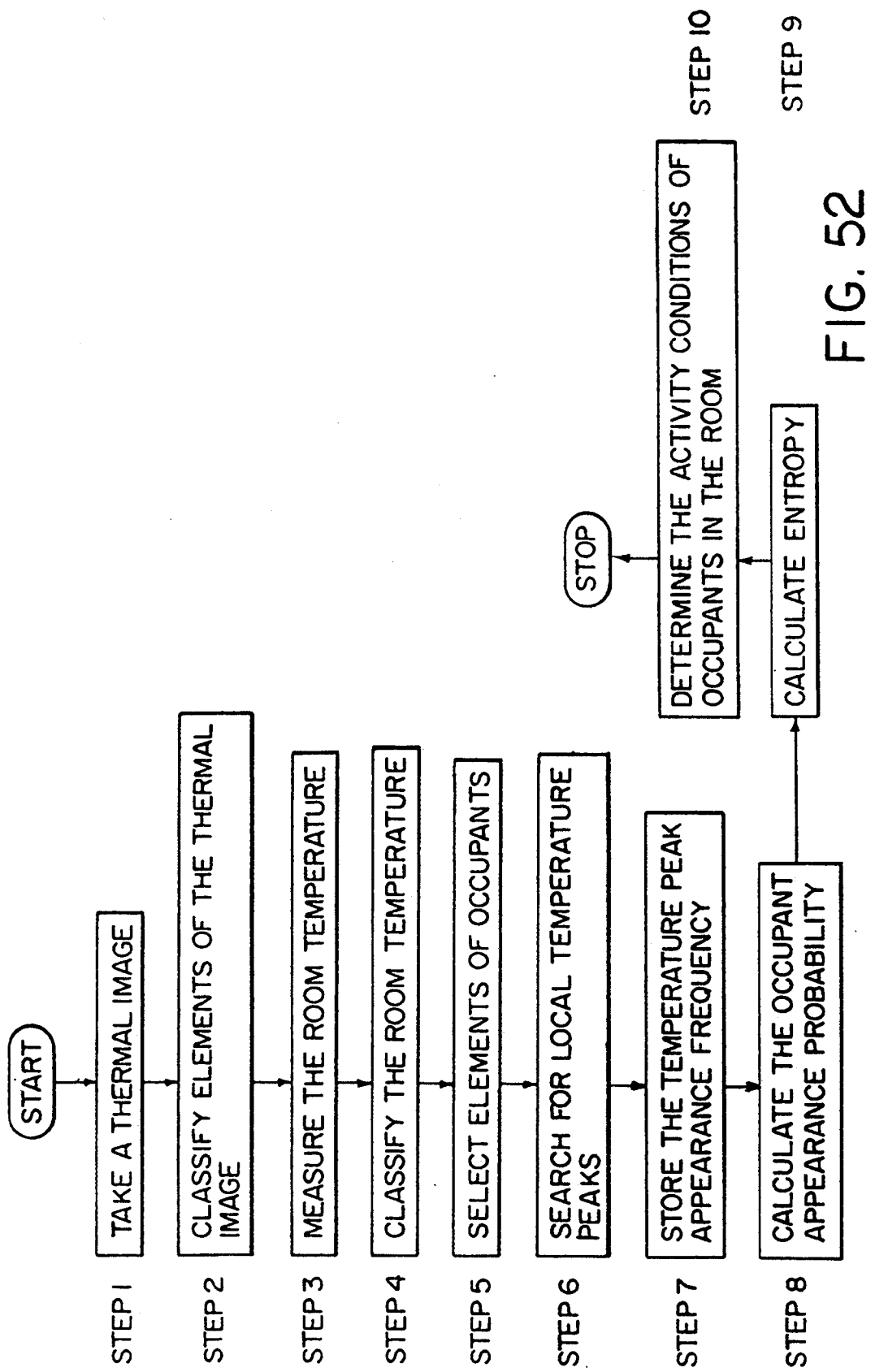
FIG. 52 is a flowchart illustrating an operational procedure for the apparatus of the ninth example according to the invention.

The operation of the apparatus of the ninth example having the construction shown in FIG. 51 will be described with reference to a flowchart shown in FIG. 52. In the ninth example, Steps 1-6 are the same as Steps 1-6 in the eighth example, and the detailed descriptions thereof are omitted.

Steps 1-6

By the same procedure as in the eighth example, the local temperature peaks of the representative elements of the respective occupants are searched.

Step 7

Figure 53A:
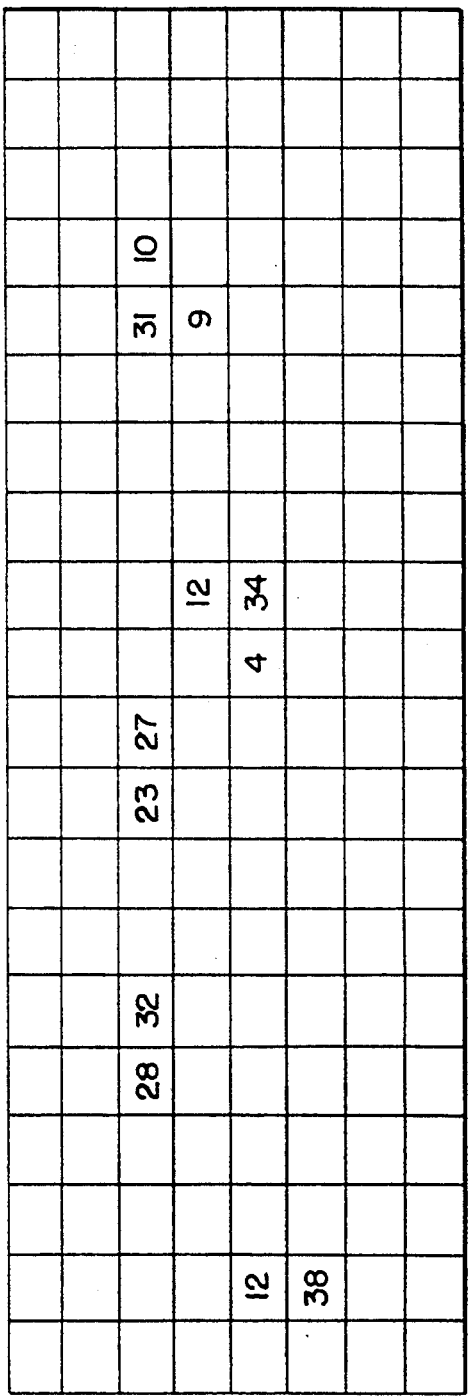
FIGS. 53A and 53B show exemplary frequencies of temperature peaks.
Figure 53B:
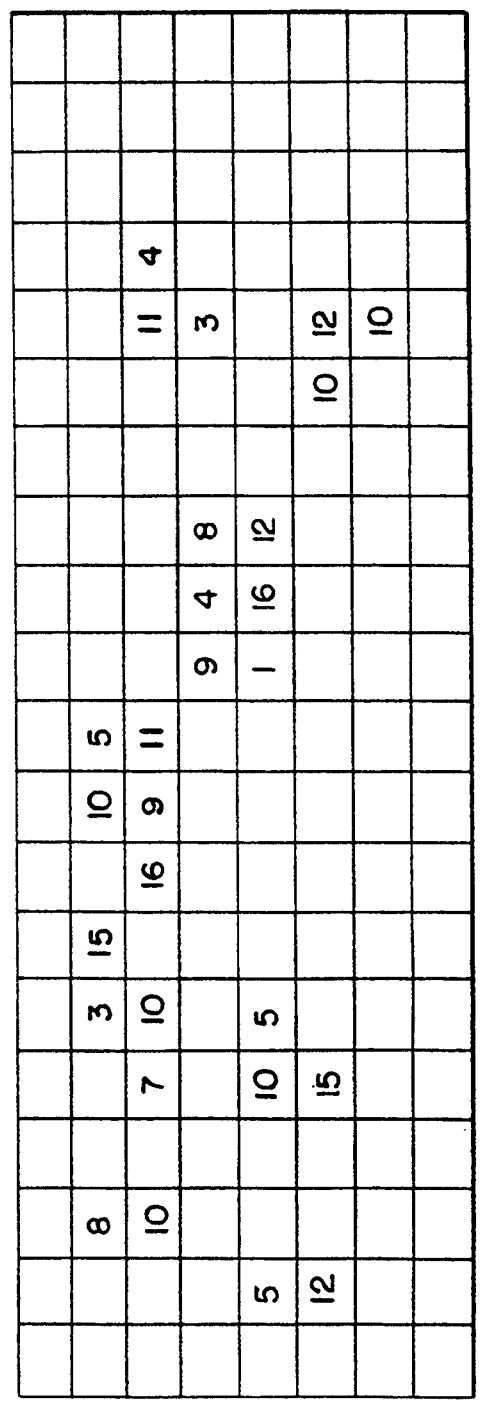

The local-temperature-peak appearance-frequency storing section 24 stores, for each element, the appearance frequency of the local temperature peaks of the representative element of an occupant searched in Steps 1-6 every time when a thermal image is obtained. FIGS. 53A and 53B show an exemplary appearance frequency. FIG. 53A shows an appearance frequency in a case where occupants stays at relatively the same positions, i.e., the movement is small. FIG. 53B shows another appearance frequency in a case where occupants actively move.

Step 8

Figures 54A, 54B:
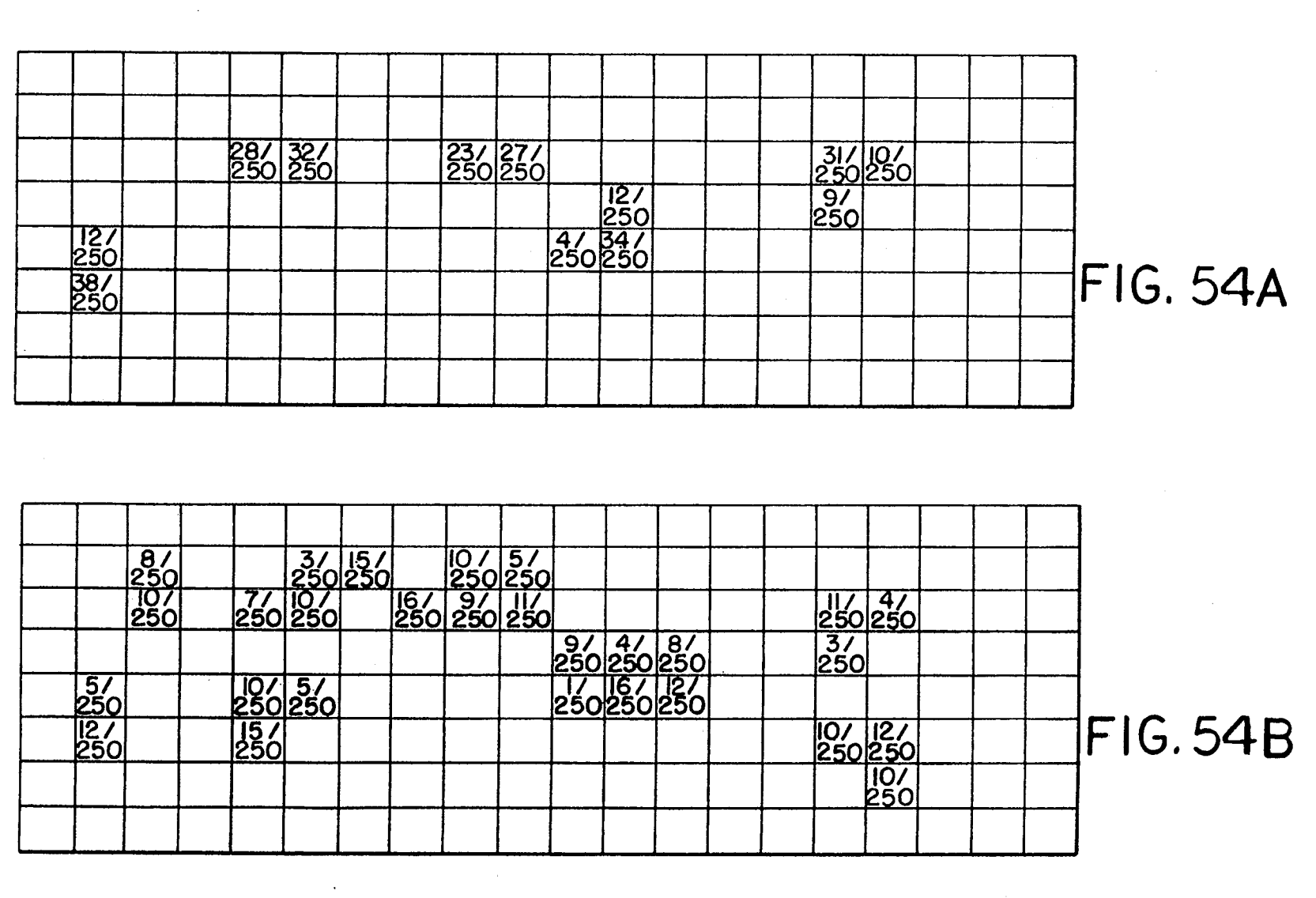

The occupant-appearance-probability calculating section 25 calculates the probability that it becomes the representative element of an occupant for each element, by dividing the appearance frequency stored for each element by the total frequency, by referring the local-temperature-peak appearance-frequency storing section 24 in each unit time period. For example, the occupant appearance probabilities obtained from the appearance frequencies shown in FIGS. 53A and 53B are shown in FIGS. 54A and 54B, respectively.

Step 9

The entropy calculating section 26 calculates the entropy H by using Expression (12). In the case of FIG. 54A, H=3.405. In the case of FIG. 54B, H=4.658.

Step 10

By the entropy-calculation-type activity-condition determining section 27, the activity conditions of the occupants in the room are determined based on the value of the entropy calculated in Step 9. For example, a smaller value of the entropy indicates that the occupants appear at limited positions in the room. As a result, it is determined that there are small movements of occupants in a room. A larger value of the entropy indicates that the occupants appear at various positions in the room in the unit time period. As a result, it is determined that there are large movements of occupants in the room. It is understood that the result of the determinations coincide with the entropy calculation results from the occupant appearance probabilities shown in FIGS. 54A and 54B.

As described above, according to the apparatus of the ninth example, the occupant appearance probability is calculated for each element and the entropy thereof is calculated, without directly tracing the movement of the occupants. Therefore, it is possible to determine the activity conditions of the occupants in the room even when the tracing for each occupant is difficult, for example, in the case where there is a lot of occupants in the room.

According to the apparatus of the first example, elements of a thermal image obtained from the room temperature distribution are classified based on the temperatures thereof, and elements of relatively higher temperatures are selected as elements of occupants. Then, for the selected elements, the number of local temperature peaks is counted, so that the number of occupants in the room can be identified.

According to the apparatus of the second example, by using the rules for determining the number of groups into which elements are classified based on the feature amounts of a thermal image, the classification of the elements into a plurality of groups can be performed at a time without repeating the classifications. Therefore, the occupant conditions can be grasped in a short time period. As a result, more comfortable air-conditions can be realized.

According to the apparatus of the third example, a group of elements representing background is selected by using the room temperature, so that the regions representing occupants can be correctly segmented. Therefore, it is possible to identify the number of occupants in the room.

According to the apparatus of the fourth example, the room temperature is presumed from a temperature corresponding to the largest frequency in the histogram. Thus, the regions representing occupants are correctly segmented without using a sensor such as a thermistor, and the number of occupants can be identified.

According to the apparatus of the fifth example, for each element, the selection frequency selected as a element of an occupant is stored. The elements are classified based on the selection frequencies, and the region composed of the elements belonging to groups of larger selection frequencies is regarded as a static heat source which always stays at the same position. Therefore, the occupants can be distinguished from background.

According to the apparatus of the sixth example, the relationships between elements in a thermal image and predetermined detecting blocks are previously stored. By selecting a detecting block corresponding to the location of the local temperature peak of the representative element of each occupant, the position of the occupant in the room can be determined.

According to the apparatus of the seventh example, the detecting blocks corresponding to all the elements constituting the region determined as an occupant are selected, and a block which is most frequently selected is determined as the position of the occupant in the room. Therefore, the positions of occupants can be more correctly determined.

According to the apparatus of the eighth example, from the position determined results for two successive thermal images, a pair of detecting blocks which indicates the minimum sum of distances is regarded as the positional change of detecting blocks by the movement of the occupant. Thus, the movements of the occupants are traced, and the amount of movement in a unit time period is calculated, whereby the activity conditions of the occupants in the room can be determined.

According to the apparatus of the ninth example, the entropy is calculated from the occupant appearance probability for each element. Therefore, it is possible to determine the activity conditions of the occupants in the room even when the tracing for occupants is difficult.

The application of the present invention is not limited to the air conditioning apparatus. It is appreciated that there are various applications such as the cooperation with a crime prevention system on the basis of the spirit of the present invention, and such applications may fall within the scope of the invention. Further, through the description of the present application, the term "occupant" is not limited to a human being. Various objects other than a human being, such as heat sources and animals should be included within the term "occupant". For example, the present invention can be used for monitoring animals.

If the occupant condition determining apparatus described in the first to ninth examples is applied to an air conditioning apparatus, for example, as is shown in FIG. 55, the air conditioning apparatus can control an air temperature, an air direction, an air velocity, floor vents provided at the floor of the room through which air is sent into the room, a ventilator, etc., depending on the number, the positions, and the activities of occupants which are determined by the occupant condition determining apparatus. Such an air conditioning apparatus can realize comfortable environments in thermal and air-quality conditions.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An apparatus for determining existential conditions of objects on a certain detecting region, said apparatus comprising:

temperature distribution detecting means for obtaining a thermal image including a plurality of elements each representing temperature data by detecting the temperature distribution on said detecting region;

element classifying means for classifying said plurality of elements in said thermal image into at least two groups, all elements belonging to one of said groups being in a certain temperature range, said temperature range of said one group being distinct from a temperature range of another one of said groups;

group selecting means for selecting at least one group of a relatively higher temperature range in said thermal image from said at least two groups;

element selecting means for selecting, among elements included in said at least one group selected by said group selecting means, elements representing temperature data indicative of local temperature peaks in said thermal image; and output means for outputting the number of said elements selected by said element selecting means as the number of objects on said detecting region.

2. An apparatus according to claim 1, further comprising:

object region specifying means for specifying a region composed of elements selected by said element selecting means, and elements depending on said selected elements among the elements in said group selected by said group selecting means, as a region representing an object.

3. An apparatus according to claim 1, wherein said group selecting means selects a group of a higher temperature range than a predetermined threshold value as a group of a relatively higher temperature range in a thermal image.

4. An apparatus according to claim 1, wherein said group selecting means selects a group of a highest temperature range as a group of a higher temperature range in a thermal image.

5. An apparatus according to claim 1, wherein said element classifying means includes means for determining the number of said groups, based on prescribed criteria.

6. An apparatus according to claim 5, wherein said criteria are rules of If-then form based on the variance, the range and the maximum value of temperature data of respective elements included in said thermal image.

7. An apparatus according to claim 1, further comprising:

temperature detecting means for detecting a room temperature; and room temperature classifying means for determining into which of said at least two groups said detected room temperature is classified, wherein said group selecting means selects a group of a higher temperature range than the temperature range of said group determined by said room temperature classifying means, as a group of a relatively higher temperature range in said thermal image.

8. An apparatus according to claim 1, further comprising:

histogram producing means for producing a histogram of temperature data for all elements included in said thermal image;

temperature selecting means for selecting temperature data of the largest frequency in said histogram as the room temperature; and room temperature classifying means for determining into which of said at least two groups said temperature data selected as the room temperature is classified, wherein said group selecting means selects a group of a higher temperature range than the temperature range of said group determined by said room temperature classifying means, as a group of a relatively higher temperature range in said thermal image.

9. An apparatus according to claim 1, further comprising:

frequency counting means for counting, for each of said plurality of elements included in said thermal image, the frequency that the element belongs to the group selected by said group selecting means; and template producing means for producing a template for specifying elements having relatively larger frequencies in said thermal image as elements representing at least a portion of a heating device, wherein said element selecting means selects, among elements obtained by removing the elements specified by said template producing means from elements belonging to said selected group, elements having temperature data indicative of local temperature peaks in said thermal image as elements representing at least a portion of said object.

10. An apparatus according to claim 9, further comprising template updating means for updating said template every predetermined time.

11. An apparatus according to claim 1, further comprising:
frequency counting means for counting, for each of said plurality of elements included in said thermal image, the frequency that the element belongs to the group selected by said group selecting means; and template producing means for producing a template for specifying elements having relatively larger frequencies in said thermal image as elements indicative of at least a portion of a heating device, wherein said element classifying means classifies elements obtained by removing the elements specified by said template producing means from said plurality of elements included in said thermal image into at least two groups.

12. An apparatus according to claim 11, further comprising template updating means for updating said template every predetermined time.

13. An apparatus according to claim 1, wherein said detecting region is divided into a plurality of blocks, and wherein said apparatus further comprises:
block selecting means for selecting one of said plurality of blocks as a function of the elements selected by said element selecting means; and position output means for outputting the position of the block selected by the block selecting means as the position of an object which exists on said detecting region.

14. An apparatus according to claim 13, wherein said block selecting means includes:
storing means for storing the relationships between said plurality of blocks and said plurality of elements included in said thermal image; and block specifying means for specifying blocks corresponding to the elements selected by said element selecting means, by referring said storing means.

15. An apparatus according to claim 13, further comprising:
object region specifying means for specifying a region composed of elements selected by said element selecting means, and elements depending on said selected elements among the elements in said group selected by said group selecting means, as a region representing an object, wherein said block selecting means includes:
storing means for storing the relationships between said plurality of blocks and said plurality of elements included in said thermal image;

block specifying means for specifying, for each element included in one region specified by said object region specifying means, a block corresponding to the element by referring said storing means; and largest frequency block selecting means for selecting, for the region specified by said object region specifying means, a block which is most frequently specified by said block specifying means.

16. An apparatus according to claim 13, further comprising:
storing means for storing positions of first blocks in said detecting region selected for a first thermal image by said block selecting means and positions of second blocks in said detecting region selected for a second thermal image by said block selecting means;

object tracing means for calculating all distances between the positions of said first blocks and the positions of said second blocks and for combining said first blocks with said second blocks so that the sum of said distances is minimized, as the positional change of an object;

movement calculating means for calculating the amount of movement of said object, based on the distance between one of said first blocks and one of said second blocks which are combined by said object tracing means; and movement condition determining means for determining the movement condition of said object by accumulating the amount of movement of said object for each thermal image.

17. An apparatus according to claim 1, further comprising:
frequency counting means for counting, for each element of a thermal image, the frequency that a local temperature peak is located at the element, based on the output from said element selecting means, every time when a thermal image is obtained by said temperature distribution detecting means;

probability calculating means for calculating, for each element of said thermal image, the probability that a local temperature peak is located at the element, based on the frequency counted by said frequency counting means;

entropy calculating means for calculating an entropy regarding the probability calculated by said probability calculating means; and movement condition determining means for determining the movement condition of an object based on the value of said entropy calculated by said entropy calculating means.

* * * * *